US012656595B2

(12) United States Patent
Epple et al.

(10) Patent No.: US 12,656,595 B2
(45) Date of Patent: Jun. 16, 2026

(54) OPTICAL SYSTEM

(71) Applicant: Carl Zeiss AG, Oberkochen (DE)

(72) Inventors: Alexander Epple, Aalen (DE); Johannes Zellner, Aalen (DE); David Shafer, Fairfield, CT (US); Marco Pretorius, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 241 days.

(21) Appl. No.: 18/109,206

(22) Filed: Feb. 13, 2023

(65) Prior Publication Data

US 2023/0333364 A1 Oct. 19, 2023

Related U.S. Application Data

(63) Continuation of application No. PCT/EP2021/072645, filed on Aug. 13, 2021.

(Continued)

(51) Int. Cl.
*G02B 25/00* (2006.01)
*G02B 9/04* (2006.01)
*G02B 23/12* (2006.01)

(52) U.S. Cl.
CPC ............. *G02B 25/001* (2013.01); *G02B 9/04* (2013.01); *G02B 23/12* (2013.01)

(58) Field of Classification Search
CPC ........ G02B 25/001; G02B 9/04; G02B 23/12; G02B 2027/0145; G02B 27/0101; G02B 27/026

(Continued)

(56) References Cited

U.S. PATENT DOCUMENTS 3,305,294 A 2/1967 Alvarez
3,583,785 A * 6/1971 Boardman ............. G02B 23/14
359/435

(Continued)

FOREIGN PATENT DOCUMENTS

CN 106680989 A * 5/2017
CN 106680989 B 12/2018

(Continued)

OTHER PUBLICATIONS

U.S. Appl. No. 18/104,160, filed Jan. 31, 2023, Marco Pretorius, Carl Zeiss AG.

(Continued)

*Primary Examiner* — William R Alexander
*Assistant Examiner* — Alaina Marie Swanson
(74) *Attorney, Agent, or Firm* — Ewers IP Law PLLC; Falk Ewers

(57) ABSTRACT

An optical system with an optical axis includes a display for displaying an image, an eyepiece for viewing the image, the eyepiece including a lens. The display is configured such that a marginal ray light beam emanates from an edge of the display and propagates to the lens in a light incidence direction. The display is arranged first along the optical axis in the light incidence direction, followed by the lens arranged on the optical axis. No further optical unit of the optical system is arranged between the lens and a pupil of the eye. The marginal ray light beam has a chief ray. The chief ray propagates at a first chief ray height at the lens and at a second chief ray height at the display. The first chief ray height is at least level with the second chief ray height.

26 Claims, 30 Drawing Sheets

Related U.S. Application Data

(60) Provisional application No. 63/065,133, filed on Aug. 13, 2020.

(58) Field of Classification Search
USPC ........................................................ 359/643
See application file for complete search history.

(56) References Cited

U.S. PATENT DOCUMENTS

| | | | |
|---|---|---|---|
| 4,183,624 A | 1/1980 | Rogers et al. | |
| 5,691,850 A | 11/1997 | Arisaka | |
| 5,886,825 A | 3/1999 | Bietry | |
| 6,052,234 A * | 4/2000 | Mukai | G02B 23/14 |
| | | | 359/558 |
| 6,330,115 B1 | 12/2001 | Hermanns | |
| 6,522,474 B2 | 2/2003 | Cobb et al. | |
| 6,735,018 B2 | 5/2004 | Kodama et al. | |
| 6,912,092 B2 | 6/2005 | Ukuda | |
| 7,158,320 B2 | 1/2007 | Nishio | |
| 7,339,737 B2 | 3/2008 | Urey et al. | |
| 7,841,715 B1 | 11/2010 | Morrison | |
| 8,503,080 B2 | 8/2013 | Seesselberg et al. | |
| 10,082,652 B2 | 9/2018 | Zhou et al. | |
| 2006/0262391 A1 | 11/2006 | Thomas | |
| 2009/0268305 A1 | 10/2009 | Pretorius | |
| 2013/0083396 A1 | 4/2013 | Pretorius et al. | |
| 2014/0218806 A1 | 8/2014 | Ishizuka | |
| 2016/0062105 A1 | 3/2016 | Kawamura et al. | |
| 2016/0195707 A1* | 7/2016 | Ishizuka | G02B 25/004 |
| | | | 359/643 |
| 2016/0357003 A1 | 12/2016 | Hauger et al. | |
| 2017/0299783 A1 | 10/2017 | Schnitzler et al. | |
| 2017/0307860 A1 | 10/2017 | Pretorius et al. | |
| 2017/0336609 A1 | 11/2017 | Lerner et al. | |
| 2018/0052383 A1 | 2/2018 | Miyagishima et al. | |
| 2019/0170991 A1 | 6/2019 | Seesselberg et al. | |
| 2020/0049992 A1* | 2/2020 | Peng | G06F 3/012 |
| 2020/0201020 A1 | 6/2020 | Fiedler | |
| 2023/0333364 A1 | 10/2023 | Epple et al. | |

FOREIGN PATENT DOCUMENTS

| | | | | |
|---|---|---|---|---|
| CN | 106405818 B | 11/2019 | | |
| CN | 111358419 A * | 7/2020 | ........... | A61B 1/3132 |
| DE | 19746925 C1 | 10/1998 | | |
| DE | 69229700 T2 | 12/1999 | | |
| DE | 102008021341 A1 | 11/2009 | | |
| DE | 102011054087 A1 | 4/2013 | | |
| DE | 102012101262 B3 | 4/2013 | | |
| DE | 102011055777 B4 | 2/2015 | | |
| DE | 102014114468 A1 | 4/2016 | | |
| DE | 102014118383 A1 | 6/2016 | | |
| DE | 102015119255 A1 | 5/2017 | | |
| DE | 102016214695 B3 | 10/2017 | | |
| EP | 534711 B1 | 8/1999 | | |
| EP | 1267197 B1 | 3/2005 | | |
| EP | 1746451 A2 | 1/2007 | | |
| JP | 2016051064 A | 4/2016 | | |
| JP | 2016051065 A | 4/2016 | | |
| RU | 2652660 C1 | 4/2018 | | |
| WO | WO-9509560 A1 * | 4/1995 | ........... | A61B 3/125 |
| WO | 2013079312 A1 | 6/2013 | | |
| WO | 2013120800 A1 | 8/2013 | | |

OTHER PUBLICATIONS

Merlitz, Distortion of binoculars revisited: Does the sweet spot exist?, J. Opt. Soc. Am. A/ vol. 27, No. 1, Jan. 2010.

Anonymous "Tutorial: Telezentrische Objektive" , Sep. 11, 2018, XP055907140, URL:https://web.archive.org/web/20180911151945/ https://www.opto-e.de/ressourcen/tutorialtelezentrische-objektive, retrieved on Mar. 30, 2022, and English Language Translation thereof.

Anonymous "Okular—Wikipedia" , Jun. 4, 2020, XP055907116, URL:https://de.wikipedia.org/w/index.php?title=Okular&oldid= 200631767, retrieved on Mar. 30, 2022, and English Language Translation thereof.

International Search Report dated Apr. 14, 2022 of international application PCT/EP2021/072645 on which this application is based and English Language Translation thereof.

International Preliminary Report on Patentability dated Feb. 23, 2023 of international application PCT/EP2021/072645 on which this application is based and English Language Translation thereof.

Office Action dated Feb. 13, 2023 issued in Austrian counterpart application No. A 9226/2021 and English-language Translation thereof.

Office Action dated Oct. 25, 2023, issued in German counterpart application No. DE 10 2020 134 017.5 and English-language translation thereof.

Palusinski et al, "Lateral-shift variable aberration generators" in Applied Optics https://doi.org/10.1364/AO.38.000086, vol. 38 (1999), pp. 86-90 (Abstract Only so far), in English.

Lohmann, "A New Class of Varifocal Lenses" article published in Applied Optics, Jul. 1970, pp. 1669-1671, vol. 9, No. 7, Department of Applied Physics and Information Science, University of California at San Diego, La Jolla, California, U.S.A.

Barton et al., "Diffractive Alvarez lens," article published in Optics Letters (OCIS codes: 050.1970, 220.3630, 220.3620, 220.1000, 010.1080), Jan. 1, 2000, pp. 1-3, vol. 25, No. 1, Lawrence Livermore National Laboratory, Livermore, California, U.S.A.

Werdehausen et al., "Dispersion-engineered nanocomposites enable achromatic diffractive optical elements", research article published in Optica, Aug. 2019, pp. 1031-1038, vol. 6, No. 8, https://doi.org/ 10.1364/OPTICA.6.001031, Optical Society of America, Corporate Research & Technology, Carl Zeiss AG, Jena, Germany.

Palusinski et al, "Lateral-shift variable aberration generators" published in Applied Optics, Jan. 1, 1999, pp. 86-90, vol. 38, No. 1, Optical Society of America, (OCIS codes: 080.3620, 220.1010, 220.1250), Optical Science Center, University of Arizona, Tucson, Arizona, U.S.A.

* cited by examiner

Incoming beam radius [mm]    2.5
Entrance angle [°]    27
Effective focal length [mm]    10.814

| Wavelength [nm] | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0 | 1.00E+20 | | | | | | |
| 1 | 0.000000 | 18.000000 | | | | | 2.50 | |
| 2 | 32.013145 | 7.000000 | S-YGH52 | 1.788497 | 1.806163 | 1.782609 | 9.03 | pos |
| 3 | -10.839473 | 1.000000 | S-TIH6 | 1.805175 | 1.847302 | 1.797521 | 9.43 | neg |
| 4 | 444.282397 | 0.246120 | | | | | 11.59 | |
| 5 | 417.809934 | 5.313834 | TAFD30 | 1.882086 | 1.910457 | 1.877585 | 11.78 | pos |
| 6 | -18.331726 | 0.199987 | | | | | 11.99 | |
| 7 | 1432.747710 | 2.192074 | N-LASF41 | 1.835006 | 1.859498 | 1.830145 | 11.60 | pos |
| 8 | -35.896343 | 0.200012 | | | | | 11.64 | |
| 9 | 21.832242 | 2.318707 | S-LAH99 | 2.000993 | 2.046018 | 1.993605 | 9.79 | pos |
| 10 | 101.144365 | 0.167497 | | | | | 9.58 | |
| 11 | 22.800344 | 3.714214 | E-FD53 | 2.104187 | 2.194118 | 2.088957 | 8.26 | neg |
| 12 | 8.592281 | 3.530709 | | | | | 5.22 | |
| 13 | 0.000000 | 0.000000 | | | | | 5.16 | |

Asphere coefficients

| Surface | 2 | 12 |
|---|---|---|
| K | 0.00 | 0.00 |
| C1 | -1.236232E-04 | 5.840089E-04 |
| C2 | -7.707801E-07 | 1.301142E-05 |
| C3 | 3.105031E-09 | 2.293509E-07 |
| C4 | -2.190434E-12 | |

Incoming beam radius [mm]: 2.5
Entrance angle [°]: 27
Effective focal length [mm]: -10.914

| Wavelength [nm] | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0.000000 | 1.00E+20 | | | | | 2.60 | |
| 1 | 0.000000 | 18.384568 | | | | | | |
| 2 | 37.050754 | 5.857559 | S-LAM3 | 1.717001 | 1.735882 | 1.713238 | 13.17 | pos |
| 3 | -36.193547 | 0.099988 | | | | | 13.26 | |
| 4 | 17.559264 | 4.630658 | S-LAM3 | 1.717001 | 1.736882 | 1.713238 | 12.26 | pos |
| 5 | 56.132218 | 0.099945 | | | | | 11.83 | |
| 6 | 9.632149 | 4.700333 | S-LAM3 | 1.717001 | 1.735882 | 1.713238 | 8.92 | pos |
| 7 | 15.895574 | 2.622688 | | | | | 7.87 | |
| 8 | -54.393299 | 0.999644 | S-NPH1 | 1.808088 | 1.855924 | 1.799578 | 7.78 | neg |
| 9 | 8.559042 | 10.817524 | | | | | 6.08 | |
| 10 | 21.422070 | 2.892903 | S-LAM3 | 1.717001 | 1.735882 | 1.713238 | 6.12 | pos |
| 11 | -17.290248 | 0.099927 | | | | | 6.06 | |
| 12 | 7.449305 | 1.990090 | S-LAM3 | 1.717001 | 1.735882 | 1.713238 | 4.84 | pos |
| 13 | 12.788760 | 0.099601 | | | | | 4.34 | |
| 14 | 3.705087 | 1.551218 | S-LAM3 | 1.717001 | 1.735882 | 1.713238 | 3.52 | neg |
| 15 | 2.582129 | 2.967989 | | | | | 2.29 | |
| 16 | -4.330695 | 1.000789 | S-NPH1 | 1.808088 | 1.855924 | 1.799578 | 2.29 | neg |
| 17 | 9.099715 | 1.637550 | S-LAM3 | 1.717001 | 1.735882 | 1.713238 | 2.57 | pos |
| 18 | -8.374585 | 0.100022 | | | | | 3.05 | |
| 19 | 23.906998 | 2.391868 | S-LAM3 | 1.717001 | 1.735882 | 1.713238 | 4.20 | pos |
| 20 | -8.389050 | 0.635533 | | | | | 4.49 | |
| 21 | 8.395380 | 4.688423 | S-LAM3 | 1.717001 | 1.735882 | 1.713238 | 5.16 | pos |
| 22 | -6.702749 | 0.999491 | S-NPH1 | 1.808088 | 1.855924 | 1.799578 | 4.97 | neg |
| 23 | 11.014872 | 5.713986 | | | | | 4.53 | |
| 24 | 0.000000 | 0.000000 | | | | | 5.42 | |

Incoming beam radius [mm]: 2.5
Entrance angle [°]: 27
Effective focal length [mm]: -10.842

Wavelength [nm]:

| | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0.000000 | 1.00E+20 | | | | | | |
| 1 | 0.000000 | 20.257280 | | | | | 2.60 | |
| 2 | 30.585462 | 7.277592 | S-LAM3 | 1.717001 | 1.735882 | 1.713238 | 13.62 | pos |
| 3 | -26.612820 | 1.763916 | | | | | 13.87 | |
| 4 | 13.139548 | 15.000529 | S-LAM3 | 1.717001 | 1.735882 | 1.713238 | 11.70 | neg |
| 5 | 6.080663 | 7.143128 | | | | | 4.76 | |
| 6 | -6.080663 | 15.000529 | S-LAM3 | 1.717001 | 1.735882 | 1.713238 | 4.87 | neg |
| 7 | -13.139548 | 0.100031 | | | | | 10.79 | |
| 8 | 14.443524 | 6.030990 | S-LAM3 | 1.717001 | 1.735882 | 1.713238 | 11.17 | pos |
| 9 | -44.420427 | 9.793601 | | | | | 10.93 | |
| 10 | 31.183816 | 0.999833 | E-FDS3 | 2.104187 | 2.194118 | 2.088957 | 4.36 | neg |
| 11 | 4.971811 | 3.000264 | S-LAM3 | 1.717001 | 1.735882 | 1.713238 | 3.65 | pos |
| 12 | -12.892936 | 1.349010 | | | | | 3.45 | |
| 13 | -7.343816 | 3.448591 | S-LAM3 | 1.717001 | 1.735882 | 1.713238 | 3.02 | pos |
| 14 | -7.363722 | 8.842953 | | | | | 4.00 | |
| 15 | 0.000000 | 0.000000 | | | | | 5.40 | |

Asphere coefficients

| Surface | 2 | 3 | 8 | 9 |
|---|---|---|---|---|
| K | 0 | 0 | 0 | 0 |
| C1 | -1.013649E-04 | -7.751044E-05 | -5.758285E-05 | 1.696600E-05 |
| C2 | 5.301849E-07 | 5.187242E-07 | 2.825446E-07 | 5.313635E-07 |
| C3 | -2.049812E-09 | -1.927276E-09 | -8.190215E-09 | -1.013362E-08 |
| C4 | 3.232223E-12 | 2.741372E-12 | 6.188868E-11 | 1.063010E-10 |
| C5 | | | -3.461887E-13 | -5.773180E-13 |
| C6 | | | 7.827666E-16 | 1.306693E-15 |

FIG. 9

Incoming beam radius [mm]: 2.5
Entrance angle [°]: 27
Effective focal length [mm]: -10.863

Wavelength [mm]:

| Wavelength 1 | Wavelength 2 | Wavelength 3 |
|---|---|---|
| 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0 | 1.00E+20 | | | | | | |
| 1 | 0.000000 | 18.504771 | | | | | 2.60 | |
| 2 | -29.217929 | 7.580009 | S-LAM3 | 1.717301 | 1.735882 | 1.713238 | 13.09 | pos |
| 3 | -20.590637 | 3.499462 | | | | | 13.24 | |
| 4 | -10.720802 | 11.411124 | S-LAM3 | 1.717301 | 1.735882 | 1.713238 | 9.71 | neg |
| 5 | 5.210612 | 8.083046 | | | | | 4.22 | |
| 6 | -5.743408 | 13.357967 | S-LAM3 | 1.717301 | 1.735882 | 1.713238 | 4.25 | pos |
| 7 | -10.659155 | 0.099887 | | | | | 8.66 | |
| 8 | 20.590637 | 7.580009 | S-LAM3 | 1.717301 | 1.735882 | 1.713238 | 13.24 | pos |
| 9 | -29.217929 | 2.957340 | | | | | 13.09 | |
| 10 | -16.225568 | 0.099848 | S-LAM3 | 1.717301 | 1.735882 | 1.713238 | 6.78 | neg |
| 11 | -107.611767 | 0.099849 | | | | | 6.70 | |
| 12 | 18.043548 | 13.482164 | S-LAM3 | 1.717301 | 1.735882 | 1.713238 | 6.57 | pos |
| 13 | -27.747097 | 0.099991 | | | | | 4.09 | |
| 14 | 16.017989 | 0.999873 | E-FD53 | 2.104187 | 2.194118 | 2.089957 | 3.75 | neg |
| 15 | 4.852185 | 6.000167 | S-LAM3 | 1.717301 | 1.735882 | 1.713238 | 3.53 | pos |
| 16 | -83.219778 | 8.276665 | | | | | 4.05 | |
| 17 | 0 | 0 | | | | | 5.43 | |

Asphere coefficients

| Surface | 2 | 3 | 8 | 9 |
|---|---|---|---|---|
| K | 0 | 0 | 0 | 0 |
| C1 | -1.193064E-05 | 2.222967E-05 | -2.222967E-05 | 1.193064E-05 |
| C2 | -3.929637E-07 | -1.975456E-07 | 1.975456E-07 | 3.929637E-07 |
| C3 | 1.935585E-09 | 2.881224E-10 | 2.881224E-10 | 1.935585E-09 |
| C4 | -2.178743E-12 | 2.208001E-12 | -2.208001E-12 | 2.178743E-12 |

FIG. 12

Incoming beam radius [mm]   2.5
Entrance angle [°]   27
Effective focal length [mm]   -10.849

Wavelength [nm]

| | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0 | 1.0E+20 | | | | | | |
| 1 | 0.000000 | 18.247984 | | | | | 2.60 | |
| 2 | 36.316515 | 6.861664 | S-LAH3 | 1.717001 | 1.735882 | 1.713238 | 12.41 | pos |
| 3 | -19.849043 | 38.892149 | | | | | 12.70 | |
| 4 | 16.476598 | 7.915051 | S-LAH3 | 1.717001 | 1.735882 | 1.713238 | 10.48 | pos |
| 5 | -20.541655 | 0.099881 | | | | | 9.26 | |
| 6 | 8.527104 | 6.032945 | E-FDS3 | 2.104187 | 2.194116 | 2.088957 | 6.25 | neg |
| 7 | 2.958780 | 4.298381 | | | | | 2.50 | |
| 8 | -8.581052 | 3.001226 | S-LAH3 | 1.717001 | 1.735882 | 1.713238 | 2.90 | pos |
| 9 | -4.908869 | 0.099857 | | | | | 3.87 | |
| 10 | 11.126315 | 2.993572 | S-LAH3 | 1.717001 | 1.735882 | 1.713238 | 4.76 | pos |
| 11 | -8.885712 | 0.998333 | E-FDS3 | 2.104187 | 2.194116 | 2.088957 | 4.73 | neg |
| 12 | -34.675640 | 10.667484 | | | | | 4.91 | |
| 13 | 0 | 0 | | | | | 5.41 | |

Asphere coefficients

| Surface | 2 | 3 | 4 | 5 |
|---|---|---|---|---|
| K | 0 | 0 | 0 | 0 |
| C1 | -1.211389E-04 | -6.884711E-05 | -2.109686E-04 | -7.401171E-05 |
| C2 | 1.184335E-06 | 8.567135E-07 | 3.788994E-05 | 6.417801E-06 |
| C3 | 6.042538E-09 | 2.733513E-09 | -7.833929E-08 | -1.969456E-07 |
| C4 | 8.880453E-12 | -1.097808E-12 | 9.973823E-10 | 3.191937E-09 |
| C5 | | | -6.366858E-12 | -2.863595E-11 |
| C6 | | | 1.871264E-14 | 1.113499E-13 |

Incoming beam radius [mm]    2.5
Entrance angle [°]    27
Effective focal length [mm]    -10.931

| Wavelength [mm] | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0.000000 | 1.00E+20 | | | | | 2.50 | |
| 1 | 25.744453 | 23.607104 | | | | | 16.43 | pos |
| 2 | -41.336795 | 11.938552 | S-LAM3 | 1.717001 | 1.735882 | 1.713238 | 17.00 | |
| 3 | 15.312124 | 105.028528 | | | | | 11.85 | pos |
| 4 | 21.097042 | 4.161553 | S-LAM3 | 1.717001 | 1.735882 | 1.713238 | 11.43 | |
| 5 | 11.975765 | 25.800224 | | | | | 9.91 | pos |
| 6 | -39.371712 | 7.442348 | S-LAM3 | 1.717001 | 1.735882 | 1.713238 | 9.10 | |
| 7 | -44.995572 | 0.991817 | | | | | 7.96 | neg |
| 8 | 8.659727 | 13.524952 | E-FDS3 | 2.104187 | 2.194118 | 2.088957 | 4.39 | |
| 9 | 0 | 7.417340 | | | | | 5.41 | |
| 10 | 0 | 0 | | | | | | |

Asphere coefficients

| Surface | 2 | 3 | 4 | 5 | 6 | 7 |
|---|---|---|---|---|---|---|
| K | 0 | 0 | 0 | 0 | 0 | 0 |
| C1 | -5.389183E-05 | -3.753714E-05 | -4.370016E-05 | -4.829490E-05 | -9.321469E-06 | 8.302745E-05 |
| C2 | 2.380473E-07 | 2.781712E-07 | -1.898155E-07 | -6.517422E-08 | -8.774584E-07 | -1.876584E-07 |
| C3 | -8.939770E-10 | -9.492398E-10 | 5.032720E-10 | -2.142036E-09 | 2.561127E-08 | -1.075769E-08 |
| C4 | 1.134415E-12 | 1.105891E-12 | -6.075796E-12 | 4.586513E-12 | -4.809329E-10 | 3.031931E-10 |
| C5 | | | | | 4.604134E-12 | -3.575747E-12 |
| C6 | | | | | -1.867182E-14 | 1.433782E-14 |

FIG. 21

Incoming beam radius [mm]   2.5
Entrance angle [°]   27
Effective focal length [mm]   -10.849

| Wavelength [nm] | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0 | 1.00E+30 | | | | | 2.60 | |
| 1 | 0.000000 | 19.151313 | | | | | 11.82 | |
| 2 | 100.143846 | 6.708400 | S-LAM3 | 1.717001 | 1.735882 | 1.713238 | 12.00 | pos |
| 3 | -13.726681 | 38.120490 | | | | | 9.56 | |
| 4 | 13.213194 | 5.346253 | S-LAM3 | 1.717001 | 1.735882 | 1.713238 | 9.24 | pos |
| 5 | -40.375799 | 2.244803 | | | | | 4.73 | |
| 6 | 5.138231 | 3.430749 | S-LAM3 | 1.717001 | 1.735882 | 1.713238 | 2.62 | neg |
| 7 | 3.081971 | 3.666076 | | | | | 2.54 | |
| 8 | -4.020417 | 1.633485 | E-FDS3 | 2.104187 | 2.194118 | 2.088957 | 3.99 | neg |
| 9 | 108.242774 | 3.039501 | S-LAM3 | 1.717001 | 1.735882 | 1.713238 | 4.61 | pos |
| 10 | -5.640165 | 0.088888 | | | | | 8.02 | pos |
| 11 | 13.580796 | 5.688113 | S-LAM3 | 1.717001 | 1.735882 | 1.713238 | 8.28 | |
| 12 | -12.131289 | 11.907520 | | | | | 5.41 | |
| 13 | 0 | 0 | | | | | | |

Asphere coefficients

| Surface | 2 | 3 | 4 | 5 | 11 |
|---|---|---|---|---|---|
| k | 0 | 0 | 0 | 0 | 0 |
| C1 | -1.695067E-04 | -7.182529E-05 | -9.061187E-05 | -1.339784E-05 | -2.558836E-04 |
| C2 | 1.262965E-06 | 9.674169E-07 | 2.519138E-06 | 2.738998E-06 | -3.675084E-07 |
| C3 | -3.226585E-09 | -5.122348E-09 | -5.336348E-06 | -5.194840E-08 | 1.056600E-08 |
| C4 | 6.823150E-12 | 3.290795E-11 | 8.710172E-10 | 4.794857E-10 | -6.408252E-11 |
| C5 | | | -8.843022E-12 | -2.590311E-12 | |
| C6 | | | 3.708630E-14 | 8.609659E-15 | |

FIG. 24

Incoming beam radius [mm]   2.5
Entrance angle [°]   27
Effective focal length [mm]   -10.882

| Wavelength [mm] | Wavelength 1 | Wavelength 2 | Wavelength 3 |
|---|---|---|---|
| | 587.6 | 435.8 | 643.8 |

| Surface | RADIUS [mm] | THICKNESS [mm] | MATERIAL | REFRACTIVE INDEX Wavelength 1 | REFRACTIVE INDEX Wavelength 2 | REFRACTIVE INDEX Wavelength 3 | HALF DIAMETER [mm] | REFRACTIVE POWER |
|---|---|---|---|---|---|---|---|---|
| 0 | 0 | 1.00E+20 | | | | | 2.50 | |
| 1 | 0.000000 | 18.594814 | | | | | | |
| 2 | 275.506971 | 6.046148 | S-LAM3 | 1.717001 | 1.735882 | 1.713238 | 11.72 | pos |
| 3 | -15.094626 | 33.905741 | | | | | 12.03 | |
| 4 | 15.477937 | 7.046961 | S-LAM3 | 1.717001 | 1.735882 | 1.713238 | 11.83 | pos |
| 5 | -44.171483 | 0.099941 | | | | | 11.50 | |
| 6 | 6.293063 | 4.270407 | E-FDS3 | 2.104187 | 2.194118 | 2.088957 | 6.24 | neg |
| 7 | 3.077390 | 7.081841 | | | | | 3.06 | |
| 8 | -8.249171 | 1.053489 | E-FDS3 | 2.104187 | 2.194118 | 2.088957 | 3.23 | neg |
| 9 | 203.875802 | 2.786775 | S-LAM3 | 1.717001 | 1.735882 | 1.713238 | 4.36 | pos |
| 10 | -6.279061 | 0.099909 | | | | | 4.82 | |
| 11 | 53.487517 | 3.660142 | S-LAM3 | 1.717001 | 1.735882 | 1.713238 | 7.09 | pos |
| 12 | -16.180308 | 1.847904 | | | | | 7.50 | |
| 13 | 13.305150 | 2.758224 | S-LAM3 | 1.717001 | 1.735882 | 1.713238 | 8.59 | pos |
| 14 | 50.560848 | 10.848822 | | | | | 8.50 | |
| 15 | 0 | 0 | | | | | 5.30 | |

Asphere coefficients

| Surface | 2 | 3 | 4 | 5 |
|---|---|---|---|---|
| K | 0 | 0 | 0 | 0 |
| C1 | -1.302624E-04 | -6.396896E-05 | -1.205479E-04 | -1.834462E-05 |
| C2 | 1.157914E-06 | 7.703936E-07 | 3.192983E-06 | 2.376071E-06 |
| C3 | -4.856312E-09 | -2.531336E-09 | -4.238096E-08 | -3.387013E-08 |
| C4 | 9.029122E-12 | 8.636050E-12 | 3.664157E-10 | 2.360700E-10 |
| C5 | | | -1.908466E-12 | -9.061886E-13 |
| C6 | | | 4.169884E-15 | 1.593042E-15 |

FIG. 27

| Surface | Type of surface | RADIUS [mm] | THICKNESS [mm] | MATERIAL | HALF DIAMETER [mm] |
|---|---|---|---|---|---|
| 0 | spherical | infinite (0) | infinite (0) | | 3.50 |
| 1 | spherical | infinite (0) | 18.394375 | | 13.89 |
| 2 | aspherical | infinite (0) | 3.100000 | SLAH55V | 14.22 |
| 3 | aspherical | -82.290531 | 0.200000 | | 14.95 |
| 4 | aspherical | 30.289950 | 7.147947 | SFPL51 | 14.92 |
| 5 | aspherical | -30.143389 | 10.456106 | | 12.85 |
| 6 | aspherical | 17.837582 | 7.084380 | SFPL51 | 12.35 |
| 7 | aspherical | 260.017356 | 2.500000 | | 11.23 |
| 8 | spherical | infinite (0) | 1.300000 | | |
| 9 | aspherical | 10.148112 | 5.480848 | LLAH86 | 6.46 |
| 10 | aspherical | 113.128555 | 0.300000 | | 6.28 |
| 11 | aspherical | 758450.286497 | 1.500000 | NBASF2 (Schott) | 6.04 |
| 12 | aspherical | 4.820027 | 5.718365 | | 4.46 |
| 13 | aspherical | -5.665127 | 6.794478 | NLASF41 (Schott) | 4.41 |
| 14 | aspherical | -9.156585 | 0.200000 | | 7.30 |
| 15 | spherical | 45.281369 | 3.108156 | SLAH58 | 7.76 |
| 16 | spherical | -24.786728 | 4.700086 | | 7.73 |
| 17 | spherical | infinite (0) | 0.749971 | | 5.60 |
| 18 | spherical | 13.858545 | 2.769578 | SFPL51 | 5.90 |
| 19 | spherical | -69.232729 | 0.511507 | | 5.07 |
| 20 | spherical | 75.607371 | 1.500000 | STIH13 | 6.79 |
| 21 | spherical | 7.201321 | 4.306687 | SFPL51 | 5.49 |
| 22 | aspherical | -28.259996 | 0.200000 | | 5.62 |
| 23 | aspherical | 19.253262 | 1.500000 | STIH53 | 5.70 |
| 24 | spherical | 6.280035 | 3.129225 | SLAH59 | 5.31 |
| 25 | spherical | 14.179835 | 4.716014 | | 5.20 |
| 26 | spherical | -5.934123 | 5.839733 | SMPH1 | 5.28 |
| 27 | spherical | -9.995262 | 0.100000 | | 8.49 |
| 28 | aspherical | 24.974348 | 3.672545 | SMPH1 | 10.38 |
| 29 | aspherical | infinite (0) | 3.000000 | | 10.30 |
| 30 | spherical | infinite (0) | 0.000000 | | |

FIG. 38

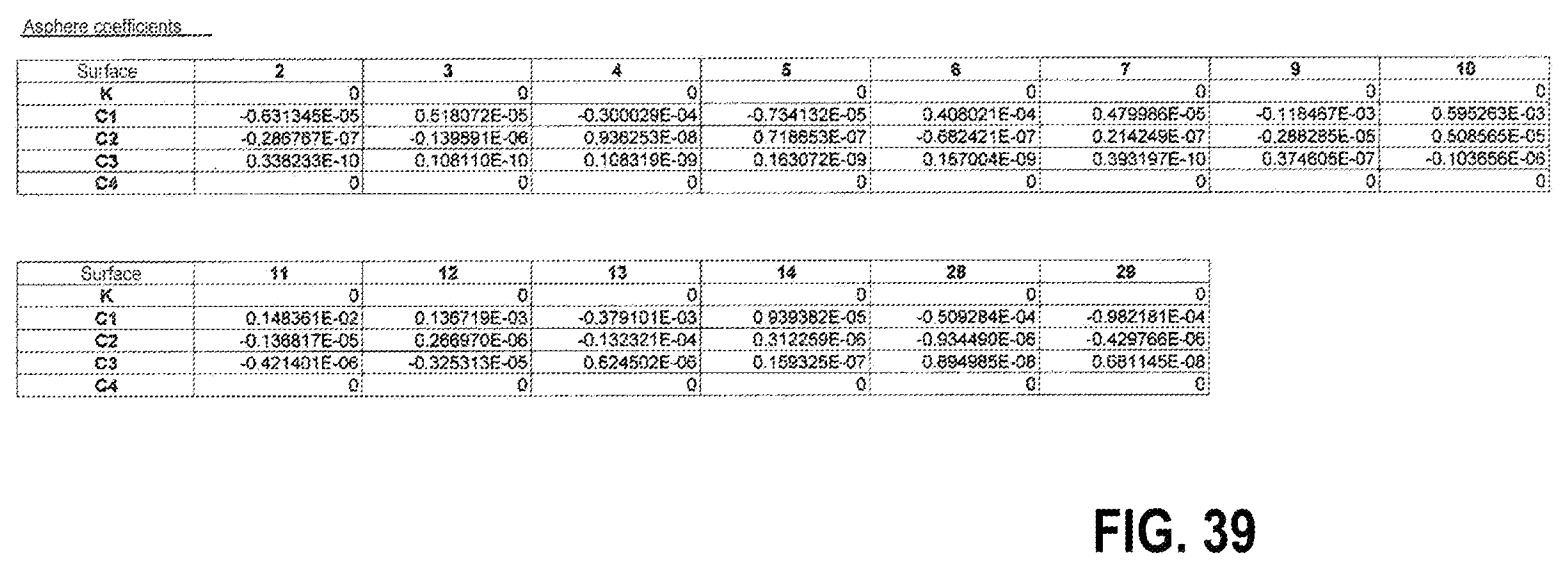

Asphere coefficients

| Surface | 2 | 3 | 4 | 5 | 6 | 7 | 9 | 10 |
|---|---|---|---|---|---|---|---|---|
| K | 0 | 0 | 0 | 0 | 0 | 0 | 0 | 0 |
| C1 | -0.631345E-05 | 0.5180072E-05 | -0.300029E-04 | -0.734132E-05 | 0.408021E-04 | 0.479986E-05 | -0.118467E-03 | 0.595263E-03 |
| C2 | -0.286787E-07 | -0.138881E-06 | 0.838253E-08 | 0.718853E-07 | -0.682421E-07 | 0.214249E-07 | -0.288285E-05 | 0.508565E-05 |
| C3 | 0.338333E-10 | 0.108110E-10 | 0.108319E-09 | 0.163072E-09 | 0.157064E-09 | 0.393197E-10 | 0.374808E-07 | -0.103656E-06 |
| C4 | 0 | 0 | 0 | 0 | 0 | 0 | 0 | 0 |

| Surface | 11 | 12 | 13 | 14 | 28 | 28 | 28 |
|---|---|---|---|---|---|---|---|
| K | 0 | 0 | 0 | 0 | 0 | 0 | 0 |
| C1 | 0.148361E-02 | 0.136719E-03 | -0.379101E-03 | 0.839382E-05 | -0.509284E-04 | -0.982181E-04 | |
| C2 | -0.138817E-05 | 0.266970E-06 | -0.133321E-04 | 0.312269E-06 | 0.934490E-08 | 0.429766E-06 | |
| C3 | -0.421401E-06 | -0.325313E-05 | 0.624502E-06 | 0.159325E-07 | 0.884985E-08 | 0.681145E-08 | |
| C4 | 0 | 0 | 0 | 0 | 0 | 0 | |

FIG. 39

OPTICAL SYSTEM

CROSS REFERENCE TO RELATED APPLICATIONS

This application is a national phase of the international patent application PCT/EP2021/072645, filed on 13 Aug. 2021, designating the U.S., and claiming priority to U.S. provisional patent application 63/065,133, filed 13 Aug. 2020. The entire contents of both applications are incorporated herein by reference.

TECHNICAL FIELD

The disclosure relates to an optical system including a display or a display unit for displaying an image and including an eyepiece for observing the image. By way of example, the optical system according to an aspect of the disclosure is arranged in a pair of field glasses, in a refractor, in a telescope, in a spotting scope, or in a light microscope. In particular, the optical system according to an aspect of the disclosure is arranged in a piece of night vision equipment.

BACKGROUND

An eyepiece is an optically effective unit of an optical system and arranged on the side of the eye. By way of example, the eyepiece is used to virtually image a real intermediate image of an image representation for a human eye. An eyepiece is used in a versatile manner, for example in a pair of field glasses, in a refractor, in a telescope, in a spotting scope, or in a light microscope. The arrangement of an eyepiece in a piece of night vision equipment is also known. By way of example, a visual display unit of the piece of night vision equipment is observed using the eyepiece. An image produced by a detector is presented on this visual display unit. Signals detected by the detector are electronically converted such that they are recognizable as an image on the visual display unit.

To ensure the most comfortable viewing possible for a person, in particular for a spectacle wearer, it is desirable for the eyepiece to have both a large pupil distance (for example, approx. 18 mm) for a pupil of the eye with a diameter of 5 mm and a large half field angle (for example, approx. 27°). Here, the pupil distance is the distance between the pupil of the eye and the first optical surface of the eyepiece.

With regard to the prior art, reference is made to US 2006/0262391 A1, EP 1 746 451 A2, US 2017/0336609 A1 and EP 1 267 197 B1.

The prior art also describes an optical system for observing a digital display unit for displaying an image. The known optical system is used to produce a sharp virtual image of the image presented on the digital display unit in an eye of an observer. In this case, it is desirable that the eye of the observer (and hence the pupil of the eye), as an effective boundary for the light beams emanating from the digital display unit, should be able to move within a predefined spatial region without a noticeable deterioration in the image quality. Among experts, this spatial region is often referred to as an "eye box".

Further, the prior art describes an optical system including an eyepiece and an objective, with the known optical system not having a digital display unit. In this known optical system, which is also referred to as "conventional optical system" below, an intermediate image produced by the objective is imaged into the pupil of the eye of the observer or into the eye box as a virtual image. However, the boundary of an objective pupil in such a conventional optical system including an eyepiece and an objective simultaneously acts as a sharp boundary of the eye box, which can consequently also be referred to as "conjugate equipment pupil". The presence of the conjugate equipment pupil causes the observer to quickly perceive image trimming when they move their eye laterally outside of a respectively predefined tolerance range. This provides the observer with the information that they have departed from the predefined spatial region of the conjugate equipment pupil (i.e., the eye box), for which the conventional optical system, in accordance with its design, can still ensure a sharp image representation. Further, the observer is simultaneously informed with regards to the direction in which the pupil of the eye has to move in order to be located within the conjugate equipment pupil (i.e., the eye box) again.

An optical system with a digital display unit lacks such a conjugate equipment pupil since the light beams emitted by the digital display unit are in each case emitted into a broad and not sharply delimited solid angle range and are not, like in the case of a conventional optical system composed of objective and eyepiece, delimited by one or more apertures of the objective, with finite edges of lenses of the objective also being able to be apertures within this meaning. In the case of a known optical system with a digital display unit, this has as a consequence that the observer, when their eye position is laterally offset relative to the optical axis of this known optical system, perceives an unquestionably unsharp image when an admissible tolerance range is exceeded—i.e., when the eye box has been departed from—but this occurs (i) without a substantial reduction in the image brightness and/or (ii) without a partial or complete trimming of the perceived image. As it were, the eye of the observer is lacking the "guidance" by a clearly perceivable equipment pupil. Instead, the observer only perceives an unsharp image optionally containing unquestionably bothersome chromatic aberrations (in particular, color profiles over the image) and cannot unambiguously trace the cause of this back to their incorrect position of the pupil of the eye. This lack of guidance information for an eye of an observer can be perceived to be very bothersome and, in a worst-case scenario, may lead to the use of the known optical system including a digital display unit being refused.

SUMMARY

It is an object of the disclosure to provide an eyepiece that enables comfortable viewing, even for spectacle wearers.

The object is achieved by an optical system as described herein.

The optical system according to an aspect of the disclosure has an optical axis and includes a display unit for displaying an image. The display unit is arranged on the optical axis and has an edge. The edge limits the display unit. By way of example, a field emission visual display unit, a liquid crystal visual display unit, a thin film transistor visual display unit, a plasma visual display unit, a surface conduction electron emitter display (SED), or a visual display unit containing organic light-emitting diodes can be used as a display unit. The above enumeration is not exhaustive. Rather, any display unit suitable for the disclosure can be used.

Moreover, the optical system according to an aspect of the disclosure includes an eyepiece for observing the image. The eyepiece is provided with at least one lens unit.

The edge of the display unit is configured such that a marginal ray light beam emanates from the edge of the display unit and propagates to the lens unit in a light incidence direction. The marginal ray light beam has a plurality of light rays which form the marginal ray light beam. The marginal ray light beam has a chief ray. The chief ray is a ray of the marginal ray light beam which represents the marginal ray light beam when an aperture of the optical system is reduced to almost 0. In addition or as an alternative thereto, provision is made for the optical system according to an aspect of the disclosure to have the marginal ray light beam, the marginal ray light beam emanating from the edge of the display unit and propagating to the lens unit in a light incidence direction. The marginal ray light beam has a plurality of light rays which form the marginal ray light beam and the chief ray.

The display unit is arranged first along the optical axis in the light incidence direction, followed by the lens unit arranged on the optical axis. No further optical unit of the optical system is arranged between the lens unit and a pupil of the eye, for example a pupil of the eye of a person. This can also be expressed as follows: If, for example, the optical system includes a further optical unit in addition to the lens unit, then this optical unit is not arranged between the lens unit and the pupil of the eye, but rather between the lens unit and the display unit.

The optical system according to an aspect of the disclosure is configured such that the chief ray propagates at a first chief ray height at the lens unit, the first chief ray height being a first distance between the optical axis and the chief ray at the lens unit. Moreover, the display unit is configured such that the chief ray propagates at a second chief ray height at the display unit, the second chief ray height being a second distance between the optical axis and the chief ray at the display unit. In addition or as an alternative thereto, the optical system according to an aspect of the disclosure has the marginal ray light beam with the chief ray, with (i) the chief ray propagating at a first chief ray height at the lens unit, the first chief ray height being a first distance between the optical axis and the chief ray at the lens unit, and (ii) further, the chief ray propagates at a second chief ray height at the display unit, the second chief ray height being a second distance between the optical axis and the chief ray at the display unit.

Further, provision is made in the optical system according to an aspect of the disclosure for the first chief ray height to be at least level with the second chief ray height. In particular, provision is made for the first chief ray height to be larger in magnitude than the second chief ray height.

The optical system according to an aspect of the disclosure enables comfortable viewing, in particular for a spectacle wearer, since the eyepiece of the optical system according to an aspect of the disclosure can have both a large pupil distance (for example, approx. 18 mm) for a pupil of the eye with a diameter of 5 mm and a large half field angle (for example, approx. 27°). Further, the optical system according to an aspect of the disclosure enables an erection of an image without the arrangement of a further inversion system in the optical system according to an aspect of the disclosure being mandatory.

In an exemplary embodiment of the optical system according to an aspect of the disclosure, provision is additionally or alternatively made for the first distance to be the length of a first straight line which is aligned perpendicular to the optical axis and connects a first point on the optical axis to a second point on the chief ray at the lens unit. Further, provision is additionally or alternatively made for the second distance to be the length of a second straight line which is aligned perpendicular to the optical axis and connects a third point on the optical axis to a fourth point on the chief ray at the display unit.

In a further exemplary embodiment of the optical system according to an aspect of the disclosure, provision is additionally or alternatively made for the lens unit to have a first surface and a second surface. The first surface of the lens unit is arranged on a first side of the lens unit facing away from the display unit. Further, the second surface of the lens unit is arranged on a second side of the lens unit facing the display unit. A first plane is arranged on the first surface of the lens unit, the first straight line being located in the first plane. In addition or as an alternative, provision is made for the display unit to have a surface. The surface of the display unit is arranged on a side of the display unit facing the lens unit. Further, a second plane is arranged on the surface of the display unit. The second straight line is located in the second plane.

In yet a further exemplary embodiment of the optical system according to an aspect of the disclosure, provision is additionally or alternatively made for the optical system to have at least two identical lenses, which have an aspheric form. By way of example, provision is made for one of the identical lenses to be arranged on the optical axis with a first alignment and for the other of the identical lenses to be arranged on the optical axis with a second alignment. By way of example, the first alignment is rotated 180° with respect to the second alignment. In other words, the first alignment of one lens of the identical lenses is a reflection of the second alignment of the other lens of the identical lenses in a straight line, which is aligned perpendicular to the optical axis in particular. By way of example, the use of two identical lenses reduces the costs of producing the optical system according to an aspect of the disclosure.

In an exemplary embodiment of the optical system according to an aspect of the disclosure, provision is additionally or alternatively made for the optical system to include a first lens, a second lens, a third lens, a fourth lens, a fifth lens, and a sixth lens, with the first lens being arranged first along the optical axis as seen counter to the light incidence direction, followed by the second lens, then the third lens, then the fourth lens, then the fifth lens, and then the sixth lens. The first lens has positive refractive power. The second lens has negative refractive power. The third lens has positive refractive power. The fourth lens has positive refractive power. The fifth lens has positive refractive power, and the sixth lens has negative refractive power. By way of example, the first lens is designed as the aforementioned lens unit. In addition or as an alternative thereto, provision is made for this exemplary embodiment of the optical system according to an aspect of the disclosure to include at least one cemented member. Further additionally or in an alternative thereto, provision is made in this exemplary embodiment of the optical system according to an aspect of the disclosure for the first lens to have a surface directed at the pupil of the eye. This surface has an aspheric form. In addition or as an alternative, provision is made in this exemplary embodiment of the optical system according to an aspect of the disclosure for the sixth lens to have a surface directed at the display unit. This surface has an aspheric form. In the above exemplary embodiments of the optical system according to an aspect of the disclosure, it is possible for the first chief ray height to be 12 mm, for example, in the case of a pupil distance of 18 mm, for example, between a pupil of the eye and the lens unit. If use is made of a display unit whose display height is less than 12 mm, this may necessitate large positive refractive power immediately when the light from the display unit enters the eyepiece. Such a positive refractive power often leads to a small installation length of the optical system. A small installation length is often desirable. However, if no intermediate image is generated in the optical system, this short installation length makes it difficult to introduce correction units, for example in the form of lenses, into the optical system. The exemplary embodiments of the optical system according to an aspect of the disclosure explained below have a longer installation length than the embodiments of the optical system according to an aspect of the disclosure described hereabove, and so this disadvantage can be avoided.

In an exemplary embodiment of the optical system according to an aspect of the disclosure, provision is additionally or alternatively made for the optical system to have at least one intermediate image. The intermediate image is generated, for example, by at least one optical unit of the eyepiece. In particular, provision is additionally or alternatively made for the optical system according to an aspect of the disclosure to include a first concave lens surface and a second concave lens surface. The intermediate image is arranged between the first concave lens surface and the second concave lens surface. Additionally or alternatively, provision is made for the optical system according to an aspect of the disclosure to include a first meniscus-shaped lens with a first concave lens surface and a second meniscus-shaped lens with a second concave lens surface, the intermediate image being arranged between the first concave lens surface and the second concave lens surface. Further additionally or in an alternative, provision is made for the optical system according to an aspect of the disclosure to include a first meniscus-shaped cemented member with a first concave lens surface and a second meniscus-shaped cemented member with a second concave lens surface, the intermediate image being arranged between the first concave lens surface and the second concave lens surface.

In a further exemplary embodiment of the optical system according to an aspect of the disclosure, provision is additionally or alternatively made for exactly one lens to be arranged between the pupil of the eye and the intermediate image. In other words, a single lens is arranged between the pupil of the eye and the intermediate image. In particular, provision is made for the exactly one lens to have a bi-aspheric form. A bi-aspheric form is understood both above and below to mean the following exemplary embodiment: A lens has a first surface and a second surface arranged opposite to the first surface. Both the first surface and the second surface have an aspheric form.

In yet a further exemplary embodiment of the optical system according to an aspect of the disclosure, provision is additionally or alternatively made for the eyepiece to include a first lens group and a second lens group. As seen counter to the light incidence direction, the first lens group is arranged first along the optical axis, followed by the second lens group. The intermediate image is arranged between the first lens group and the second lens group. In addition or as an alternative thereto, provision is made for the optical system according to an aspect of the disclosure to include a third lens group. As seen counter to the light incidence direction, the first lens group is arranged first along the optical axis, followed by the second lens group and then the third lens group. In addition or as an alternative thereto, provision is made for the first lens group to include the lens unit.

In an exemplary embodiment of the optical system according to an aspect of the disclosure, provision is additionally or alternatively made for the first lens group to include a first lens, a second lens, a third lens, and a fourth lens, with, as seen counter to the light incidence direction, the first lens being arranged first along the optical axis, followed by the second lens, then the third lens, and then the fourth lens, the first lens having positive refractive power, the second lens having positive refractive power, the third lens having positive refractive power, and the fourth lens having negative refractive power. Further, the second lens group includes a fifth lens, a sixth lens, a seventh lens, an eighth lens, a ninth lens, a tenth lens, an eleventh lens, and a twelfth lens. As seen counter to the light incidence direction, the fifth lens is arranged first along the optical axis, followed by the sixth lens, then the seventh lens, then the eighth lens, then the ninth lens, then the tenth lens, then the eleventh lens, and then the twelfth lens, the fifth lens having positive refractive power, the sixth lens having positive refractive power, the seventh lens having negative refractive power, the eighth lens having negative refractive power, the ninth lens having positive refractive power, the tenth lens having positive refractive power, the eleventh lens having positive refractive power, and the twelfth lens having negative refractive power. In addition or as an alternative thereto, provision is made for the second lens group to include at least one meniscus-shaped cemented member. Further additionally or in an alternative thereto, provision is made for the second lens group to include at least one meniscus-shaped cemented member, the cemented member including a crown lens and a flint lens. In addition or as an alternative thereto, provision is made for the second lens group to include at least one meniscus-shaped cemented member. This meniscus-shaped cemented member has a concave side. The concave side is directed at a pupil arranged in the optical system. The pupil arranged in the optical system according to an aspect of the disclosure is arranged on the optical axis where the chief ray of the marginal ray light beam intersects the optical axis. Moreover, provision is additionally or alternatively made for the eighth lens of the second lens group and the ninth lens of the second lens group to form a first meniscus-shaped cemented member. Further, the eleventh lens of the second lens group and the twelfth lens of the second lens group form a second meniscus-shaped cemented member. Moreover, provision is additionally or alternatively made for the seventh lens of the second lens group to be in the form of a meniscus lens.

The aforementioned exemplary embodiments of the optical system according to an aspect of the disclosure having the twelve lenses are purely spherical exemplary embodiments of the optical system according to an aspect of the disclosure. In principle, each of these exemplary embodiments is a combination of an optical unit in the form of the first lens group with a relay system in the form of the second lens group, with the relay system imaging the image of the object displayed on the display unit onto the intermediate image. A pupil plane is arranged between the seventh lens and the eighth lens and is conjugate paraxially to the pupil of the eye. The fourth lens, the eighth lens, and the twelfth lens, each having negative refractive power, are made of a flint glass, for example. All other lenses of these exemplary embodiments of the optical system according to an aspect of the disclosure are formed from crown glass, for example. In the aforementioned exemplary embodiments, the Petzval sum is corrected, for example, by the fourth lens with negative refractive power and by the seventh lens, embodied for example as a meniscus lens, by the meniscus-shaped cemented member consisting of the eighth lens and the ninth lens, and by the meniscus-shaped cemented member consisting of the eleventh lens and the twelfth lens. In order to minimize the overall refractive power of the aforementioned individual lenses, the image plane on the display unit deviates significantly from telecentricity. There is therefore a negative exit pupil position, that is to say the exit pupil is located within the optical system according to an aspect of the disclosure with a strongly divergent chief ray at the display unit. The significant deviation from telecentricity therefore also substantially distinguishes these exemplary embodiments of the optical system according to an aspect of the disclosure from an eyepiece that is used on a refractor or a pair of field glasses of the prior art.

In a further exemplary embodiment of the optical system according to an aspect of the disclosure, provision is additionally or alternatively made for the first lens group to include a first lens and a second lens. As seen counter to the light incidence direction, the first lens is arranged first along the optical axis, followed by the second lens. The first lens has positive refractive power. The second lens has negative refractive power. Further, provision is made in this exemplary embodiment of the optical system according to an aspect of the disclosure for the second lens group to include a third lens, a fourth lens, a fifth lens, a sixth lens, and a seventh lens. As seen counter to the light incidence direction, the third lens is arranged first along the optical axis, followed by the fourth lens, then the fifth lens, then the sixth lens, and then the seventh lens. The third lens has negative refractive power. The fourth lens has positive refractive power. The fifth lens has negative refractive power. The sixth lens has positive refractive power and the seventh lens has positive refractive power. In addition or as an alternative thereto, provision is made for the first lens to have a bi-aspheric form. Further additionally or in an alternative thereto, provision is made for the second lens and/or the third lens to be in the form of a meniscus lens. In addition or as an alternative thereto, provision is made for the fourth lens to have a bi-aspheric form and for the fifth lens and the sixth lens to form a cemented member.

The above exemplary embodiment of the optical system according to an aspect of the disclosure including the seven lenses has a reduced number of lenses in comparison with the exemplary embodiment of the optical system according to an aspect of the disclosure explained further above. In this exemplary embodiment of the optical system according to an aspect of the disclosure, too, the intermediate image is arranged between the first lens group and the second lens group. Once again, the intermediate image is generated by the second lens group, which is essentially configured as a relay system. As mentioned above, the second lens and the third lens are in the form of a meniscus lens, for example. In particular, provision is made for the second lens and the third lens to be arranged such that the intermediate image is arranged between the second lens and the third lens, with no further optical unit of the optical system according to an aspect of the disclosure being arranged between the second lens and the intermediate image or between the third lens and the intermediate image. The second lens in the form of a meniscus lens and the third lens in the form of a meniscus lens serve to correct the Petzval sum, and thus contribute to flattening of the image field. The first lens and the fourth lens have a bi-aspheric form. This makes it possible to implement a beam deflection using lenses with a high refractive power. In the process, arising aberrations, in particular spherical aberrations, are corrected on account of the aspheric form of the first lens and the fourth lens. It is consequently possible to use a smaller number of lenses in the optical system in comparison with the exemplary embodiment of the optical system according to an aspect of the disclosure explained further above. This applies in particular to the first lens group, which in this exemplary embodiment of the optical system according to an aspect of the disclosure includes only two lenses, specifically the first lens and the second lens, on account of the bi-aspheric form of the first lens and the fourth lens. In addition, it is advantageous that a longitudinal chromatic aberration can be corrected by the cemented member, which is formed by the fifth lens and the sixth lens. The aforementioned cemented member is an achromatic cemented member, for example. In particular, provision is made for the fifth lens to be made of a flint glass, for example, and for the sixth lens to be made of a crown glass, for example. The further lenses of this exemplary embodiment of the optical system according to an aspect of the disclosure are formed from a crown glass, for example.

In a yet further exemplary embodiment of the optical system according to an aspect of the disclosure, provision is additionally or alternatively made for the first lens group to include a first lens and a second lens. As seen counter to the light incidence direction, the first lens is arranged first along the optical axis, followed by the second lens. The first lens has a bi-aspheric form. The second lens is in the form of a meniscus lens. Moreover, provision is made in this exemplary embodiment of the optical system according to an aspect of the disclosure for the second lens group to include a third lens, a fourth lens, a fifth lens, a sixth lens, a seventh lens, and an eighth lens. As seen counter to the light incidence direction, the third lens is arranged first along the optical axis, followed by the fourth lens, then the fifth lens, then the sixth lens, then the seventh lens, and then the eighth lens. The third lens is in the form of a meniscus lens. The fourth lens has a bi-aspheric form. Further, the seventh lens and the eighth lens form a cemented member. In addition or as an alternative thereto, provision is made for the first lens to have positive refractive power and for the second lens to have negative refractive power. As an alternative thereto, provision is made for the first lens to have positive refractive power and for the second lens to have positive refractive power. In addition or as an alternative thereto, provision is made for the third lens to have positive refractive power, for the fourth lens to have positive refractive power, for the fifth lens to have negative refractive power, for the sixth lens to have positive refractive power, for the seventh lens to have negative refractive power, and for the eighth lens to have positive refractive power. As an alternative thereto, provision is made for the third lens to have positive refractive power, for the fourth lens to have positive refractive power, for the fifth lens to have negative refractive power, for the sixth lens to have positive refractive power, for the seventh lens to have positive refractive power, and for the eighth lens to have negative refractive power.

As mentioned above, the above optical system according to an aspect of the disclosure includes eight lenses, the first lens for example having positive refractive power, the second lens for example having negative refractive power, the third lens for example having positive refractive power, the fourth lens for example having positive refractive power, the fifth lens for example having negative refractive power, the sixth lens for example having positive refractive power, the seventh lens for example having negative refractive power, and the eighth lens for example having positive refractive power. In this exemplary embodiment, provision is made in particular for the first lens and the fourth lens, which each have a bi-aspheric form, to have identical surface shapes, but to be arranged on the optical axis rotated relative to one another along the optical axis. In other words, the first lens is arranged on the optical axis with a first alignment and the fourth lens is arranged on the optical axis with a second alignment. By way of example, the first alignment is rotated 180° with respect to the second alignment. In other words, the first alignment of the first lens is a reflection of the second alignment of the fourth lens in a straight line, which is aligned perpendicular to the optical axis in particular. The use of two identical lenses, specifically the first lens and the fourth lens, for example reduces the costs of producing the optical system according to an aspect of the disclosure.

As mentioned above, the above optical system according to an aspect of the disclosure includes eight lenses, the first lens for example having positive refractive power, the second lens for example having positive refractive power, the third lens for example having positive refractive power, the fourth lens for example having positive refractive power, the fifth lens for example having negative refractive power, the sixth lens for example having positive refractive power, the seventh lens for example having positive refractive power, and the eighth lens for example having negative refractive power. In this exemplary embodiment, it is possible, for example, to reduce the installation length of the exemplary embodiments of the optical system according to an aspect of the disclosure explained further above from for example 100 mm to an installation length of, for example, 80 mm in this exemplary embodiment of the optical system according to an aspect of the disclosure, the installation length being measured from the pupil of the eye to the display unit. On account of the shorter installation length, the individual lenses of this exemplary embodiment of the optical system according to an aspect of the disclosure can have a larger refractive power than the lenses of the exemplary embodiments of the optical system according to an aspect of the disclosure explained further above. This could make it more difficult to correct the Petzval sum. However, the latter is corrected, for example, by virtue of the second lens and the third lens each being in the form of a meniscus lens, between which the intermediate image is arranged. The shortened installation length of this exemplary embodiment of the optical system according to an aspect of the disclosure leads to an increased number of lenses, specifically the eight lenses mentioned above, of which two lenses have a bi-aspheric form, specifically the first lens and the fourth lens.

In the exemplary embodiments of the optical system according to an aspect of the disclosure explained further above, the intermediate image in each case is in the immediate vicinity—for example at a distance of a few millimeters, in particular less than 3 mm—or even on an optical surface of one of the lenses of the exemplary embodiments of the optical system according to an aspect of the disclosure explained above. However, in the exemplary embodiment of the optical system according to an aspect of the disclosure below, it is possible to expose the intermediate image, and so the latter is arranged neither in the direct vicinity of, nor on, an optical surface of any one of the lenses of the optical system. In this exemplary embodiment of the optical system according to an aspect of the disclosure, provision is additionally or alternatively made for the lens group to include a single lens in the form of a first lens. Consequently, no further optical units are provided in the first lens group. The first lens has positive refractive power. Further, provision is made in this exemplary embodiment of the optical system according to an aspect of the disclosure for the second lens group to include a second lens, a third lens, a fourth lens, a fifth lens, and a sixth lens. As seen counter to the light incidence direction, the second lens is arranged first along the optical axis, followed by the third lens, then the fourth lens, then the fifth lens, and then the sixth lens. The second lens has positive refractive power. The third lens has negative refractive power. The fourth lens has positive refractive power. The fifth lens has positive refractive power and the sixth lens has negative refractive power. In addition or as an alternative thereto, provision is made for the first lens and/or the second lens to have a bi-aspheric form. In addition or as an alternative thereto, provision is made for the third lens to be in the form of a meniscus lens. Further, provision is additionally or alternatively made for the fifth lens and the sixth lens to form a cemented member. It is advantageous in this exemplary embodiment of the optical system according to an aspect of the disclosure that, as seen counter to the light incidence direction for example, the third lens, which is in the form of a meniscus lens, is arranged behind the second lens, which has a bi-aspheric form. This third lens adopts the correction of the Petzval sum. This makes it possible for the Petzval sum to be no longer corrected by optical units located in the vicinity of the intermediate image. Consequently, the intermediate image can be exposed. In other words, it is arranged between two lenses. The installation length of this exemplary embodiment of the optical system is 100 mm, for example. This makes it possible not to use any strongly refractive meniscus lenses between which the intermediate image is arranged. Rather, it is sufficient to use the third lens in the form of a meniscus lens, the latter adopting the correction of the Petzval sum.

The number of lenses should sometimes be minimized in an optical system according to an aspect of the disclosure. This is rendered possible with the following exemplary embodiment of the optical system according to an aspect of the disclosure. In this exemplary embodiment of the optical system according to an aspect of the disclosure, provision is made for the first lens group to include a single lens in the form of a first lens. Consequently, no further optical units are provided in the first lens group. The first lens has positive refractive power. Further, provision is made in this exemplary embodiment of the optical system according to an aspect of the disclosure for the second lens group to include a second lens, a third lens, and a fourth lens. As seen counter to the light incidence direction, the second lens is arranged first along the optical axis, followed by the third lens and then the fourth lens. The second lens has positive refractive power. The third lens likewise has positive refractive power. By contrast, the fourth lens has negative refractive power. In addition or as an alternative thereto, provision is made for the first lens and/or the second lens and/or the third lens to have a bi-aspheric form. The above exemplary embodiments of the optical system according to an aspect of the disclosure therefore include only four lenses. The installation length of this exemplary embodiment of the optical system according to an aspect of the disclosure is 200 mm, for example. On account of the large installation length, the provision of high refractive powers for the individual lenses is no longer mandatory. This allows a simple correction of the Petzval sum. By way of example, the correction of the Petzval sum is provided by the fourth lens. In addition or as an alternative thereto, provision is made for the fourth lens to carry out a correction of the longitudinal chromatic aberration. In particular, provision is made for the fourth lens to be made from a flint glass.

In order to use the optical system according to an aspect of the disclosure, for example in a refractor or in a pair of field glasses, it is desirable to generate, for example, a telecentric embodiment of an image space. In other words, the chief rays of all light beams should propagate parallel to the optical axis. This can be provided, for example, by the following exemplary embodiment of the optical system according to an aspect of the disclosure. In this exemplary embodiment of the optical system according to an aspect of the disclosure, provision is additionally or alternatively made for the first lens group to include a single lens in the form of a first lens. Consequently, the first lens group includes no further optical unit. The first lens has positive refractive power. Further, provision is made in this exemplary embodiment of the optical system according to an aspect of the disclosure for the second lens group to include a second lens, a third lens, a fourth lens, a fifth lens, and a sixth lens. Counter to the light incidence direction, the second lens is arranged first along the optical axis, followed by the third lens, then the fourth lens, then the fifth lens, and then the sixth lens. The second lens has positive refractive power. The third lens has negative refractive power. The fourth lens has negative refractive power. The fifth lens has positive refractive power and the sixth lens has positive refractive power. In addition or as an alternative thereto, provision is made for the first lens and/or the second lens to have a bi-aspheric form. Further, in addition or as an alternative thereto, provision is made for the sixth lens to have an aspheric form and for the fourth lens and the fifth lens to form a cemented member. The Petzval sum is corrected by the sixth lens.

A further exemplary embodiment of the optical system according to an aspect of the disclosure, in which a telecentric embodiment of the image space is implemented, additionally or alternatively includes a first lens group which is provided with a single lens in the form of a first lens. Consequently, the first lens group includes no further optical units. The first lens has positive refractive power. Further, provision is made in this exemplary embodiment of the optical system according to an aspect of the disclosure for the second lens group to include a second lens, a third lens, a fourth lens, a fifth lens, a sixth lens, and a seventh lens. As seen counter to the light incidence direction, the second lens is arranged first along the optical axis, followed by the third lens, then the fourth lens, then the fifth lens, then the sixth lens, and then the seventh lens. The second lens has positive refractive power. The third lens has negative refractive power. The fourth lens has negative refractive power. The fifth lens has positive refractive power. The sixth lens has positive refractive power and the seventh lens has positive refractive power. In addition or as an alternative thereto, provision is made for the first lens and/or the second lens to have a bi-aspheric form. In addition or as an alternative thereto, provision is made for the fourth lens and the fifth lens to form a cemented member.

In a further exemplary embodiment of the optical system according to an aspect of the disclosure, provision is additionally or alternatively made for the optical system to be in the form of a dioptric system. In other words, the optical system according to an aspect of the disclosure includes only lenses. Additionally or alternatively, provision can be made for the optical system according to an aspect of the disclosure to include at least one planar folding mirror, which in particular has no optical refractive power. Thus, this exemplary embodiment of the optical system according to an aspect of the disclosure likewise is a dioptric system.

In an even further exemplary embodiment of the optical system according to an aspect of the disclosure, provision is additionally or alternatively made for a distance from the pupil of the eye to the lens unit to be larger than one focal length of the optical system. By way of example, the distance from the pupil of the eye to the lens unit is at least 1.25 times larger than the focal length of the optical system. As an alternative thereto, the distance from the pupil of the eye to the lens unit is at least 1.5 times larger than the focal length of the optical system. Further additionally or in an alternative thereto, the distance from the pupil of the eye to the lens unit is at least 1.7 times larger than one focal length of the optical system.

The disclosure also relates to a pair of field glasses, a refractor, a telescope, a light microscope or a piece of night vision equipment, which includes an optical system according to an aspect of the disclosure having one of the features mentioned above or below or having a combination of at least two of the features mentioned above or below.

It is another object of the disclosure to provide an optical system including a display unit which has a boundary of the eye box that guides the eye of an observer. In other words, the intention is to provide an optical system including a display unit, in which the observer can directly and intuitively perceive when their eye position leaves the admissible region of the eye box and in which the observer is moreover provided with feedback regarding the direction and distance that they should move their eye laterally relative to the optical axis of the optical system in order to be sufficiently centered again with respect to the optical axis of the optical system.

According to an aspect of the disclosure, this object is achieved by a further optical system which has at least one of the following features or a combination of at least two of the following features. In particular, the further optical system according to an aspect of the disclosure is embodied as an optical system which has at least one of the features described above or a combination of at least two of the features described above.

The further optical system according to an aspect of the disclosure has an optical axis and includes a display unit for displaying an image. The display unit is arranged on the optical axis. By way of example, the display unit is a digital display unit. In particular, a field emission visual display unit, a liquid crystal visual display unit, a thin film transistor visual display unit, a plasma visual display unit, an SED, or a visual display unit containing organic light-emitting diodes can be used as a display unit. The above enumeration is not exhaustive. Rather, any display unit suitable for the disclosure can be used.

Moreover, the further optical system according to an aspect of the disclosure includes an eyepiece for observing the image using at least one eye, with the optical axis running through the eyepiece. Further, a pre-definable spatial region is arranged at the eyepiece, in which spatial region the eye can move in such a way without a pre-definable threshold value of an image quality of an image representation of the image produced by the eyepiece being undershot. The spatial region has, for example, a diameter of 3 mm, 5 mm, or 7 mm and is arranged around the centered position of the eye on the optical axis, typically symmetrically around the centered position of the eye on the optical axis. The pre-definable region is the eye box, which has already been defined above. As seen in the direction of the spatial region starting from the display unit, the display unit is arranged first in a light incidence direction, followed by the eyepiece and then the spatial region.

The eyepiece of the further optical system according to an aspect of the disclosure includes at least a first lens group and at least a second lens group, wherein, as seen counter to the light incidence direction, the first lens group is arranged first along the optical axis, followed by the second lens group. The first lens group may also be referred to as a pupil relay unit. The second lens group may also be referred to as further optical assembly. A lens group is understood to mean a group containing at least one optical assembly, for example in the form of a lens. In particular, provision is made for the lens group to include only a single lens or a plurality of lenses.

Further, an intermediate pupil is arranged between the first lens group and the second lens group. The second lens group is configured to image the image displayed by the display unit into the intermediate pupil. Moreover, the first lens group is configured to image the image arranged in the intermediate pupil into the spatial region. The intermediate pupil and the spatial region are conjugate to one another. Further, an aperture unit is arranged at the intermediate pupil. In other words, the aperture unit is arranged at the location of the intermediate pupil. Expressed differently yet again, the aperture unit is arranged in a plane at the location of the intermediate pupil.

The further optical system according to an aspect of the disclosure is advantageous in that it basically provides a conjugate equipment pupil. This allows the observer to directly and intuitively perceive their eye position departing from the admissible region of the eye box. Further, the observer is provided with feedback regarding the direction and distance that they should move their eye laterally relative to the optical axis of the further optical system according to the disclosure, in order to be sufficiently centered again with respect to the optical axis of the further optical system according to an aspect of the disclosure.

In an exemplary embodiment of the further optical system according to an aspect of the disclosure, provision is additionally or alternatively made for the aperture unit to be embodied as a mechanical aperture unit.

In a further exemplary embodiment of the further optical system according to an aspect of the disclosure, provision is additionally or alternatively made for the aperture unit to be provided with a circular aperture, with a size of the aperture being fixedly predetermined or adjustable. In addition or as an alternative thereto, provision is made for the aperture unit to be provided with an elliptical aperture, with a size of the aperture being fixedly predetermined or adjustable. An elliptical aperture is advantageous for the provision of an eye box which has different extents vertically and horizontally. In the case of equipment for binocular observation (e.g., a pair of field glasses or a microscope with a binocular eyepiece) in particular, an eye box with a horizontal (lateral) extent that is larger than the vertical extent of the eye box is often advantageous since, in addition to the unavoidable head movement of the observer, additional play is desirable for taking account of the interpupillary distances, which are different for different people, between a right eye and a left eye.

Explicit reference is made to the fact that the disclosure is not restricted to the aforementioned aperture shapes. Instead, the aperture may have any shape that is suitable for the disclosure and/or required for a desired shape of the eye box.

In yet a further exemplary embodiment of the further optical system according to an aspect of the disclosure, provision is additionally or alternatively made for the first lens group to have an intermediate caustic. In this context, both above and below, an intermediate caustic refers to an intermediate image in which the light rays emanating from a field point intersect at different axial positions in the two principal sections, with the result that no perceivable intermediate image is present in the conventional sense. The intermediate caustic may be a plane and corrected intermediate image. However, the intermediate caustic need not be in the form of the above-described intermediate image. The intermediate caustic can facilitate the design of eyepieces with a large eye box and, at the same time, a short focal length.

In yet an even further exemplary embodiment of the further optical system according to an aspect of the disclosure, provision is additionally or alternatively made for a first beam to propagate from a first location on the display unit in the light incidence direction, for a second beam to propagate from a second location on the display unit in the light incidence direction, and for at least 70% or at least 80% or at least 90% of the first beam and the second beam to overlap at the intermediate pupil. In other words, this exemplary embodiment of the further optical system according to an aspect of the disclosure provides for the first beam to propagate from the first location on the display unit in the light incidence direction, for the second beam to propagate from the second location on the display unit in the light incidence direction, and for the second lens group to be configured such that at least 70% or at least 80% or at least 90% of the first beam and the second beam overlap at the intermediate pupil. The aforementioned exemplary embodiment ensures that the intermediate pupil is imaged by the first lens group in the eye box without significant imaging aberrations, with the result that a one-to-one correspondence between the positions in the eye box and the corresponding positions in the conjugate intermediate pupil is maintained. All beams emanating from the various regions of the display unit are uniformly vignetted by the aperture arranged in the plane of the intermediate pupil. This ensures that the observer, when the pupil of their eye is laterally offset, perceives a reduction in the image brightness that occurs uniformly over the entire region of the display unit before, ultimately, there is complete trimming of the image.

The further optical system according to an aspect of the disclosure is summarized again below;

(i) A further optical system including an optical axis, a display unit for displaying an image, in particular a digital display unit, the display unit being arranged on the optical axis, an eyepiece for viewing the image with at least one eye, the optical axis running through the eyepiece; and including a pre-definable spatial region arranged at the eyepiece, in which spatial region the eye is movable such that without a pre-definable threshold value of an image quality of an image representation of the image produced by the eyepiece is undershot, wherein, as seen in the direction of the spatial region starting from the display unit, the display unit is arranged first in a light incidence direction, followed by the eyepiece and then the spatial region, wherein the eyepiece includes at least a first lens group and at least a second lens group, wherein, as seen counter to the light incidence direction, the first lens group is arranged first along the optical axis, followed by the second lens group, wherein an intermediate pupil is arranged between the first lens group and the second lens group, wherein the second lens group is configured to image the image displayed by the display unit into the intermediate pupil, wherein the first lens group is configured to image the image arranged in the intermediate pupil into the spatial region, wherein the intermediate pupil and the spatial region are conjugate to one another, and wherein an aperture unit is arranged at the intermediate pupil, the aperture unit trimming beams emanating from the display unit.

(ii) The optical system has at least one of the features specified above or below or a combination of at least two of the features specified above or below, wherein the aperture unit is configured as a mechanical aperture unit.

(iii) The optical system has at least one of the features provided above or below or a combination of at least two of the features specified above or below, wherein the aperture unit has a circular aperture, with a size of the aperture being fixedly predetermined or adjustable.

(iv) The optical system has at least one of the features provided above or below or a combination of at least two of the features specified above or below, wherein the aperture unit has an elliptical aperture, with the size of the aperture being fixedly predetermined or adjustable.

(v) The optical system has at least one of the features provided above or below or a combination of at least two of the features specified above or below, wherein the first lens group has an intermediate caustic.

(vi) The optical system has at least one of the features provided above or below or a combination of at least two of the features specified above or below, wherein a first beam propagates from a first location on the display unit in the light incidence direction, wherein a second beam propagates from a second location on the display unit in the light incidence direction, and wherein at least 70% or at least 80% or at least 90% of the first beam and the second beam overlap at the intermediate pupil.

(vii) The optical system has at least one of the features provided above or below or a combination of at least two of the features specified above or below, wherein the first beam propagates from the first location on the display unit in the light incidence direction, wherein the second beam propagates from the second location on the display unit in the light incidence direction, and wherein the second lens group is configured such that at least 70% or at least 80% or at least 90% of the first beam and the second beam overlap at the intermediate pupil.

The disclosure also relates to an optical device including the further optical system according to an aspect of the disclosure with one of the features mentioned above or below or with a combination of at least two of the features mentioned above or below. By way of example, the optical device is in the form of a pair of field glasses, a refractor, a telescope, a light microscope, or a piece of night vision equipment.

BRIEF DESCRIPTION OF THE DRAWINGS

The invention will now be described with reference to the drawings wherein:

FIG. 3 shows system data of the optical system in accordance with FIG. 2;

FIG. 6 shows system data of the optical system in accordance with FIG. 5;

FIG. 9 shows system data of the optical system in accordance with FIG. 8;

FIG. 12 shows system data of the optical system in accordance with FIG. 11;

FIG. 15 shows system data of the optical system in accordance with FIG. 14;

FIG. 18 shows system data of the optical system in accordance with FIG. 17;

FIG. 21 shows system data of the optical system in accordance with FIG. 20;

FIG. 24 shows system data of the optical system in accordance with FIG. 23;

FIG. 27 shows system data of the optical system in accordance with FIG. 26;

FIG. 38 shows system data of the optical system in accordance with FIG. 29; and

FIG. 39 shows asphere coefficients for surfaces of the optical system in accordance with FIG. 29.

DESCRIPTION OF EXEMPLARY EMBODIMENTS

The optical system according to an exemplary embodiment of the disclosure will now be explained in more detail using a piece of night vision equipment. Explicit reference is made to the fact that the disclosure is not restricted to the use in night vision equipment. Instead, the disclosure can be used for any optical equipment for which the disclosure is suitable. By way of example, the optical system according to an exemplary embodiment of the disclosure is arranged in a pair of field glasses, in a refractor, in a telescope, in a spotting scope, or in a light microscope.

Figure 1:
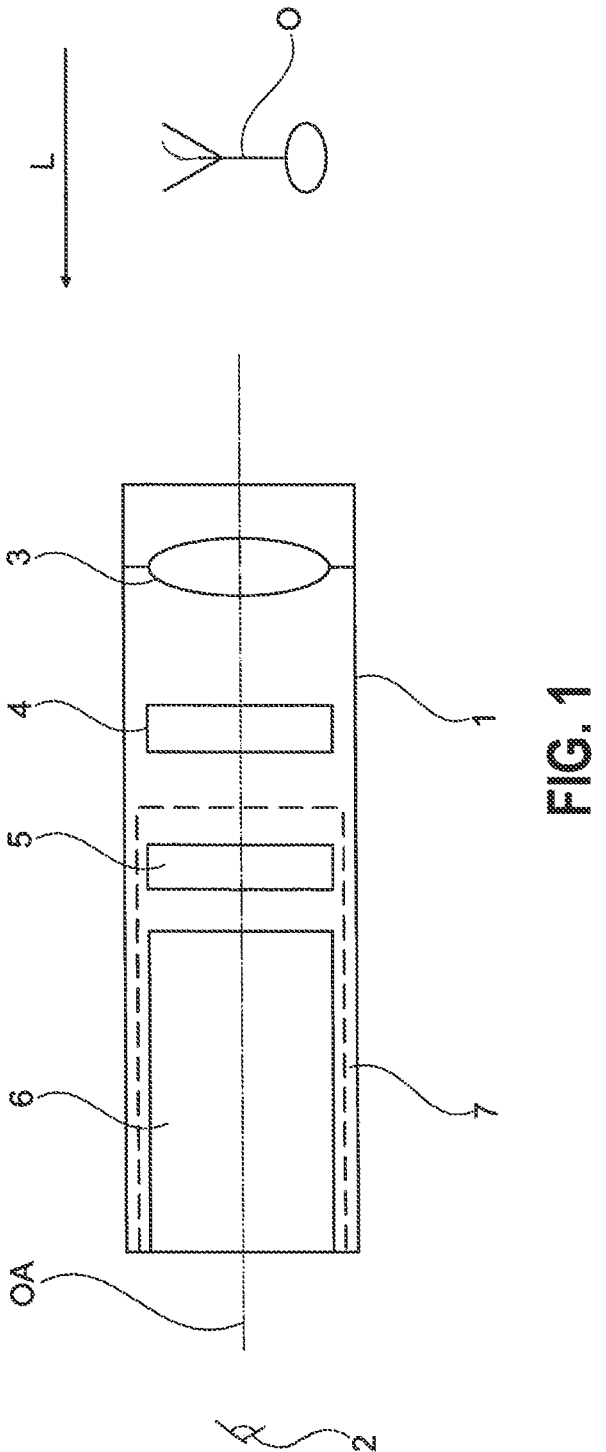
FIG. 1 shows a schematic representation of a piece of night vision equipment having an optical system according to an exemplary embodiment of the disclosure.

FIG. 1 shows a schematic representation of a piece of night vision equipment 1, with which a user of the piece of night vision equipment 1 can observe an object O by placing an eye 2 against the piece of night vision equipment 1. The piece of night vision equipment 1 includes an objective 3 and a detector 4. The detector 4 detects light rays which pass from the object O through the objective 3 and generates detection signals. These detection signals are electronically converted in such a way that they are presented as an image on a display or display unit 5. Further, the piece of night vision equipment 1 includes an eyepiece 6, with which the user of the piece of night vision equipment 1 can observe the image presented on the display unit 5.

By way of example, the detector 4 can be in the form of a charge-coupled device (CCD) detector or complementary metal-oxide-semiconductor (CMOS) detector. However, the disclosure is not restricted to the aforementioned exemplary embodiment. Rather, the detector 4 can be any detector suitable for the disclosure.

By way of example, a field emission visual display unit, a liquid crystal visual display unit, a thin film transistor visual display unit, a plasma visual display unit, an surface conduction electron emitter display (SED), or a visual display unit containing organic light-emitting diodes can be used as a display unit 5. The above enumeration is not exhaustive. Rather, any display unit suitable for the disclosure can be used as display unit 5.

As depicted in FIG. 1, the light rays originating from the object O enter the piece of night vision equipment 1 in a light incidence direction L. Therefore, the light rays initially pass through the objective 3 and are subsequently detected by the detector 4.

By way of example, the arrangement of the abovementioned units of the piece of night vision equipment 1 along an optical axis OA of the piece of night vision equipment 1 can be described as follows: As seen counter to the light incidence direction L, that is to say as seen from the eye 2 in the direction of the object O, the eyepiece 6 is arranged first along the optical axis OA of the piece of night vision equipment 1, followed by the display unit 5, then the detector 4, and then the objective 3.

An optical system according to an exemplary embodiment of the disclosure is depicted using dashed lines in FIG. 1 and provided with reference sign 7. The optical system 7 according to the exemplary embodiment of the disclosure includes the eyepiece 6 and the display unit 5.

Exemplary embodiments of the optical system 7 according to an aspect of the disclosure are explained in more detail below.

Figures 2, 4:
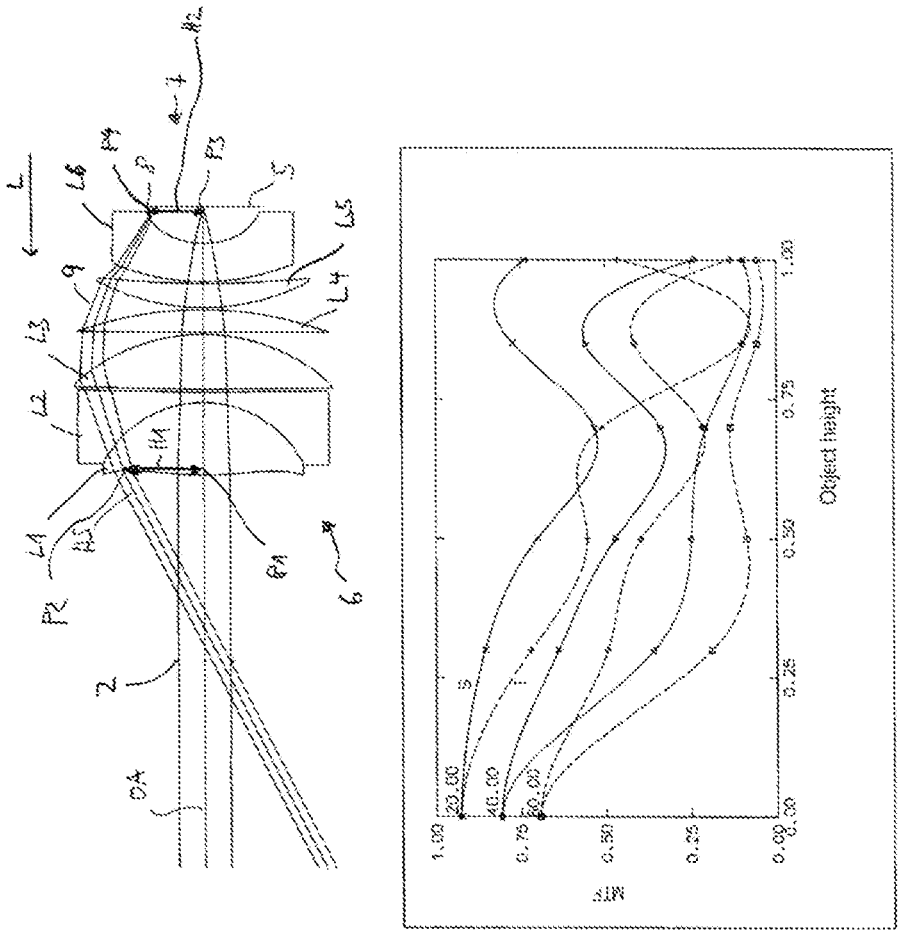
FIG. 2 shows a schematic representation of an optical system according to a first exemplary embodiment of the disclosure.
FIG. 4 shows curves of the modulation transfer function (MTF) as a function of the object height for the exemplary embodiment of the optical system in accordance with FIGS. 2 and 3.

FIG. 2 shows the optical system 7 according to a first exemplary embodiment of the disclosure, which has an optical axis OA that corresponds to the optical axis OA of the piece of night vision equipment 1. The eyepiece 6 of the optical system 7 according to the first exemplary embodiment of the disclosure includes a first lens L1, a second lens L2, a third lens L3, a fourth lens L4, a fifth lens L5, and a sixth lens L6.

As seen counter to the light incidence direction L, the first lens L1 is arranged first along the optical axis OA, followed by the second lens L2, then the third lens L3, then the fourth lens L4, then the fifth lens L5, and then the sixth lens L6. The first lens L1 has positive refractive power. The second lens L2 has negative refractive power. The third lens L3 has positive refractive power. The fourth lens L4 has positive refractive power. The fifth lens L5 has positive refractive power and the sixth lens L6 has negative refractive power. The first lens L1 and the second lens L2 form a cemented member.

The first lens L1 forms the aforementioned lens unit of the optical system 7 according to an exemplary embodiment of the disclosure. As seen in the light incidence direction L, the display unit 5 is arranged first along the optical axis OA, followed by the first lens L1 along the optical axis OA. No further optical unit of the optical system 7 is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS is a ray of the marginal ray light beam 9 which represents the marginal ray light beam 9 when an aperture of the optical system 7 is reduced to almost 0. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 12 mm and the second chief ray height H2 is approximately 10 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 2 emerge from the upper table in FIG. 3. The upper table in FIG. 3 is based on an incoming beam radius of 2.5 mm, an entrance angle of 27°, and an effective focal length of the optical system 7 according to an exemplary embodiment of the disclosure of 10.814 mm. The surface 0 denotes a surface at an infinite distance in front of the optical system 7 on the side of the eye 2 such that light can enter the optical system 7 in collimated fashion. The surface 1 denotes the surface of the eye pupil of the eye 2. The first lens L1 has a surface 2 directed at the eye 2. The second lens L2 has a surface 3 directed at the eye 2 and a surface 4 directed at the display unit 5. The third lens L3 has a surface 5 directed at the eye 2 and a surface 6 directed at the display unit 5. The fourth lens L4 has a surface 7 directed at the eye 2 and a surface 8 directed at the display unit 5. The fifth lens L5 has a surface 9 directed at the eye 2 and a surface 10 directed at the display unit 5. Further, the sixth lens L6 has a surface 11 directed at the eye 2 and a surface 12 directed at the display unit 5. The surface 13 denotes the surface of the display unit 5. Further, the upper table in FIG. 3 specifies the radii of the individual surfaces and the thicknesses of the individual lenses of the optical system 7 according to the exemplary embodiment of the disclosure in accordance with FIG. 2, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The upper table in FIG. 3 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are specified in the upper table in FIG. 3.

The first lens L1 has the surface 2 directed at the eye pupil of the eye 2. The surface 2 has an aspheric form. Further, the sixth lens L6 has the surface 12 directed at the display unit 5. The surface 12 has an aspheric form. The aspheric form of the two aforementioned surfaces is determined by the asphere formula, which is given by $$z(h) = \frac{h^2}{R \cdot \left(1 + \sqrt{1 - (1+k) \cdot \frac{h^2}{R^2}}\right)} + \sum_{i=2}^{M} C_{i-1} h^{2i} \qquad [1]$$

where
(i) z is the surface sagitta value,
(ii) h is the height of incidence of a light ray on the aspheric surface of the lens,
(iii) k is the conic constant,
(iv) R is the vertex radius of the surface, and
(v) $C_i$ are asphere coefficients The asphere coefficients and the conic constant are provided in the lower table in FIG. 3.

FIG. 4 shows curves of the modulation transfer function (MTF) as a function of the object height for the optical system 7 according to the exemplary embodiment of the disclosure in accordance with FIGS. 2 and 3. Shown are a sagittal contrast curve S (shown in solid lines) and a tangential contrast curve T (shown in dashed lines) for 20 line pairs per millimeter, 40 line pairs per millimeter, and 60 line pairs per millimeter.

The optical system 7 according to the exemplary embodiment of the disclosure in accordance with FIGS. 2 to 4 allows the first chief ray height H1 to be able to be for example 9 mm in the case of a pupil distance of for example 18 mm between the eye pupil of the eye 2 and the first lens L1. If use is made of a display unit 5 whose display height is less than 9 mm, this may necessitate large negative refractive power immediately when the light from the display unit 5 enters the eyepiece 6. Such a negative refractive power leads to a divergence of the chief ray away from the optical axis OA. However, the negative refractive power initially has practically no effect on the marginal ray light beam 9. In order to ensure the convergence of the chief ray HS to the pupil of the eye, a strong positive refractive power must be introduced into the optical system 7 downstream. This strong positive refractive power, for instance in the form of the third lens L3, the fourth lens L4, and the fifth lens L5, leads to a strong shortening of the optical system 7, since the strong positive refractive power now has a strong effect on the marginal ray light beam 9 and thus very quickly collimates the light emanating from the display unit 5. As a result, the optical system 7 is shortened. Finally, on account of this short installation length, it is difficult to introduce correction units, for example in the form of lenses, into the optical system 7. The optical system 7 according to the exemplary embodiments of the disclosure explained below have a longer installation length than the optical system 7 according to the exemplary embodiment of the disclosure described in FIGS. 2 to 4, and so this disadvantage can be avoided.

Figures 5, 7:
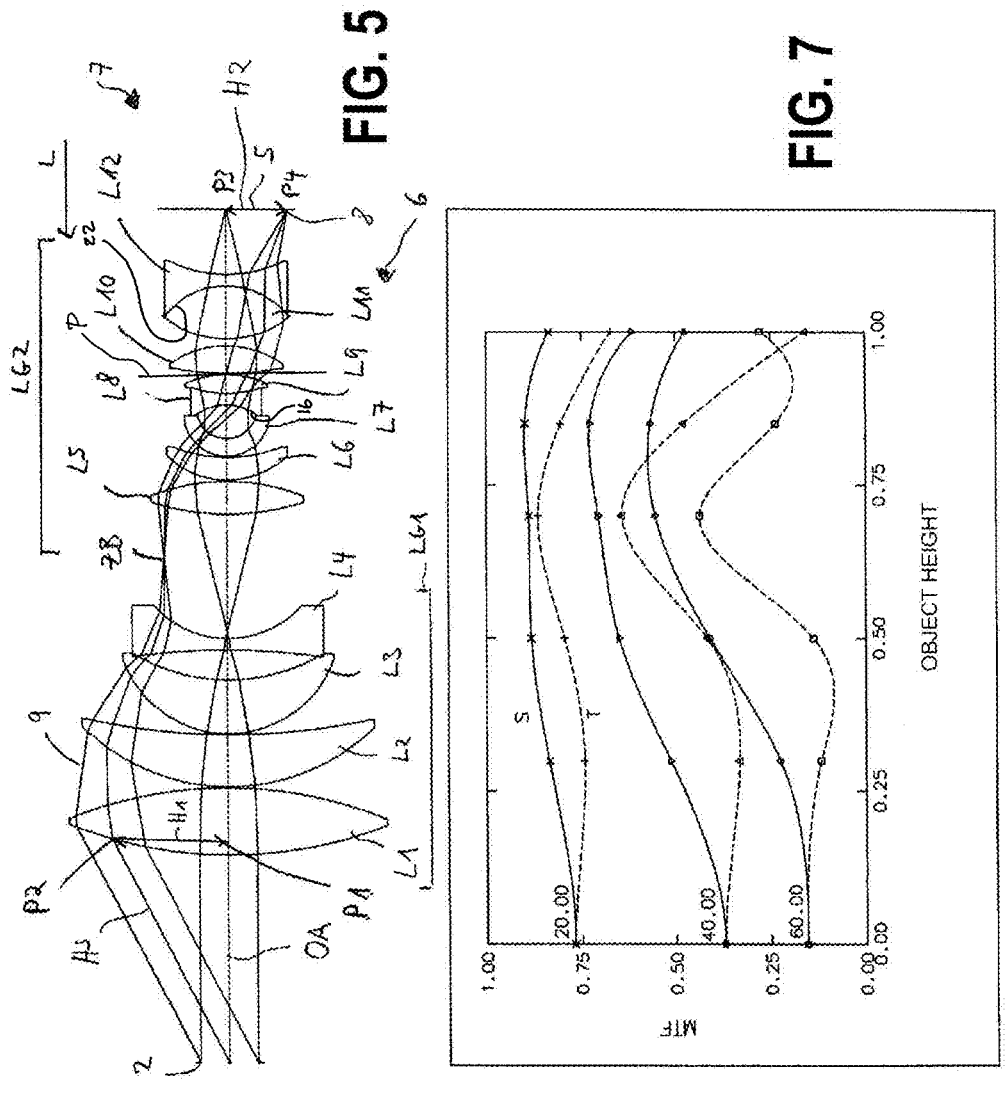
FIG. 5 shows a schematic representation of an optical system according to a second exemplary embodiment of the disclosure.
FIG. 7 shows curves of the modulation transfer function (MTF) as a function of the object height for the exemplary embodiment of the optical system in accordance with FIGS. 5 and 6.

FIG. 5 shows the optical system 7 according to a second exemplary embodiment of the disclosure, which has an optical axis OA that corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. An intermediate image ZB is arranged between the first lens group LG1 and the second lens group LG2.

The first lens group LG1 of the optical system 7 according to the exemplary embodiment of the disclosure in accordance with FIG. 5 includes a first lens L1, a second lens L2, a third lens L3, and a fourth lens L4. As seen counter to the light incidence direction L, the first lens L1 is arranged first along the optical axis OA, followed by the second lens L2, then the third lens L3, and then the fourth lens L4, the first lens L1 having positive refractive power, the second lens L2 having positive refractive power, the third lens L3 having positive refractive power, and the fourth lens L4 having negative refractive power.

The second lens group LG2 of the optical system 7 according to the exemplary embodiment of the disclosure in FIG. 5 includes a fifth lens L5, a sixth lens L6, a seventh lens L7, an eighth lens L8, a ninth lens L9, a tenth lens L10, an eleventh lens L11, and a twelfth lens L12. As seen counter to the light incidence direction L, the fifth lens L5 is arranged first along the optical axis OA, followed by the sixth lens L6, then the seventh lens L7, then the eighth lens L8, then the ninth lens L9, then the tenth lens L10, then the eleventh lens L11, and then the twelfth lens L12, the fifth lens L5 having positive refractive power, the sixth lens L6 having positive refractive power, the seventh lens L7 having negative refractive power, the eighth lens L8 having negative refractive power, the ninth lens L9 having positive refractive power, the tenth lens L10 having positive refractive power, the eleventh lens L11 having positive refractive power, and the twelfth lens L12 having negative refractive power.

The seventh lens L7 is meniscus shaped. Further, the eighth lens L8 and the ninth lens L9 form a first meniscus-shaped cemented member. Moreover, the eleventh lens L11 and the twelfth lens L12 form a second meniscus-shaped cemented member. At least one of the aforementioned cemented members may have a concave side. The concave side is directed at a pupil arranged in the optical system 7 according to an exemplary embodiment of the disclosure. The pupil P arranged in the optical system 7 according to the exemplary embodiment of the disclosure is arranged on the optical axis OA where a chief ray HS of a marginal ray light beam 9 intersects the optical axis OA.

In the optical system 7 according to the exemplary embodiment of the disclosure of FIG. 5, too, the first lens L1 forms the aforementioned lens unit of the optical system 7 according to the exemplary embodiment of the disclosure. As seen in the light incidence direction L, the display unit 5 is arranged first along the optical axis OA, followed by the first lens L1 along the optical axis OA. No further optical unit of the optical system 7 is arranged between the first lens L1 and an eye pupil of the eye 2.

The marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is the chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 10 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 5 emerge from the table in FIG. 6. The table in FIG. 6 is based on an incoming beam radius of 2.5 mm, an entrance angle of 27°, and an effective focal length of the optical system 7 according to the exemplary embodiment of the disclosure of −10.914 mm. The surface 0 denotes a surface at an infinite distance in front of the optical system 7 on the side of the eye 2 such that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2 and a surface 9 directed at the display unit 5. The fifth lens L5 has a surface 10 directed at the eye 2 and a surface 11 directed at the display unit 5. Further, the sixth lens L6 has a surface 12 directed at the eye 2 and a surface 13 directed at the display unit 5. The seventh lens L7 has a surface 14 directed at the eye 2 and a surface 15 directed at the display unit 5. The eighth lens L8 has a surface 16 directed at the eye 2. The ninth lens L9 has a surface 17 directed at the eye 2 and a surface 18 directed at the display unit 5. The tenth lens L10 has a surface 19 directed at the eye 2 and a surface 20 directed at the display unit 5. The eleventh lens L11 has a surface 21 directed at the eye 2. Further, the twelfth lens L12 has a surface 22 directed at the eye 2 and a surface 23 directed at the display unit 5. The surface 24 denotes the surface of the display unit 5. Further, the table in FIG. 6 specifies the radii of the individual surfaces and the thicknesses of the individual lenses of the optical system 7 according to an exemplary embodiment of the disclosure in accordance with FIG. 5, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The table in FIG. 6 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are specified in the table in FIG. 6.

FIG. 7 shows curves of the modulation transfer function (MTF) as a function of the object height for the optical system 7 according to the exemplary embodiment of the disclosure in accordance with FIGS. 5 and 6. Shown are a sagittal contrast curve S (shown in solid lines) and a tangential contrast curve T (shown in dashed lines) for 20 line pairs per millimeter, 40 line pairs per millimeter, and 60 line pairs per millimeter.

The optical system 7 according to an exemplary embodiment of the disclosure in accordance with FIGS. 5 to 7 is a purely spherical embodiment. In principle, this exemplary embodiment is a combination of an optical unit in the form of the first lens group LG1 with a relay system in the form of the second lens group LG2, with the relay system imaging the image of the object O displayed on the display unit 5 onto the intermediate image ZB. The pupil plane is arranged between the seventh lens L7 and the eighth lens L8 and is conjugate paraxially to the pupil of the eye. The fourth lens L4, the eighth lens L8, and the twelfth lens L12, each having negative refractive power, are made of a flint glass, for example. All further lenses of the optical system 7 according to this exemplary embodiment of the disclosure are formed from a crown glass, for example. In the optical system 7 according to this exemplary embodiment of the disclosure, the Petzval sum is corrected, for example, by the fourth lens L4 with negative refractive power and by the seventh lens L7 embodied as a meniscus lens, by the meniscus-shaped cemented member consisting of the eighth lens L8 and the ninth lens L9, and by the meniscus-shaped cemented member including the eleventh lens L11 and the twelfth lens L12. In order to minimize the overall refractive power of the aforementioned individual lenses, the image plane on the display unit 5 deviates significantly from telecentricity. There is therefore a negative exit pupil position, that is to say the exit pupil is located within the optical system 7 according to an exemplary embodiment of the disclosure with a strongly divergent chief ray HS at the display unit 5. The significant deviation from telecentricity therefore also substantially distinguishes the optical system 7 according to this exemplary embodiment of the disclosure from an eyepiece that is used on a refractor or a pair of field glasses of the prior art.

Figures 8, 10:
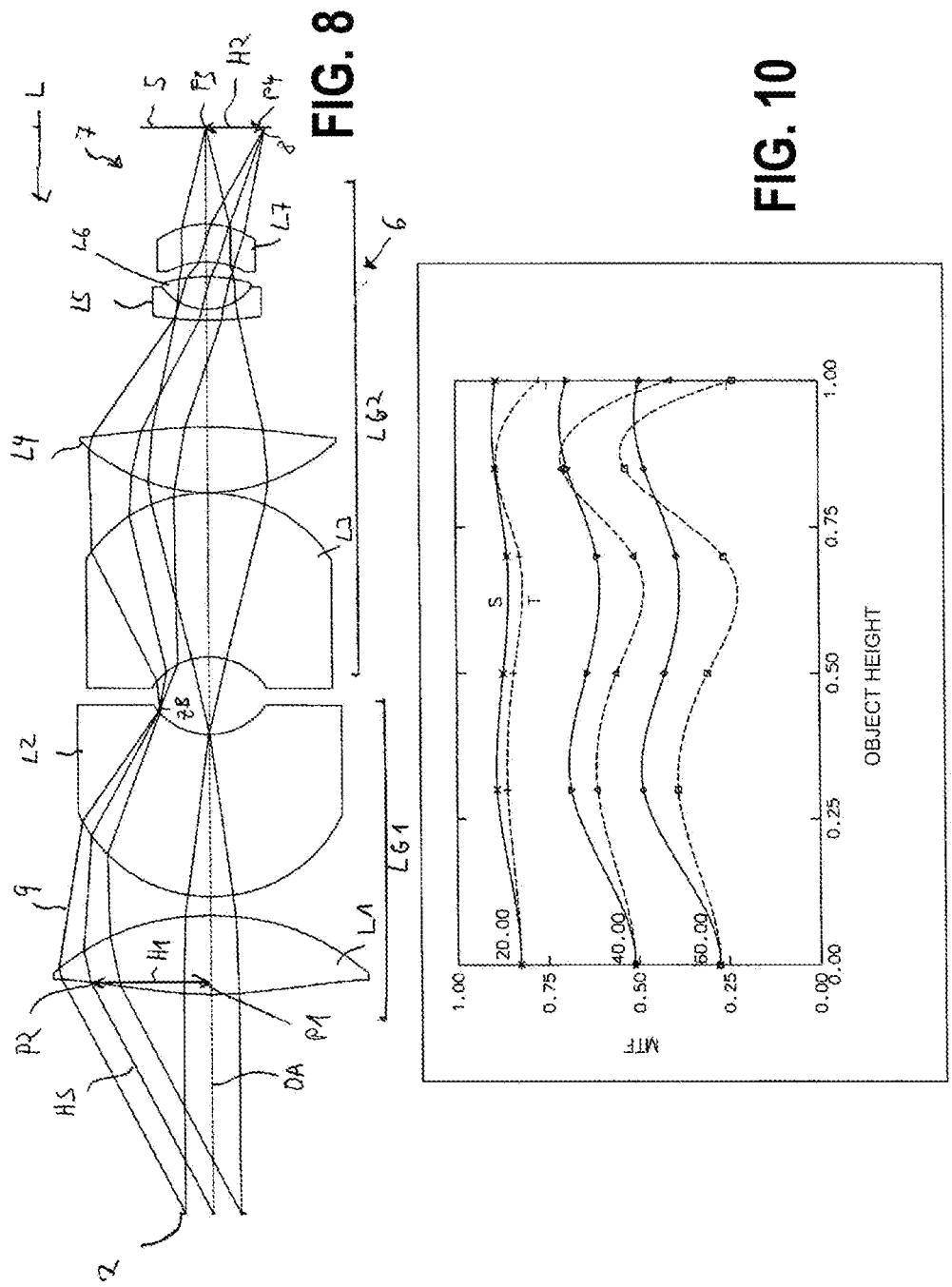
FIG. 8 shows a schematic representation of an optical system according to a third exemplary embodiment of the disclosure.
FIG. 10 shows curves of the modulation transfer function (MTF) as a function of the object height for the exemplary embodiment of the optical system in accordance with FIGS. 8 and 9.

FIG. 8 shows the optical system 7 according to a third exemplary embodiment of the disclosure, which has an optical axis OA that corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. An intermediate image ZB is arranged between the first lens group LG1 and the second lens group LG2. More precisely, the intermediate image ZB is arranged on a surface of a lens of the first lens group LG1, as will be explained further below.

The first lens group LG1 of the optical system 7 according to the exemplary embodiment of the disclosure in accordance with FIG. 8 includes a first lens L1 and a second lens L2. As seen counter to the light incidence direction L, the first lens L1 is arranged first along the optical axis OA, followed by the second lens L2. The first lens L1 has positive refractive power. The second lens L2 has negative refractive power.

The second lens group LG2 of the optical system 7 according to the embodiment of the disclosure in accordance with FIG. 8 includes a third lens L3, a fourth lens L4, a fifth lens L5, a sixth lens L6, and a seventh lens L7. As seen counter to the light incidence direction L, the third lens L3 is arranged first along the optical axis OA, followed by the fourth lens L4, then the fifth lens L5, then the sixth lens L6, and then the seventh lens L7. The third lens L3 has negative refractive power. The fourth lens L4 has positive refractive power. The fifth lens L5 has negative refractive power. The sixth lens L6 has positive refractive power and the seventh lens L7 has positive refractive power.

The first lens L1 has a bi-aspheric form. Further, the second lens L2 and the third lens L3 each are in the form of a meniscus lens. Moreover, the fourth lens L4 has a bi-aspheric form. The fifth lens L5 and the sixth lens L6 form a cemented member.

In the optical system 7 according to the exemplary embodiment of the disclosure in accordance with FIG. 8, too, the first lens L1 forms the aforementioned lens unit of the optical system 7 according to an exemplary embodiment of the disclosure. As seen in the light incidence direction L, the display unit 5 is arranged first along the optical axis OA, followed by the first lens L1 along the optical axis OA. No further optical unit of the optical system 7 is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 10.9 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 8 emerge from the upper table in FIG. 9. The upper table in FIG. 9 is based on an incoming beam radius of 2.5 mm, an entrance angle of 27°, and an effective focal length of the optical system 7 according to the exemplary embodiment of the disclosure of −10.842 mm. The surface 0 denotes a surface at an infinite distance in front of the optical system 7 on the side of the eye 2 so that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2 and a surface 9 directed at the display unit 5. The fifth lens L5 has a surface 10 directed at the eye 2. Further, the sixth lens L6 has a surface 11 directed at the eye 2 and a surface 12 directed at the display unit 5. The seventh lens L7 has a surface 13 directed at the eye 2 and a surface 14 directed at the display unit 5. The surface 15 denotes the surface of the display unit 5. Further, the upper table in FIG. 9 provides the radii of the individual surfaces and the thicknesses of the individual lenses of the optical system 7 according to an exemplary embodiment of the disclosure in accordance with FIG. 8, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The intermediate image ZB is arranged on the surface 5 of the second lens L2.

The upper table in FIG. 9 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are provided in the upper table in FIG. 9.

The surfaces 2 and 3 of the first lens L1 have an aspheric form. Further, the surfaces 8 and 9 of the fourth lens L4 have an aspheric form. The aspheric form of the aforementioned surfaces is given by the asphere formula [1] mentioned above. The asphere coefficients and the conic constant are specified in the lower table in FIG. 9.

FIG. 10 shows curves of the modulation transfer function (MTF) as a function of the object height for the optical system 7 according to the exemplary embodiment of the disclosure in accordance with FIGS. 8 and 9. Shown are a sagittal contrast curve S (shown in solid lines) and a tangential contrast curve T (shown in dashed lines) for 20 line pairs per millimeter, 40 line pairs per millimeter, and 60 line pairs per millimeter.

The optical system 7 according to the exemplary embodiment of the disclosure in accordance with FIGS. 8 to 10 has a reduced number of lenses—specifically seven lenses—in comparison with the optical system 7 according to the exemplary embodiment of the disclosure explained further above. In the optical system 7 according to this exemplary embodiment of the disclosure, too, the intermediate image ZB is arranged between the first lens group LG1 and the second lens group LG2. Once again, the intermediate image ZB is generated by the second lens group LG2, which is essentially configured as a relay system. As mentioned above, the second lens L2 and the third lens L3 are in the form of a meniscus lens. The second lens L2 and the third lens L3 are arranged such that the intermediate image ZB is arranged between the second lens L2 and the third lens L3, with no further optical unit of the optical system 7 according to an exemplary embodiment of the disclosure being arranged between firstly the second lens L2 and the intermediate image ZB and secondly the third lens L3 and the intermediate image ZB. The second lens L2 in the form of a meniscus lens and the third lens L3 in the form of a meniscus lens serve to correct the Petzval sum, and thus contribute to flattening of the image field.

The first lens L1 and the fourth lens L4 have a bi-aspheric form. This makes it possible to implement a beam deflection using lenses with a high refractive power. In the process, arising aberrations, in particular spherical aberrations, are corrected on account of the aspheric form of the first lens L1 and the fourth lens L4. It is consequently possible to use a smaller number of lenses in the optical system 7 according to an exemplary embodiment of the disclosure in comparison with the optical system 7 according to the exemplary embodiment of the disclosure explained further above. This applies in particular to the first lens group LG1, which in the optical system 7 according to this exemplary embodiment of the disclosure includes only two lenses, specifically the first lens L1 and the second lens L2, on account of the bi-aspheric form of the first lens L1 and the fourth lens L4. In addition, it is advantageous that a longitudinal chromatic aberration can be corrected by the cemented member, which is formed by the fifth lens L5 and the sixth lens L6. The aforementioned cemented member is an achromatic cemented member, for example. In particular, provision is made for the fifth lens L5 to be made of a flint glass and for the sixth lens L6 to be made of a crown glass. The further lenses of the optical system 7 according to this exemplary embodiment of the disclosure are formed from a crown glass, for example.

Figures 11, 13:
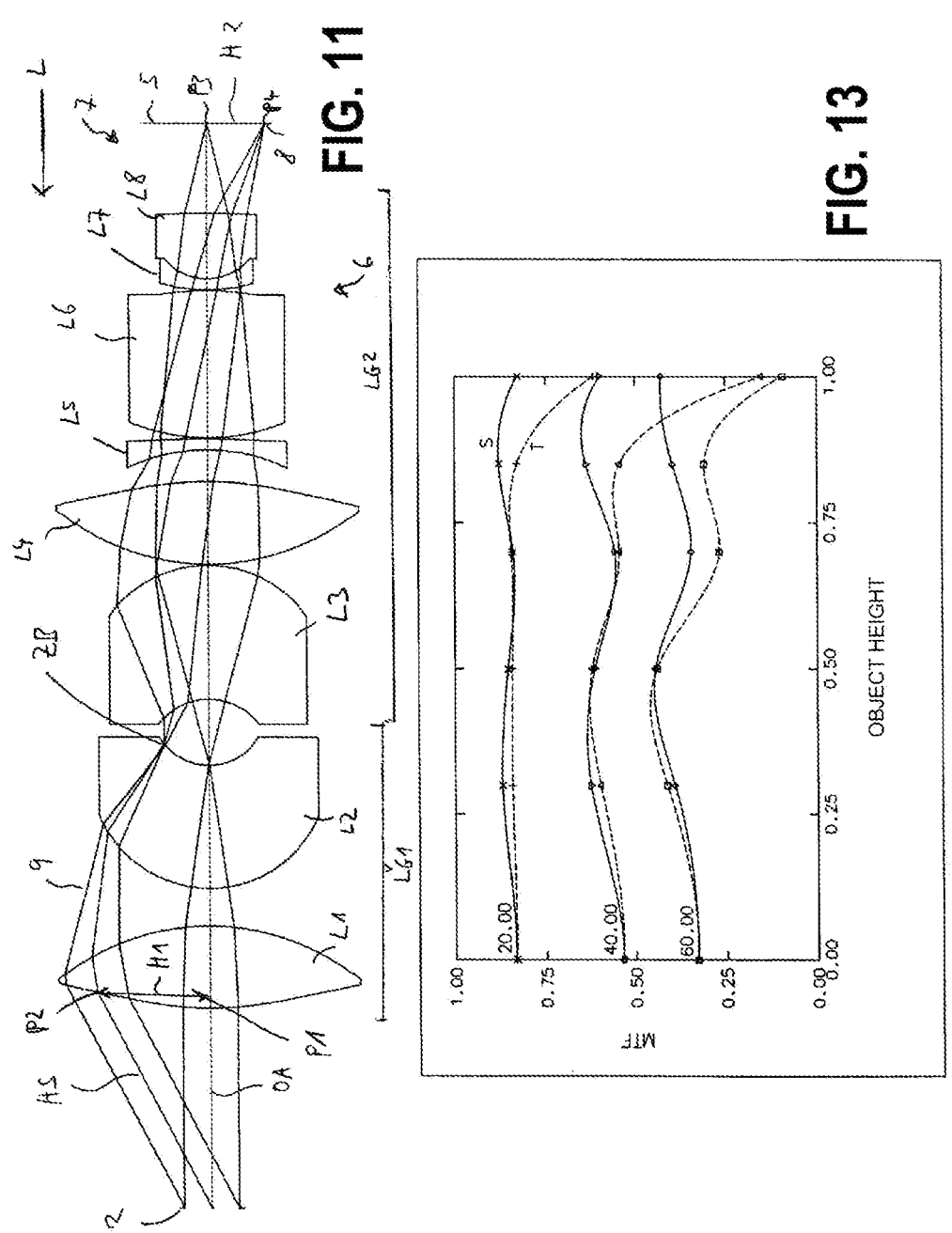
FIG. 11 shows a schematic representation of an optical system according to a fourth exemplary embodiment of the disclosure.
FIG. 13 shows curves of the modulation transfer function (MTF) as a function of the object height for the exemplary embodiment of the optical system in accordance with FIGS. 11 and 12.

FIG. 11 shows an optical system 7 according to a fourth exemplary embodiment of the disclosure, which has an optical axis OA that corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. An intermediate image ZB is arranged between the first lens group LG1 and the second lens group LG2. More precisely, the intermediate image ZB is arranged on a surface of a lens of the first lens group LG1, as will be explained further below.

The first lens group LG1 of the optical system 7 according to the exemplary embodiment of the disclosure in accordance with FIG. 11 includes a first lens L1 and a second lens L2. As seen counter to the light incidence direction L, the first lens L1 is arranged first along the optical axis OA, followed by the second lens L2. The first lens L1 has positive refractive power. The second lens L2 has negative refractive power.

The second lens group LG2 of the optical system 7 according to the exemplary embodiment of the disclosure in accordance with FIG. 11 includes a third lens L3, a fourth lens L4, a fifth lens L5, a sixth lens L6, a seventh lens L7, and an eighth lens L8. As seen counter to the light incidence direction L, the third lens L3 is arranged first along the optical axis OA, followed by the fourth lens L4, then the fifth lens L5, then the sixth lens L6, then the seventh lens L7, and then the eighth lens L8. The third lens L3 has positive refractive power. The fourth lens L4 has positive refractive power. The fifth lens L5 has negative refractive power. The sixth lens L6 has positive refractive power. The seventh lens L7 has negative refractive power and the eighth lens L8 has positive refractive power.

The first lens L1 has a bi-aspheric form. The second lens L2 and the third lens L3 are in the form of a meniscus lens. The fourth lens L4 has a bi-aspheric form. Further, the seventh lens L7 and the eighth lens L8 form a cemented member.

In the optical system 7 according to the exemplary embodiment of the disclosure in accordance with FIG. 11, too, the first lens L1 forms the aforementioned lens unit of the optical system 7 according to an exemplary embodiment of the disclosure. As seen in the light incidence direction L, the display unit 5 is arranged first along the optical axis OA, followed by the first lens L1 along the optical axis OA. No further optical unit of the optical system 7 according to the disclosure is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 10.1 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 11 emerge from the upper table in FIG. 12. The upper table in FIG. 12 is based on an incoming beam radius of 2.5 mm, an entrance angle of 27°, and an effective focal length of the optical system 7 according to an exemplary embodiment of the disclosure of −10.863 mm. The surface 0 denotes a surface at an infinite distance in front of the optical system 7 on the side of the eye 2 so that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2 and a surface 9 directed at the display unit 5. The fifth lens L5 has a surface 10 directed at the eye 2 and a surface 11 directed at the display unit 5. Further, the sixth lens L6 has a surface 12 directed at the eye 2 and a surface 13 directed at the display unit 5. The seventh lens L7 has a surface 14 directed at the eye 2. The eighth lens L8 has a surface 15 directed at the eye 2 and a surface 16 directed at the display unit 5. The surface 17 denotes the surface of the display unit 5. Further, the upper table in FIG. 12 provides the radii of the individual surfaces and the thicknesses of the individual lenses of the optical system 7 according to the exemplary embodiment of the disclosure in accordance with FIG. 11, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The intermediate image ZB is arranged on the surface 5 of the second lens L2.

The upper table in FIG. 12 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are provided in the upper table in FIG. 12.

The surfaces 2 and 3 of the first lens L1 have an aspheric form. Further, the surfaces 8 and 9 of the fourth lens L4 have an aspheric form. The aspheric form of the aforementioned surfaces is determined by the asphere formula [1] mentioned above. The asphere coefficients and the conic constant are specified in the lower table in FIG. 12.

FIG. 13 shows curves of the modulation transfer function (MTF) as a function of the object height for the optical system 7 according to the exemplary embodiment of the disclosure in accordance with FIGS. 11 and 12. Shown are a sagittal contrast curve S (shown in solid lines) and a tangential contrast curve T (shown in dashed lines) for 20 line pairs per millimeter, 40 line pairs per millimeter, and 60 line pairs per millimeter.

In the optical system 7 according to the exemplary embodiment of the disclosure in accordance with FIGS. 11 to 13, the first lens L1 and the fourth lens L4, which each have a bi-aspheric form, have identical surface shapes. However, the first lens L1 and the fourth lens L4 are arranged on the optical axis OA rotated relative to one another along the optical axis OA. In other words, the first lens L1 is arranged on the optical axis OA with a first alignment and the fourth lens L4 is arranged on the optical axis OA with a second alignment. By way of example, the first alignment is rotated 180° with respect to the second alignment. In other words, the first alignment of the first lens L1 is a reflection of the second alignment of the fourth lens L4 in a straight line, which is aligned perpendicular to the optical axis OA in particular. The use of two identical lenses, specifically the first lens L1 and the fourth lens L4, reduces, for example, the production costs of the optical system 7 according to an exemplary embodiment of the disclosure, especially if this relates to aspheric lenses with high tooling costs.

In the optical system 7 according to the exemplary embodiments of the disclosure explained above, the intermediate image ZB in each case is in the immediate vicinity—for example at a distance of a few millimeters, in particular less than 3 mm—or even on an optical surface of one of the lenses of the optical system 7 according to the exemplary embodiments of the disclosure explained above. However, in the optical system 7 according to a fifth exemplary embodiment of the disclosure depicted in FIG. 14, it is possible to expose the intermediate image ZB, and so the latter is arranged neither in the direct vicinity of, nor on, an optical surface of any one of the lenses of the optical system 7 according to an exemplary embodiment of the disclosure. This significantly relaxes the cleanliness requirements with regard to possible scratches, inclusions and/or contamination on the lenses and lens surfaces adjacent to the intermediate image ZB.

Figures 14, 16:
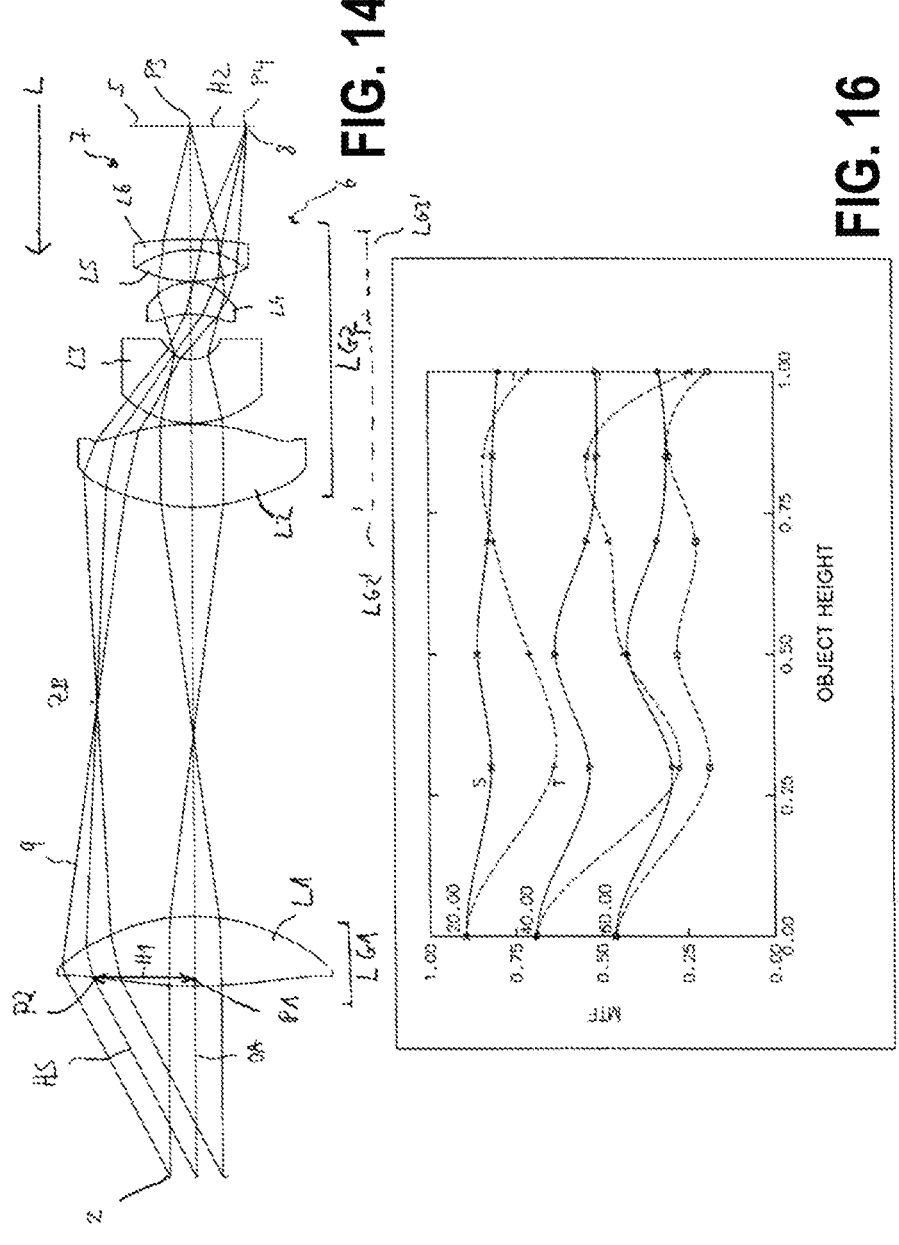
FIG. 14 shows a schematic representation of an optical system according to a fifth exemplary embodiment of the disclosure.
FIG. 16 shows curves of the modulation transfer function (MTF) as a function of the object height for the exemplary embodiment of the optical system in accordance with FIGS. 14 and 15.

The optical system 7 according to the exemplary embodiment of the disclosure in accordance with FIG. 14 has an optical axis OA, which corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. The intermediate image ZB is arranged between the first lens group LG1 and the second lens group LG2. Alternatively, the optical system 7 according to the exemplary embodiment of the disclosure in accordance with FIG. 14 can also be divided into three lens groups, specifically the first lens group LG1, a second lens group LG2', and a third lens group LG3'. The second lens group LG2' and the third lens group LG3' are depicted with dashed lines in FIG. 14. As seen counter to the light incidence direction L, the first lens group LG1 is arranged first along the optical axis OA, followed by the second lens group LG2' and then the third lens group LG3'. The intermediate image ZB is arranged between the first lens group LG1 and the second lens group LG2'.

The first lens group LG1 of the optical system 7 according to the exemplary embodiment of the disclosure in accordance with FIG. 14 includes a single lens in the form of a first lens L1. Consequently, no further optical units are provided in the first lens group LG1. The first lens L1 has positive refractive power.

The second lens group LG2 of the optical system 7 according to the exemplary embodiment of the disclosure in accordance with FIG. 14 includes a second lens L2, a third lens L3, a fourth lens L4, a fifth lens L5, and a sixth lens L6. As seen counter to the light incidence direction L, the second lens L2 is arranged first along the optical axis OA, followed by the third lens L3, then the fourth lens L4, then the fifth lens L5, and then the sixth lens L6. The second lens L2 has positive refractive power. The third lens L3 has negative refractive power. The fourth lens L4 has positive refractive power. The fifth lens L5 has positive refractive power and the sixth lens L6 has negative refractive power.

In the optical system 7 according to the alternative exemplary embodiment of the disclosure in accordance with FIG. 14, the second lens group LG2' includes the second lens L2 and the third lens L3. The third lens group LG3' includes the fourth lens L4, the fifth lens L5, and the sixth lens L6.

The first lens L1 and the second lens L2 have a bi-aspheric form. The third lens L3 is in the form of a meniscus lens. The fifth lens L5 and the sixth lens L6 form a cemented member.

In the embodiment of the optical system 7 according to the disclosure in accordance with FIG. 14, too, the first lens L1 forms the aforementioned lens unit of the optical system 7 according to the disclosure. As seen in the light incidence direction L, the display unit 5 is arranged first along the optical axis OA, followed by the first lens L1. No further optical unit of the optical system 7 according to the disclosure is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 9.7 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 14 emerge from the upper table in FIG. 15. The upper table in FIG. 15 is based on an incoming beam radius of 2.5 mm, an entrance angle of 27°, and an effective focal length of the optical system 7 according to an exemplary embodiment of the disclosure of −10.849 mm. The surface 0 denotes a surface at an infinite distance in front of the optical system 7 on the side of the eye 2 so that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2 and a surface 9 directed at the display unit 5. The fifth lens L5 has a surface 10 directed at the eye 2. Further, the sixth lens L6 has a surface 11 directed at the eye 2 and a surface 12 directed at the display unit 5. The surface 13 denotes the surface of the display unit 5. Further, the upper table in FIG.

15 provides the radii of the individual surfaces and the thicknesses of the individual lenses of the optical system 7 according to the exemplary embodiment of the disclosure in accordance with FIG. 14, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The upper table in FIG. 15 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are specified in the upper table in FIG. 15.

The surfaces 2 and 3 of the first lens L1 have an aspheric form. Further, the surfaces 4 and 5 of the second lens L2 have an aspheric form. The aspheric form of the aforementioned surfaces is determined by the asphere formula [1] mentioned above. The asphere coefficients and the conic constant are provided in the lower table in FIG. 15.

FIG. 16 shows curves of the modulation transfer function (MTF) as a function of the object height for the optical system 7 according to the exemplary embodiment of the disclosure in accordance with FIGS. 14 and 15. Shown are a sagittal contrast curve S (shown in solid lines) and a tangential contrast curve T (shown in dashed lines) for 20 line pairs per millimeter, 40 line pairs per millimeter, and 60 line pairs per millimeter.

It is advantageous in the optical system 7 according to the exemplary embodiment of the disclosure in accordance with FIGS. 14 to 16 that, as seen counter to the light incidence direction L, the third lens L3, which is in the form of a meniscus lens, is arranged behind the second lens L2, which has a bi-aspheric form. This third lens L3 adopts the correction of the Petzval sum. This makes it possible for the Petzval sum to be no longer corrected by optical units located in the vicinity of the intermediate image ZB. Consequently, the intermediate image ZB can be exposed. The installation length of the optical system 7 according to this exemplary embodiment of the disclosure is 100 mm, for example. This makes it possible not to use any strongly refractive meniscus lenses between which the intermediate image ZB is arranged. Rather, it is sufficient to use the third lens L3 in the form of a meniscus lens, the latter adopting the correction of the Petzval sum.

Figures 17, 19:
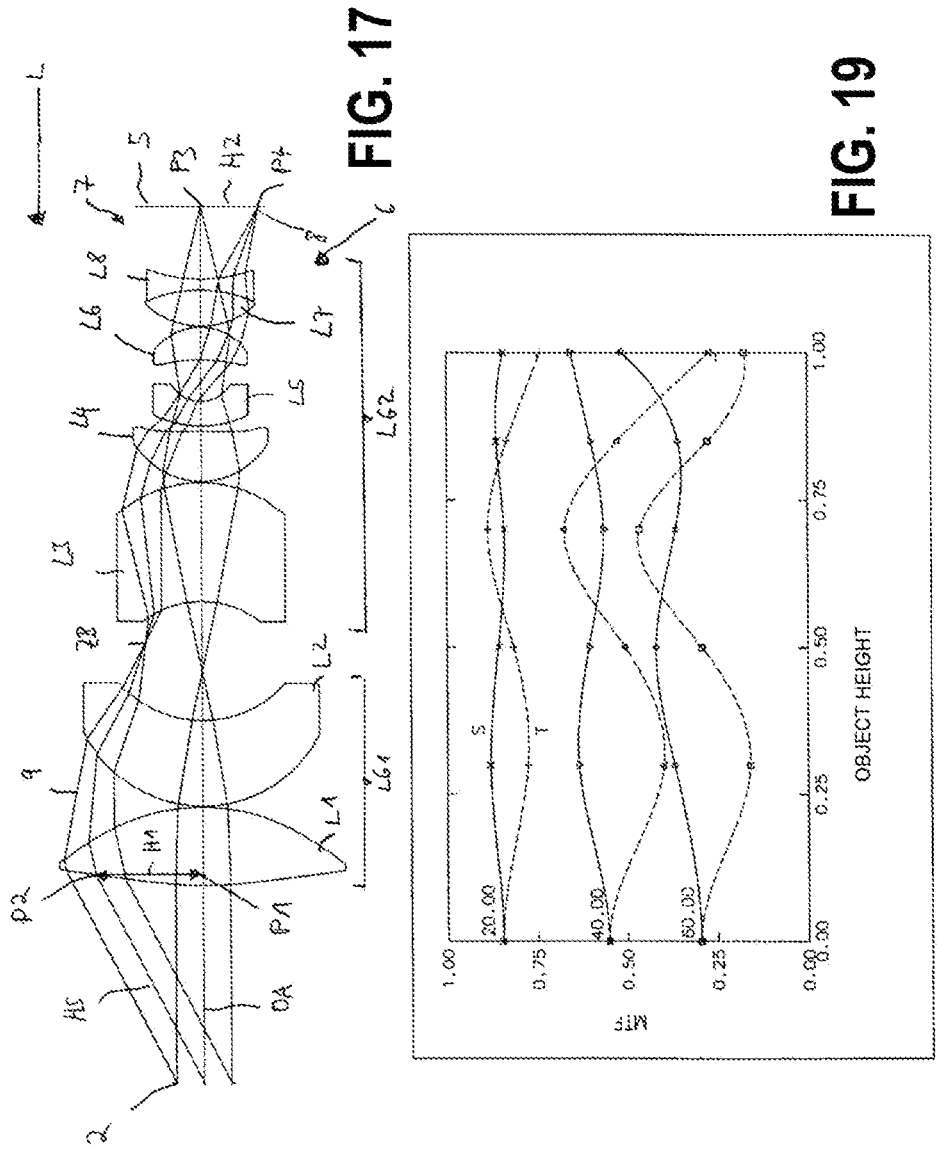
FIG. 17 shows a schematic representation of an optical system according to a sixth exemplary embodiment of the disclosure.
FIG. 19 shows curves of the modulation transfer function (MTF) as a function of the object height for the exemplary embodiment of the optical system in accordance with FIGS. 17 and 18.

FIG. 17 shows the optical system 7 according to a sixth exemplary embodiment of the disclosure. The optical system 7 according to this exemplary embodiment of the disclosure has an optical axis OA, which corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. The intermediate image ZB is arranged between the first lens group LG1 and the second lens group LG2.

The first lens group LG1 of the optical system 7 according to the exemplary embodiment of the disclosure in accordance with FIG. 17 includes a first lens L1 and a second lens L2. As seen counter to the light incidence direction, the first lens L1 is arranged first along the optical axis OA, followed by the second lens L2. The first lens L1 has positive refractive power. The second lens L2 has positive refractive power.

The second lens group LG2 of the optical system 7 according to the exemplary embodiment of the disclosure in accordance with FIG. 17 includes a third lens L3, a fourth lens L4, a fifth lens L5, a sixth lens L6, a seventh lens L7, and an eighth lens L8. As seen counter to the light incidence direction L, the third lens L3 is arranged first along the optical axis OA, followed by the fourth lens L4, then the fifth lens L5, then the sixth lens L6, then the seventh lens L7, and then the eighth lens L8. The third lens L3 has positive refractive power. The fourth lens L4 has positive refractive power. The fifth lens L5 has negative refractive power. The sixth lens L6 has positive refractive power. The seventh lens L7 has positive refractive power and the eighth lens L8 has negative refractive power.

The first lens L1 has a bi-aspheric form. The second lens L2 and the third lens L3 are in the form of a meniscus lens. The fourth lens L4 has a bi-aspheric form. Further, the seventh lens L7 and the eighth lens L8 form a cemented member.

In the optical system 7 according to the exemplary embodiment of the disclosure in accordance with FIG. 17, too, the first lens L1 forms the aforementioned lens unit of the optical system 7 according to an exemplary embodiment of the disclosure. As seen in the light incidence direction L, the display unit 5 is arranged first along the optical axis OA, followed by the first lens L1 along the optical axis OA. No further optical unit of the optical system 7 according to an exemplary embodiment of the disclosure is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 9.7 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

Figure 18:
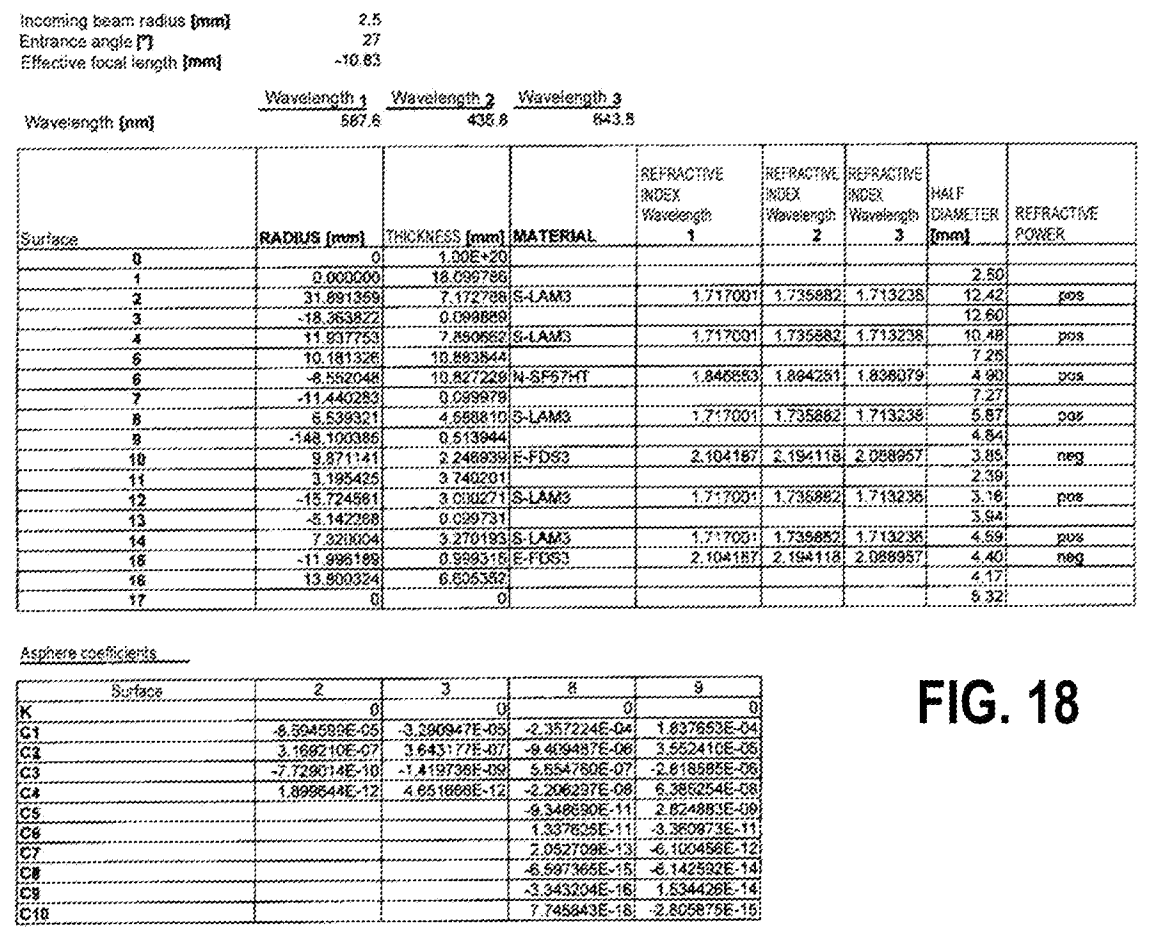

The system data of the optical system 7 according to the exemplary embodiment of the disclosure in accordance with FIG. 17 emerge from the upper table in FIG. 18. The upper table in FIG. 18 is based on an incoming beam radius of 2.5 mm, an entrance angle of 27°, and an effective focal length of the optical system 7 according to an exemplary embodiment of the disclosure of −10.83 mm. The surface 0 denotes a surface at an infinite distance in front of the optical system 7 on the side of the eye 2 such that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2 and a surface 9 directed at the display unit 5. The fifth lens L5 has a surface 10 directed at the eye 2 and a surface 11 directed at the display unit 5. Further, the sixth lens L6 has a surface 12 directed at the eye 2 and a surface 13 directed at the display unit 5. The seventh lens L7 has a surface 14 directed at the eye 2. Moreover, the eighth lens L8 has a surface 15 directed at the eye 2 and a surface 16 directed at the display unit 5. The surface 17 denotes the surface of the display unit 5. Further, the upper table in FIG. 18 provides the radii of the individual surfaces and the thicknesses of the individual lenses of the optical system 7 according to the exemplary embodiment of the disclosure in accordance with FIG. 17, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The upper table in FIG. 18 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are provided in the upper table in FIG. 18.

The surfaces 2 and 3 of the first lens L1 have an aspheric form. Further, the surfaces 8 and 9 of the fourth lens L4 have an aspheric form. The aspheric form of the aforementioned surfaces is determined by the asphere formula [1] mentioned above. The asphere coefficients and the conic constant are provided in the lower table in FIG. 18.

FIG. 19 shows curves of the modulation transfer function (MTF) as a function of the object height for the optical system 7 according to the exemplary embodiment of the disclosure in accordance with FIGS. 17 and 18. Shown are a sagittal contrast curve S (shown in solid lines) and a tangential contrast curve T (shown in dashed lines) for 20 line pairs per millimeter, 40 line pairs per millimeter, and 60 line pairs per millimeter.

The optical system 7 according to the exemplary embodiment of the disclosure in accordance with FIGS. 17 to 19 makes it possible to reduce the installation length of the optical system 7 according to the exemplary embodiments of the disclosure explained above from for example 100 mm to an installation length of for example 80 mm in the optical system 7 according to this exemplary embodiment of the disclosure, the installation length being measured from the pupil of the eye 2 to the display unit 5. On account of the shorter installation length, the individual lenses of the optical system 7 according to the exemplary embodiment of the disclosure in accordance with FIGS. 17 to 19 can have a larger refractive power than the lenses of the optical system 7 according to the exemplary embodiments of the disclosure explained further above. This could make it more difficult to correct the Petzval sum. However, the latter is corrected, for example, by virtue of the second lens L2 and the third lens L3 each being in the form of a meniscus lens, between which the intermediate image ZB is arranged. The shortened installation length of the optical system 7 according to this exemplary embodiment of the disclosure leads to an increased number of lenses, specifically the eight lenses L1 to L8 mentioned above, of which two lenses have a bi-aspheric form, specifically the first lens L1 and the fourth lens L4.

The number of lenses should sometimes be minimized in an optical system 7 according to an exemplary embodiment of the disclosure. This is possible with the optical system 7 in FIG. 20 according to a seventh exemplary embodiment of the disclosure. In the optical system 7 according to this exemplary embodiment of the disclosure, the intermediate image ZB is exposed, and so the latter is arranged neither in the direct vicinity of, nor on, an optical surface of any one of the lenses of the optical system 7 according to the disclosure. The optical system 7 according to the exemplary embodiment of the disclosure in accordance with FIG. 20 has an optical axis OA, which corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. The intermediate image ZB is arranged between the first lens group LG1 and the second lens group LG2.

Figures 20, 22:
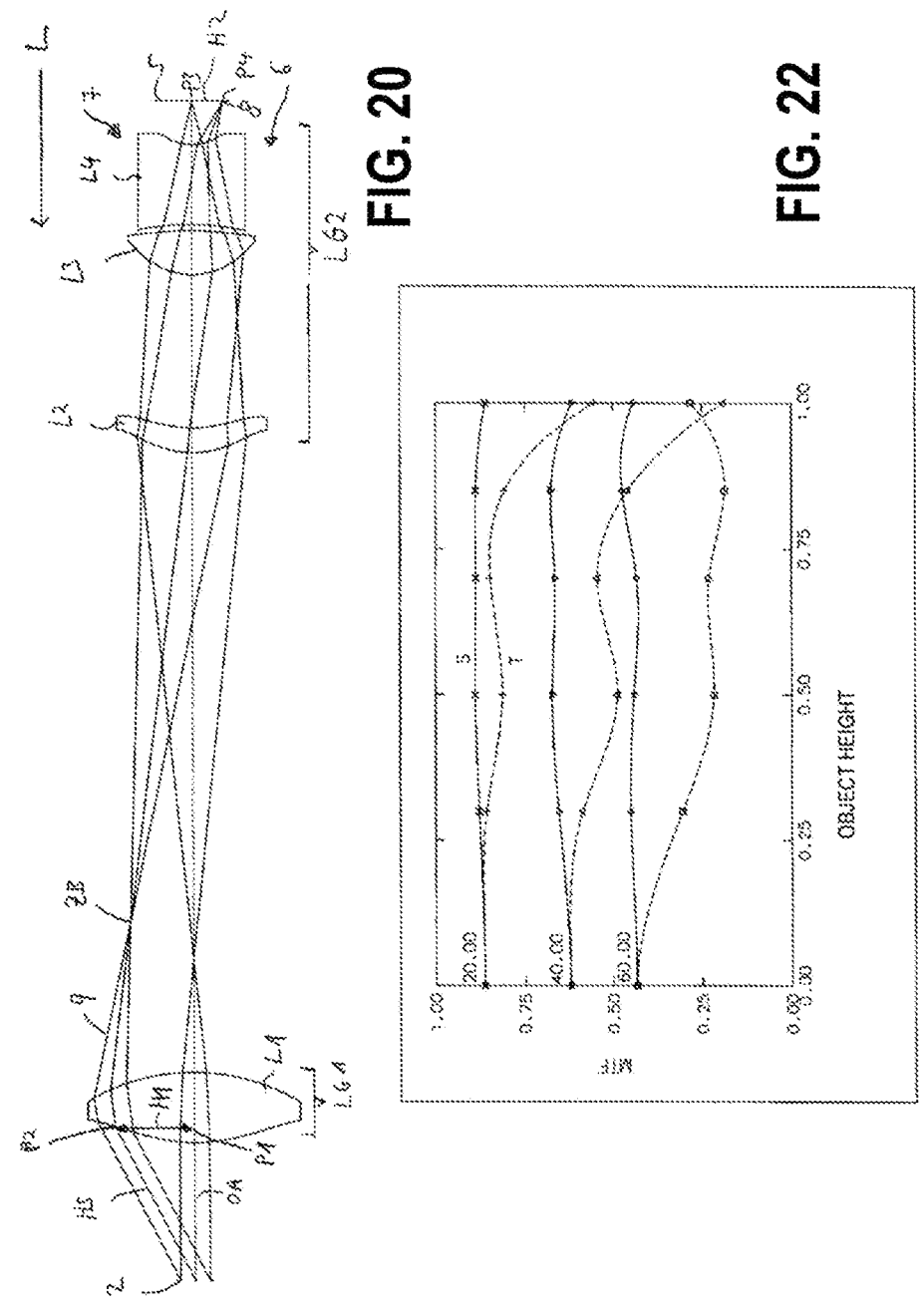
FIG. 20 shows a schematic representation of an optical system according to a seventh exemplary embodiment of the disclosure.
FIG. 22 shows curves of the modulation transfer function (MTF) as a function of the object height for the exemplary embodiment of the optical system in accordance with FIGS. 20 and 21.

The first lens group LG1 of the optical system 7 according to the exemplary embodiment of the disclosure in accordance with FIG. 20 includes a single lens in the form of a first lens L1. Consequently, no further optical units are provided in the first lens group LG1. The first lens L1 has positive refractive power.

The second lens group LG2 of the optical system 7 according to the exemplary embodiment of the disclosure in accordance with FIG. 20 includes a second lens L2, a third lens L3, and a fourth lens L4. As seen counter to the light incidence direction L, the second lens L2 is arranged first along the optical axis OA, followed by the third lens L3 and then the fourth lens L4. The second lens L2 has positive refractive power. The third lens L3 has positive refractive power. The fourth lens L4 has negative refractive power.

The optical system 7 according to the exemplary embodiment of the disclosure in accordance with FIG. 20 has a total of only 4 lenses. The first lens L1, the second lens L2, and the third lens L3 have a bi-aspheric form.

In the optical system 7 according to the exemplary embodiment of the disclosure in accordance with FIG. 20, too, the first lens L1 forms the aforementioned lens unit of the optical system 7 according to the exemplary embodiment of the disclosure. As seen in the light incidence direction L, the display unit 5 is arranged first along the optical axis OA, followed by the first lens L1. No further optical unit of the optical system 7 is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 13.4 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 20 emerge from the upper table in FIG. 21. The upper table in FIG. 21 is based on an incoming beam radius of 2.5 mm, an entrance angle of 27°, and an effective focal length of the optical system 7 according to an exemplary embodiment of the disclosure of −10.931 mm. The surface 0 denotes a surface at an infinite distance in front of the optical system 7 on the side of the eye 2 so that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2 and a surface 9 directed at the display unit 5. The surface 10 denotes the surface of the display unit 5. Further, the upper table in FIG. 21 provides the radii of the individual surfaces and the thicknesses of the individual lenses of the optical system 7 according to the exemplary embodiment of the disclosure in accordance with FIG. 20, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The upper table in FIG. 21 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are provided in the upper table in FIG. 21.

The surfaces 2 and 3 of the first lens L1 have an aspheric form. Further, the surfaces 4 and 5 of the second lens L2 have an aspheric form. Moreover, the surfaces 6 and 7 of the third lens L3 have an aspheric form. The aspheric form of the aforementioned surfaces is determined by the asphere formula [1] mentioned above. The asphere coefficients and the conic constant are specified in the lower table in FIG. 21.

FIG. 22 shows curves of the modulation transfer function (MTF) as a function of the object height for the optical system 7 according to the exemplary embodiment of the disclosure in accordance with FIGS. 20 and 21. Shown are a sagittal contrast curve S (shown in solid lines) and a tangential contrast curve T (shown in dashed lines) for 20 line pairs per millimeter, 40 line pairs per millimeter, and 60 line pairs per millimeter.

The installation length of the optical system 7 according to the exemplary embodiment of the disclosure in accordance with FIGS. 20 to 22 is 200 mm, for example. On account of this installation length, the provision of high refractive powers for the individual lenses is no longer mandatory. This allows a simple correction of the Petzval sum. By way of example, the correction of the Petzval sum is provided by the fourth lens L4. In addition or as an alternative thereto, provision is made for the fourth lens L4 to carry out a correction of the longitudinal chromatic aberration. In particular, provision is made for the fourth lens L4 to be formed from a flint glass.

In order to use the optical system 7 according to the exemplary embodiment of the disclosure, for example in a refractor or in a pair of field glasses, it is desirable to generate, for example, a telecentric embodiment of an image space. In other words, the chief rays of all light beams should propagate parallel to the optical axis OA. This can be provided, for example, by the optical system 7 according to an eighth exemplary embodiment of the disclosure in accordance with FIG. 23.

Figures 23, 25:
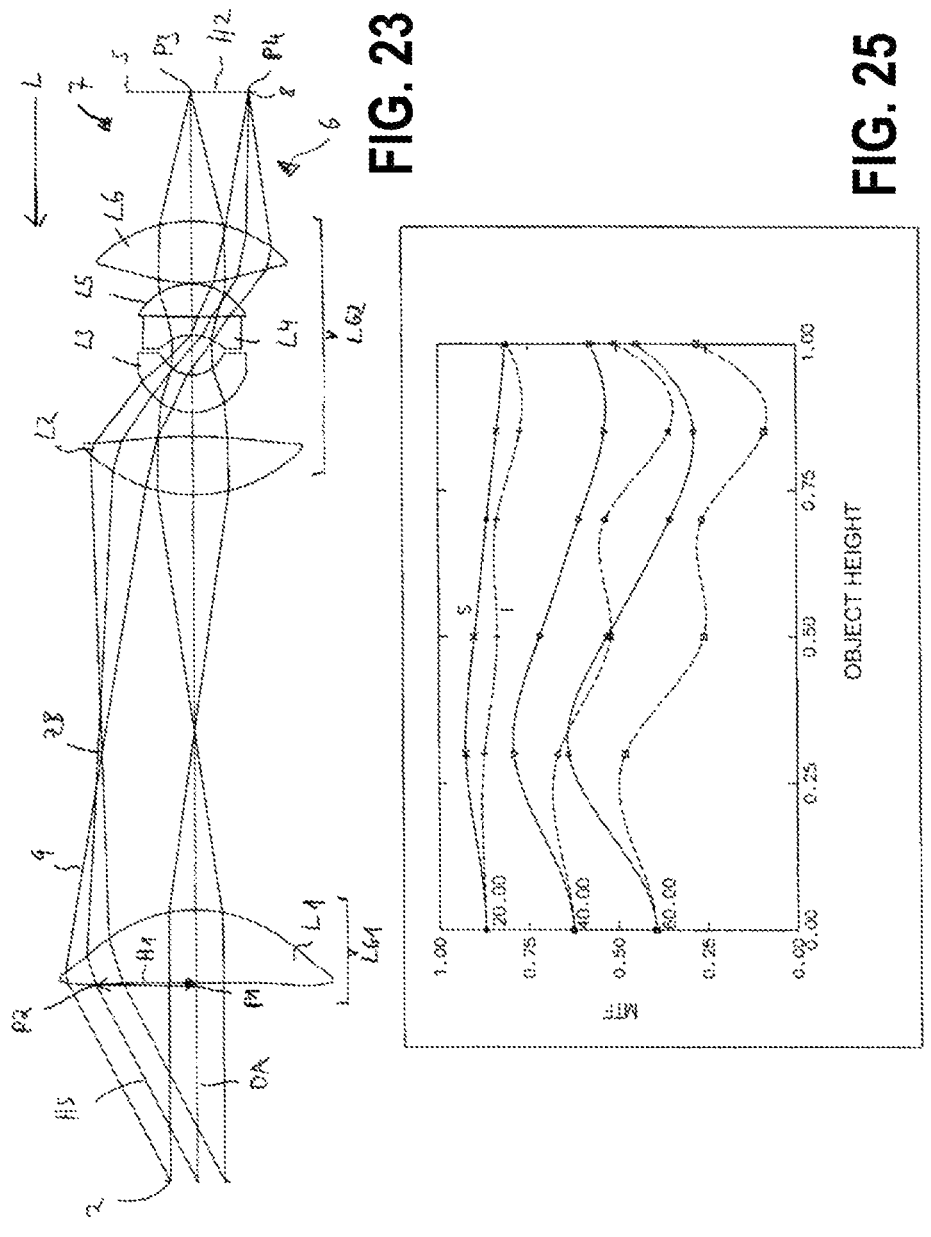
FIG. 23 shows a schematic representation of an optical system according to an eighth exemplary embodiment of the disclosure.
FIG. 25 shows curves of the modulation transfer function (MTF) as a function of the object height for the exemplary embodiment of the optical system in accordance with FIGS. 23 and 24.

The optical system 7 according to exemplary embodiment of the disclosure in accordance with FIG. 23 has an optical axis OA, which corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. The intermediate image ZB is arranged between the first lens group LG1 and the second lens group LG2.

The first lens group LG1 of the optical system 7 according to the exemplary embodiment of the disclosure in accordance with FIG. 23 includes a single lens in the form of a first lens L1. Consequently, no further optical units are provided in the first lens group LG1. The first lens L1 has positive refractive power.

The second lens group LG2 of the optical system 7 according to the exemplary embodiment of the disclosure in accordance with FIG. 23 includes a second lens L2, a third lens L3, a fourth lens L4, a fifth lens L5, and a sixth lens L6. As seen counter to the light incidence direction L, the second lens L2 is arranged first along the optical axis OA, followed by the third lens L3, then the fourth lens L4, then the fifth lens L5, and then the sixth lens L6. The second lens L2 has positive refractive power. The third lens L3 has negative refractive power. The fourth lens L4 has negative refractive power. The fifth lens L5 has positive refractive power. The sixth lens L6 also has positive refractive power.

In the optical system 7 according to the exemplary embodiment of the disclosure in accordance with FIG. 23, the first lens L1 and the second lens L2 have a bi-aspheric form. Further, a surface of the sixth lens L6 has an aspheric form. The fourth lens L4 and the fifth lens L5 form a cemented member.

In the optical system 7 according to the exemplary embodiment of the disclosure in accordance with FIG. 23, too, the first lens L1 forms the aforementioned lens unit of the optical system 7 according to the exemplary embodiment of the disclosure. As seen in the light incidence direction L, the display unit 5 is arranged first along the optical axis OA, followed by the first lens L1. No further optical unit of the optical system 7 according to the exemplary embodiment of the disclosure is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 9.1 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 23 emerge from the upper table in FIG. 24. The upper table in FIG. 24 is based on an incoming beam radius of 2.5 mm, an entrance angle of 27°, and an effective focal length of the optical system 7 according to the exemplary embodiment of the disclosure of −10.849 mm. The surface 0 denotes a surface at an infinite distance in front of the optical system 7 on the side of the eye 2 such that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2. The fifth lens L5 has a surface 9 directed at the eye 2 and a surface 10 directed at the display unit 5. The sixth lens L6 has a surface 11 directed at the eye 2 and a surface 12 directed at the display unit 5. The surface 13 denotes the surface of the display unit 5. Further, the upper table in FIG. 24 provides the radii of the individual surfaces and the thicknesses of the individual lenses of the optical system 7 according to the exemplary embodiment of the disclosure in accordance with FIG. 23, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The upper table in FIG. 24 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are specified in the upper table in FIG. 24.

The surfaces 2 and 3 of the first lens L1 have an aspheric form. Further, the surfaces 4 and 5 of the second lens L2 have an aspheric form. Moreover, the surface 11 of the sixth lens L6 has an aspheric form. The aspheric form of the aforementioned surfaces is determined by the asphere formula [1] mentioned above. The asphere coefficients and the conic constant are provided in the lower table in FIG. 24.

The Petzval sum is corrected by the meniscus-shaped third lens L3 and the meniscus-shaped cemented member including the fourth lens L4 and the fifth lens L5.

FIG. 25 shows curves of the modulation transfer function (MTF) as a function of the object height for the optical system 7 according to the exemplary embodiment of the disclosure in accordance with FIGS. 23 and 24. Shown are a sagittal contrast curve S (shown in solid lines) and a tangential contrast curve T (shown in dashed lines) for 20 line pairs per millimeter, 40 line pairs per millimeter, and 60 line pairs per millimeter.

Figures 26, 28:
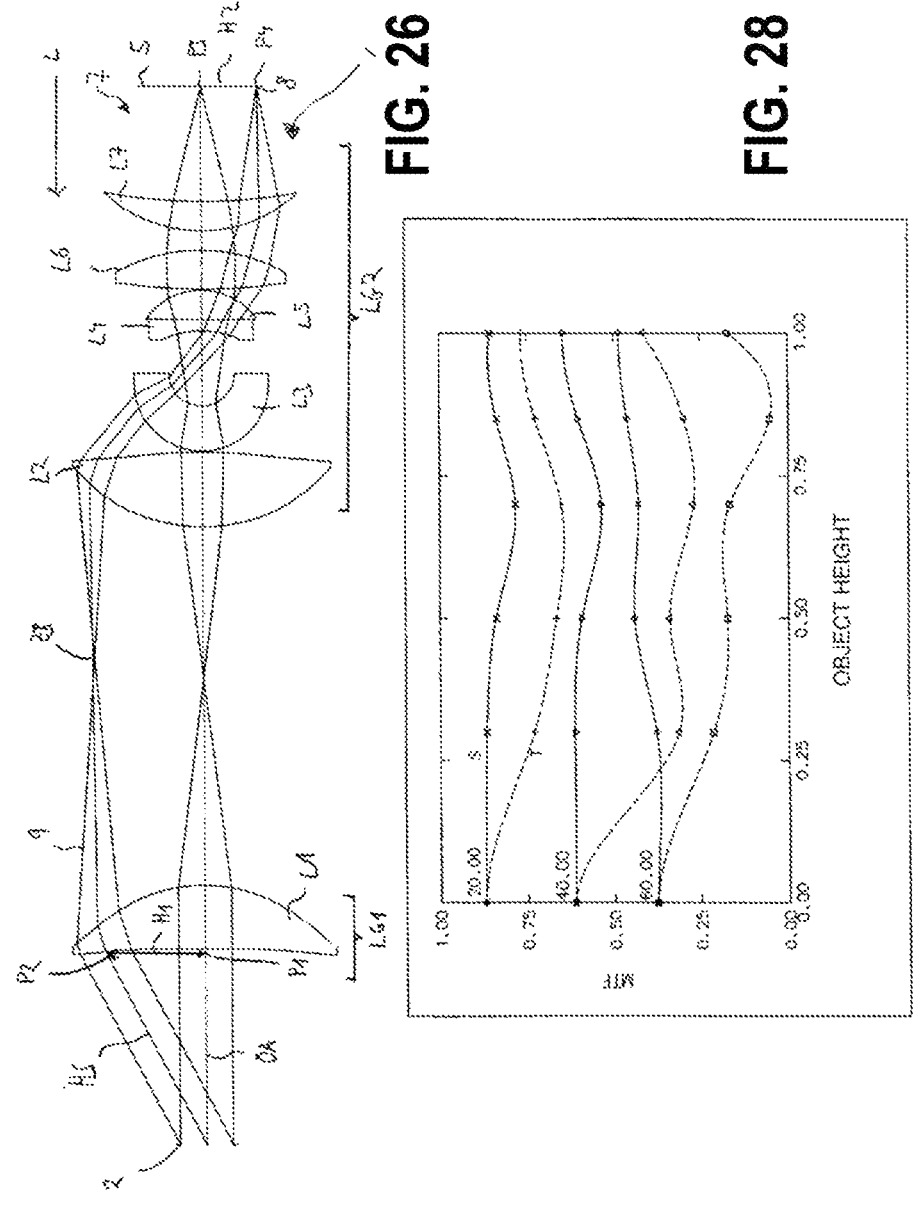
FIG. 26 shows a schematic representation of an optical system according to a ninth exemplary embodiment of the disclosure.
FIG. 28 shows curves of the modulation transfer function (MTF) as a function of the object height for the exemplary embodiment of the optical system in accordance with FIGS. 26 and 27.

The optical system 7 according to a nineth exemplary embodiment of the disclosure, which is used for example in a refractor or in a pair of field glasses, is shown in FIG. 26. The optical system 7 according to this exemplary embodiment of the disclosure also generates a telecentric embodiment of an image space.

The optical system 7 according to this exemplary embodiment of the disclosure in accordance with FIG. 26 has an optical axis OA, which corresponds to the optical axis OA of the piece of night vision equipment 1. An eyepiece 6 includes a first lens group LG1 and a second lens group LG2. As seen counter to the light incidence direction L, the first lens group LG1 is arranged first along the optical axis OA, followed by the second lens group LG2. The intermediate image ZB is arranged between the first lens group LG1 and the second lens group LG2.

The first lens group LG1 of the optical system 7 according to the exemplary embodiment of the disclosure in accordance with FIG. 26 includes a single lens in the form of a first lens L1. Consequently, no further optical units are provided in the first lens group LG1. The first lens L1 has positive refractive power.

The second lens group LG2 of the optical system 7 according to the exemplary embodiment of the disclosure in accordance with FIG. 26 includes a second lens L2, a third lens L3, a fourth lens L4, a fifth lens L5, a sixth lens L6, and a seventh lens L7. As seen counter to the light incidence direction L, the second lens L2 is arranged first along the optical axis OA, followed by the third lens L3, then the fourth lens L4, then the fifth lens L5, then the sixth lens L6, and then the seventh lens L7. The second lens L2 has positive refractive power. The third lens L3 has negative refractive power. The fourth lens L4 has negative refractive power. The fifth lens L5 has positive refractive power. The sixth lens L6 has positive refractive power. The seventh lens L7 also has positive refractive power.

In the optical system 7 according to the exemplary embodiment of the disclosure in accordance with FIG. 26, the first lens L1 and the second lens L2 have a bi-aspheric form. The fourth lens L4 and the fifth lens L5 form a cemented member.

In the optical system according to the exemplary embodiment of the disclosure in accordance with FIG. 26, too, the first lens L1 forms the aforementioned lens unit of the optical system 7 according to the exemplary embodiment of the disclosure. As seen in the light incidence direction L, the display unit 5 is arranged first along the optical axis OA, followed by the first lens L1 along the optical axis OA. No further optical unit of the optical system 7 according to the exemplary embodiment of the disclosure is arranged between the first lens L1 and an eye pupil of the eye 2.

A marginal ray light beam 9 emanates from an edge 8 of the display unit 5 and propagates to the first lens L1 in the light incidence direction L. The marginal ray light beam 9 has a plurality of light rays which form the marginal ray light beam 9. One of the light rays is a chief ray HS of the marginal ray light beam 9. The chief ray HS propagates at a first chief ray height H1 at the first lens L1, the first chief ray height H1 being a first distance between the optical axis OA and the chief ray HS at the first lens L1. For example, the first distance is the length of a first straight line which is aligned perpendicular to the optical axis OA and connects a first point P1 on the optical axis OA to a second point P2 on the chief ray HS at the first lens L1. In particular, the first distance can also be given as follows: As will be explained further below, the first lens L1 has a first surface and a second surface. The first surface is arranged on a first side of the first lens L1 facing away from the display unit 5. Further, the second surface is arranged on a second side of the first lens L1 facing the display unit 5. A first plane is arranged on the first surface of the first lens L1, the first straight line being located in the first plane. By way of example, the first plane is in contact with the first surface at at least one point. The chief ray HS propagates at a second chief ray height H2 at the display unit 5, the second chief ray height H2 being a second distance between the optical axis OA and the chief ray HS at the display unit 5. For example, the second distance is the length of a second straight line which is aligned perpendicular to the optical axis OA and connects a third point P3 on the optical axis OA to a fourth point P4 on the chief ray HS at the display unit 5. In particular, the second distance can also be given as follows: As will be explained further below, the display unit 5 has a surface. The surface of the display unit 5 is arranged on a side of the display unit 5 facing the first lens L1. Further, a second plane is arranged on the surface of the display unit 5. The second straight line is located in the second plane. By way of example, the second plane is in contact with the surface of the display unit 5 at at least one point.

The first chief ray height H1 has a larger value than the second chief ray height H2. By way of example, the first chief ray height H1 is approximately 9.3 mm and the second chief ray height H2 is approximately 5.3 mm. The disclosure is not restricted to the aforementioned magnitudes of the first chief ray height H1 and the second chief ray height H2. Rather, any first chief ray height H1 and any second chief ray height H2 which are suitable for the disclosure can be used for the disclosure.

The system data of the optical system 7 according to the exemplary embodiment of the disclosure in accordance with FIG. 26 emerge from the upper table in FIG. 27. The upper table in FIG. 27 is based on an incoming beam radius of 2.5 mm, an entrance angle of 27°, and an effective focal length of the optical system 7 according to the exemplary embodiment of the disclosure of –10.882 mm. The surface 0 denotes a surface at an infinite distance in front of the optical system 7 on the side of the eye 2 so that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The fourth lens L4 has a surface 8 directed at the eye 2. The fifth lens L5 has a surface 9 directed at the eye 2 and a surface 10 directed at the display unit 5. The sixth lens L6 has a surface 11 directed at the eye 2 and a surface 12 directed at the display unit 5. The seventh lens L7 has a surface 13 directed at the eye 2 and a surface 14 directed at the display unit 5. The surface 15 denotes the surface of the display unit 5. Further, the upper table in FIG. 27 specifies the radii of the individual surfaces and the thicknesses of the individual lenses of the optical system 7 according to the exemplary embodiment of the disclosure in accordance with FIG. 26, with the thickness of a lens being defined as the distance between a first vertex at the optical axis OA of a surface of the lens directed at the eye 2 and a second vertex at the optical axis OA of a surface of the lens directed at the display unit 5. A thickness between two of the aforementioned lenses denotes the distance between two vertices of two adjacent surfaces of two lenses.

The upper table in FIG. 27 provides the material of the individual lenses, the material specification corresponding to the nomenclature as used by the company OHARA. Moreover, the refractive indices are given for three different wavelengths of the light rays originating from the object O, specifically a wavelength 1 of 587.6 nm, a wavelength 2 of 435.8 nm, and a wavelength 3 of 643.8 nm. Further, the half diameters of the individual lenses and the refractive powers of the individual lenses are specified in the upper table in FIG. 27.

The surfaces 2 and 3 of the first lens L1 have an aspheric form. Further, the surfaces 4 and 5 of the second lens L2 have an aspheric form. The aspheric form of the aforementioned surfaces is determined by the asphere formula [1] mentioned above. The asphere coefficients and the conic constant are provided in the lower table in FIG. 27.

The correction of the Petzval sum is provided by the seventh lens L7.

FIG. 28 shows curves of the modulation transfer function (MTF) as a function of the object height for the optical system 7 according to the exemplary embodiment of the disclosure in accordance with FIGS. 26 and 27. Shown are a sagittal contrast curve S (shown in solid lines) and a tangential contrast curve T (shown in dashed lines) for 20 line pairs per millimeter, 40 line pairs per millimeter, and 60 line pairs per millimeter.

The above-described optical system 7 according to the exemplary embodiments of the disclosure is configured as a dioptric system. In other words, the optical system 7 according to the exemplary embodiments of the disclosure includes only lenses. Additionally or alternatively, provision can be made for the optical system 7 according to an exemplary embodiment of the disclosure to include at least one planar folding mirror, which in particular has no optical refractive power. Thus, the optical system 7 according to this exemplary embodiment of the disclosure likewise is a dioptric system.

In the above-described optical system 7 according to the exemplary embodiments of the disclosure, the distance between the eye pupil of the eye 2 and the first lens L1 is larger than the focal length of the corresponding optical system 7 according to the exemplary embodiments of the disclosure. By way of example, the distance from the eye pupil of the eye 2 to the first lens L1 is at least 1.25 times larger than the focal length of the optical system 7 according to the exemplary embodiment of the disclosure. As an alternative thereto, the distance from the eye pupil of the eye 2 to the first lens L1 is at least 1.5 times larger than the focal length of the optical system 7 according to the exemplary embodiment of the disclosure. Further additionally or in an alternative thereto, the distance from the eye pupil of the eye 2 to the first lens L1 is at least 1.7 times larger than one focal length of the optical system 7 according to the exemplary embodiment of the disclosure.

The optical system 7 according to the exemplary embodiments of the disclosure enable comfortable viewing, in particular for a spectacle wearer, since the eyepiece 6 of the optical system 7 according to exemplary embodiments of the disclosure has both a large pupil distance (for example, approx. 18 mm) for a pupil of the eye with a diameter of 5 mm and a large half field angle (for example, approx. 27°). Further, the optical system 7 according to the exemplary embodiments of the disclosure enables an erection of an image without the arrangement of a further inversion system in the optical system 7 according to the disclosure being mandatory.

Figure 29:
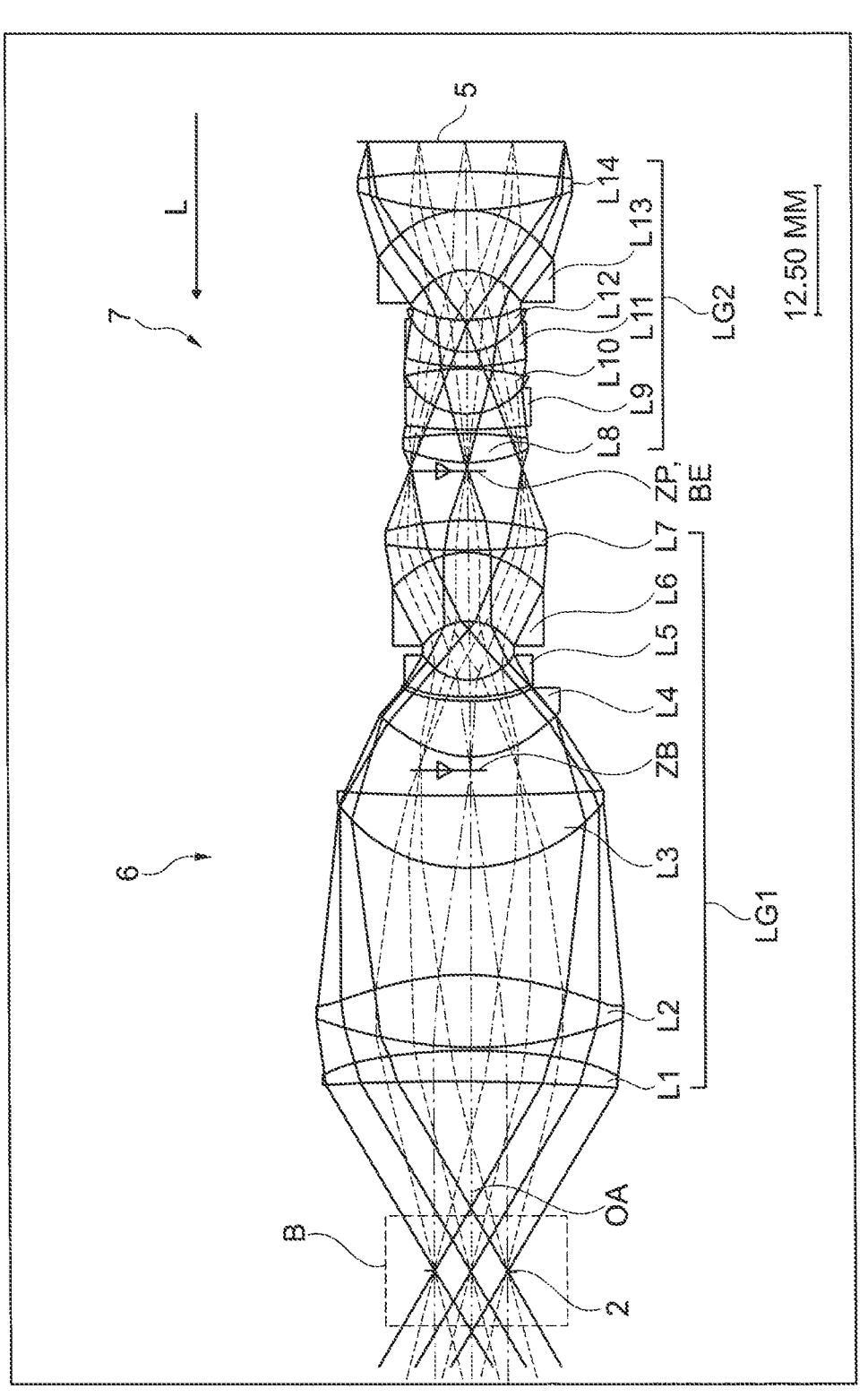
FIG. 29 shows a schematic representation of a further optical system according to an exemplary embodiment of the disclosure.

FIG. 29 shows the optical system 7 according to a further exemplary embodiment of the disclosure, which has an optical axis OA that corresponds to the optical axis OA of the piece of night vision equipment 1. However, this exemplary embodiment of the optical system 7 can also be used in a light microscope, a refractor, a pair of field glasses or in a piece of medical operation equipment. An eyepiece 6 includes a first lens group LG1 and a second lens group LG2. As seen counter to the light incidence direction L, the first lens group LG1 is arranged first along the optical axis OA, followed by the second lens group LG2. An intermediate pupil ZP is arranged between the first lens group LG1 and the second lens group LG2.

The first lens group LG1 of the optical system 7 according to the exemplary embodiment of the disclosure in accordance with FIG. 29 includes a first lens L1, a second lens L2, a third lens L3, a fourth lens L4, a fifth lens L5, a sixth lens L6, and a seventh lens L7. As seen counter to the light incidence direction L, the first lens L1 is arranged first along the optical axis OA, followed by the second lens L2, then the third lens L3, then the fourth lens L4, then the fifth lens L5, then the sixth lens L6, and then the seventh lens L7.

The second lens group LG2 of the optical system 7 according to the exemplary embodiment of the disclosure in FIG. 29 includes an eighth lens L8, a ninth lens L9, a tenth lens L10, an eleventh lens L11, a twelfth lens L12, a thirteenth lens L13, and a fourteenth lens L14. As seen counter to the light incidence direction L, the eighth lens L8 is arranged first along the optical axis OA, followed by the ninth lens L9, then the tenth lens L10, then the eleventh lens L11, then the twelfth lens L12, then the thirteenth lens L13, and then the fourteenth lens L14.

The first lens group LG1 may also be referred to as a pupil relay unit. The second lens group LG2 may also be referred to as further optical assembly. A lens group is understood to mean a group containing at least one optical assembly, for example in the form of a lens. In particular, provision is made for the lens group to include only a single lens or a plurality of lenses.

No further optical unit of the optical system 7 is arranged between the first lens L1 and an eye pupil of the eye 2. The distance between the pupil of the eye and the first lens L1 is approx. 18.4 mm. Here, this value has been chosen so that a particularly preferred distance of approx. 18 mm also arises at the edge of the slightly concavely shaped front side of the first lens L1.

In the optical system 7 according to this exemplary embodiment of the disclosure, the display unit 5 is configured such that, for a display with a visual field with a diameter of 9.6 mm, a large apparent visual field diameter of 60° arises. By way of example, the display unit 5 includes a 1 inch display with a resolution of 2096×2096 pixels, into which it is possible to write a circular field of vision with a diameter of 18.4 mm. This means that the display can display an image circle with a radius of 9.2 mm, with the remaining pixels being blanked. The image circle is imaged by the eyepiece 6 into the circular apparent field of vision of the observer with 60° diameter, possibly taking account of a pincushion distortion.

The paraxial focal length of the eyepiece 6 in the optical system 7 according to this exemplary embodiment of the disclosure is 17.55 mm. Further, a pre-definable spatial region B is arranged at the eyepiece 6, in which spatial region the eye 2 can move in such a way without a pre-definable threshold value of an image quality of an image representation of the image produced by the eyepiece 6 being undershot. The pre-definable region B is the eye box, which has already been defined above. As seen in the direction of the spatial region B starting from the display unit 5, the display unit 5 is arranged first in the light incidence direction L, followed by the eyepiece 6 and then the spatial region B.

As already explained above, the intermediate pupil ZP is arranged between the first lens group LG1 and the second lens group LG2. The second lens group LG2 is configured to image the image displayed by the display unit 5 into the intermediate pupil ZP. Moreover, the first lens group LG1 is configured to image the image arranged in the intermediate pupil ZP into the spatial region B. The intermediate pupil ZP and the spatial region B are conjugate to one another.

An aperture unit BE is arranged at the intermediate pupil ZP. In other words, the aperture unit BE is arranged at the location of the intermediate pupil ZP. Expressed differently yet again, the aperture unit BE is arranged in a plane at the location of the intermediate pupil ZP. By way of example, the aperture unit BE is embodied as a mechanical aperture unit. In particular, provision is made for the aperture unit BE to be provided with a circular aperture, with a size of the aperture being fixedly predetermined or adjustable. In addition or as an alternative thereto, provision is made for the aperture unit BE to be provided with an elliptical aperture, with a size of the aperture being fixedly predetermined or adjustable. An elliptical aperture is advantageous for the provision of an eye box which has different extents vertically and horizontally. In the case of equipment for binocular observation (e.g., a pair of field glasses or a microscope with a binocular eyepiece) in particular, an eye box with a horizontal (lateral) extent that is larger than the vertical extent of the eye box is often advantageous since, in addition to the unavoidable head movement of the observer, additional play is desirable for taking account of the interpupillary distances, which are different for different people, between a right eye and a left eye. Explicit reference is made to the fact that the disclosure is not restricted to the aforementioned aperture shapes. Instead, the aperture may have any shape that is suitable for the disclosure and/or required for a desired shape of the eye box.

The first lens group LG1 has an intermediate caustic ZB, which is arranged between the third lens L3 and the fourth lens L4 in this embodiment of the further optical system 7 according to an exemplary embodiment of the disclosure. The intermediate caustic ZB may be a plane and corrected intermediate image. However, the intermediate caustic ZB need not be in the form of the above-described intermediate image. The intermediate caustic can facilitate the configuration of an eyepiece 6 with a large eye box and, at the same time, a short focal length.

The optical system 7 according to the further exemplary embodiment shown in FIG. 29 is configured for a maximum eye box with a 7 mm diameter. This means that the observer with an assumed eye pupil with a 3 mm diameter (the assumption being that of an eye configured to moderate brightness) can move an eye position arranged on the optical axis OA by up to 2 mm to each side before any vignetting occurs. To this end, the aperture unit BE has a circular aperture with a diameter of approx. 20 mm. A smaller aperture can also be used in further exemplary embodiments, in order to admit less vignetting for a laterally off-centered eye pupil.

The system data of the further optical system 7 according to the exemplary embodiment of the disclosure in accordance with FIG. 29 emerge from the table in FIG. 38. The surface 0 denotes a surface at an infinite distance in front of the optical system 7 on the side of the eye 2 so that light can enter the optical system 7 in collimated fashion. Further, the surface 1 denotes the surface of the eye pupil of the eye 2. The first lens L1 has a surface 2 directed at the eye 2 and a surface 3 directed at the display unit 5. The second lens L2 has a surface 4 directed at the eye 2 and a surface 5 directed at the display unit 5. The third lens L3 has a surface 6 directed at the eye 2 and a surface 7 directed at the display unit 5. The intermediate caustic is denoted by the surface 8. The fourth lens L4 has a surface 9 directed at the eye 2 and a surface 10 directed at the display unit 5. The fifth lens L5 has a surface 11 directed at the eye 2 and a surface 12 directed at the display unit 5. Further, the sixth lens L6 has a surface 13 directed at the eye 2 and a surface 14 directed at the display unit 5. The seventh lens L7 has a surface 15 directed at the eye 2 and a surface 16 directed at the display unit 5. The intermediate pupil is denoted by the surface 17. The eighth lens L8 has a surface 18 directed at the eye 2 and a surface 19 directed at the display unit 5. The ninth lens L9 has a surface 20 directed at the eye 2. The tenth lens L10 has a surface 21 directed at the eye 2 and a surface 22 directed at the display unit 5. The eleventh lens L11 has a surface 23 directed at the eye 2. Further, the twelfth lens L12 has a surface 24 directed at the eye 2 and a surface 25 directed at the display unit 5. The thirteenth lens L13 has a surface 26 directed at the eye 2 and a surface 27 directed at the display unit 5. Further, the fourteenth lens L14 has a surface 28 directed at the eye 2 and a surface 29 directed at the display unit 5. The surface 30 denotes the surface of the display unit 5.

Further, the table in FIG. 38 provides the radii of the individual surfaces and the thicknesses of the individual lenses of the optical system 7 according to a further exemplary embodiment of the disclosure in accordance with FIG. 29, with the thickness of a lens being defined as the distance between a first vertex at the optical axis OA of a surface of the lens directed at the eye 2 and a second vertex at the optical axis OA of a surface of the lens facing the display unit 5. A thickness between two of the aforementioned lenses denotes the distance between two vertices of two adjacent surfaces of two lenses.

The table in FIG. 38 provides the material of the individual lenses, the material specification corresponding to the nomenclature as used by the company OHARA. However, the fifth lens L5 and the sixth lens L6 are made from a material of the company Schott. Further, the half diameter of the individual lenses is provided in the table in FIG. 38. Some surfaces have an aspheric form. The aspheric form of these surfaces is determined by the asphere formula [1] mentioned above. The asphere coefficients and the conic constant are provided in the table in FIG. 39.

Figure 30:
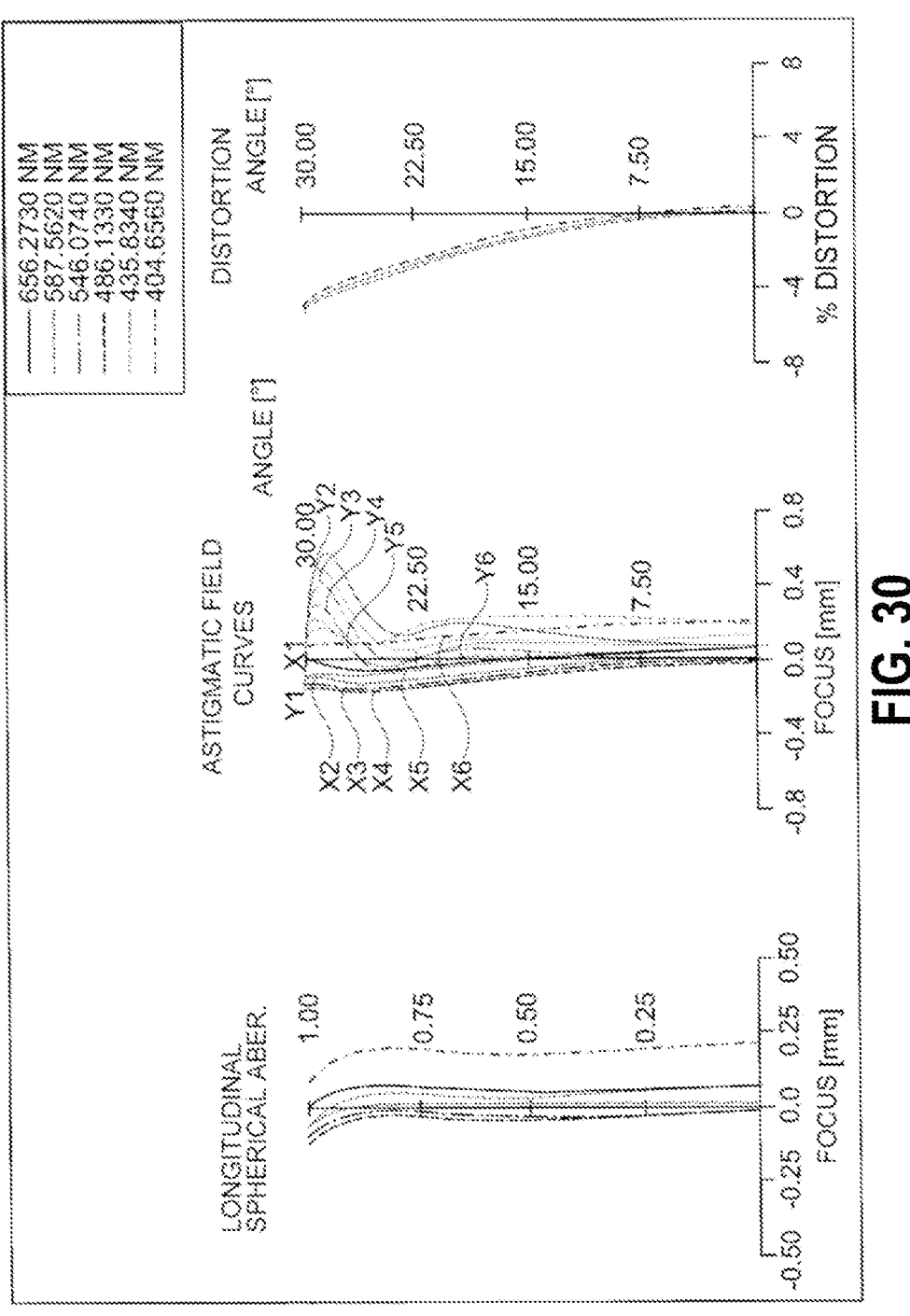
FIG. 30 shows a schematic representation of an aperture aberration, of image surface positions, and of the relative distortion for an optical system according to FIG. 29 with a maximum spatial region.
Figure 31:
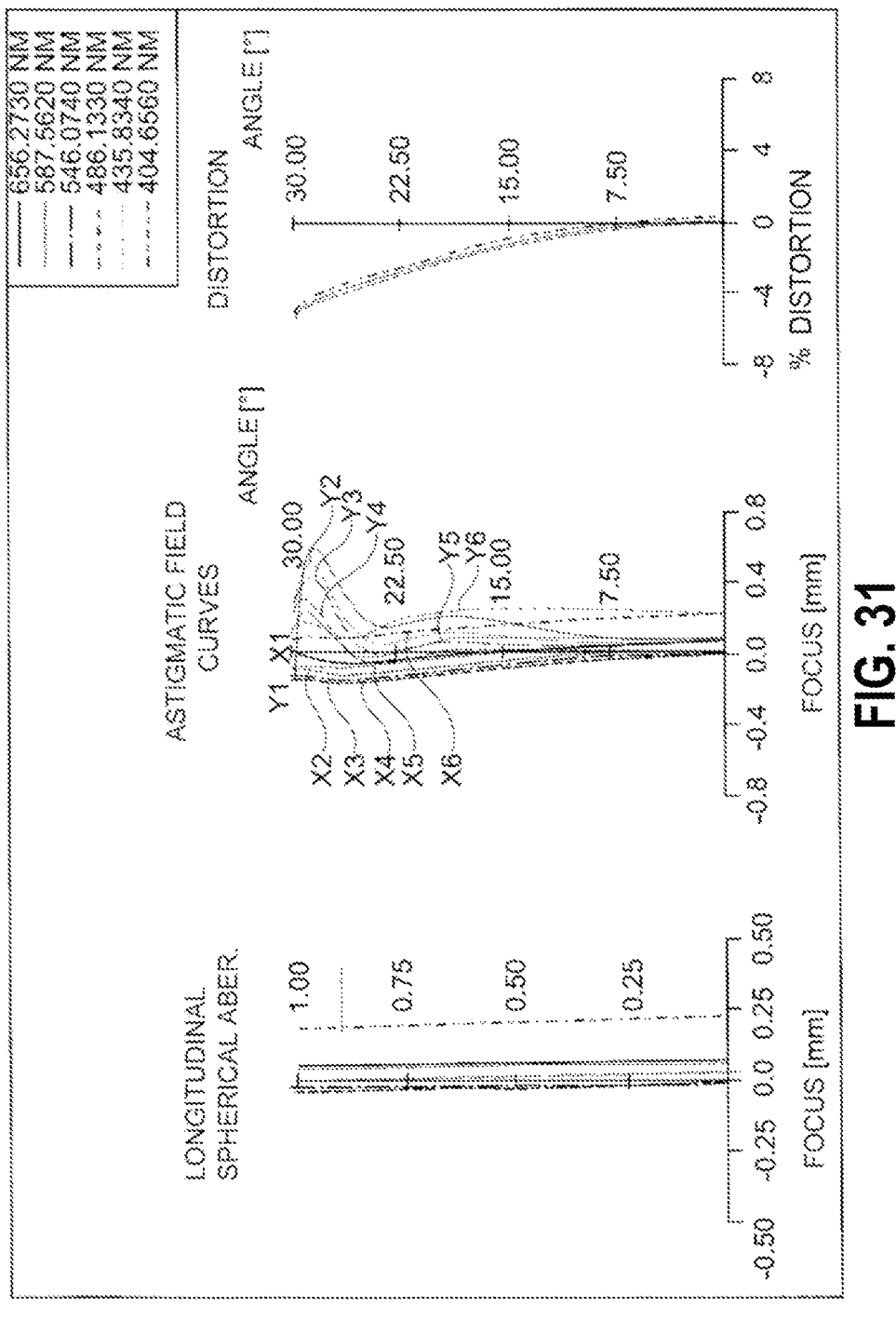
FIG. 31 shows a schematic representation of an aperture aberration, of image surface positions, and of the relative distortion for an optical system according to FIG. 29 with a centered pupil of the eye with a diameter of 3 mm.

For the optical system 7 according to the further exemplary embodiment of the disclosure with a maximum eye box with a diameter of 7 mm, FIG. 30 shows a schematic representation of the aperture aberration (longitudinal spherical aberration), the tangential and sagittal image surface positions (astigmatic field curves), and the relative distortion. For the further optical system 7 according to the exemplary embodiment of the disclosure with a centered eye pupil with a diameter of 3 mm, FIG. 31, by contrast, shows a schematic representation of the aperture aberration (longitudinal spherical aberration), the tangential and sagittal image surface positions (astigmatic field curves), and the relative distortion.

Figure 32:
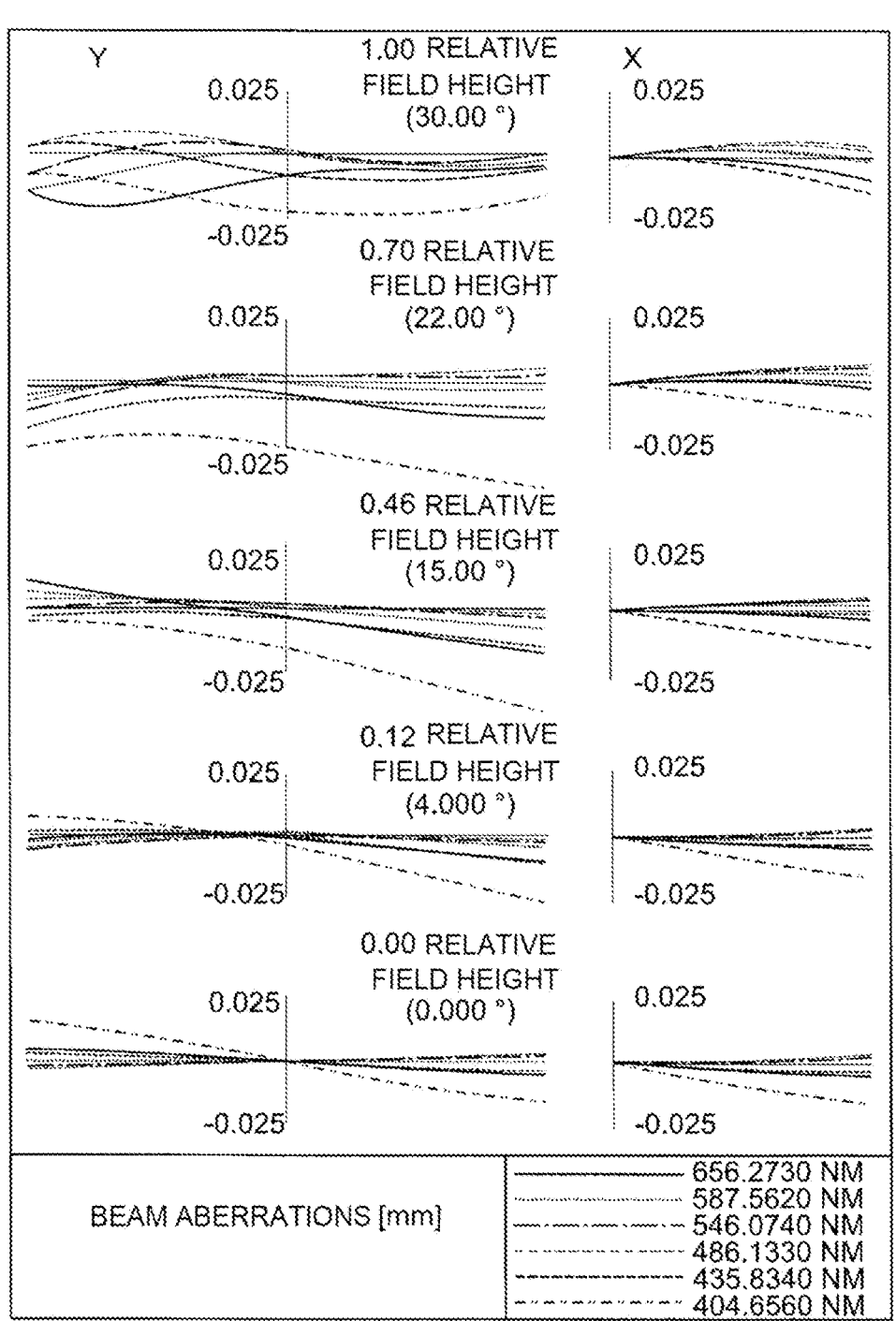
FIG. 32 shows a schematic representation of the transverse aberrations for a centered pupil of the eye with a diameter of 3 mm in the case of an optical system according to FIG. 29.
Figure 33:
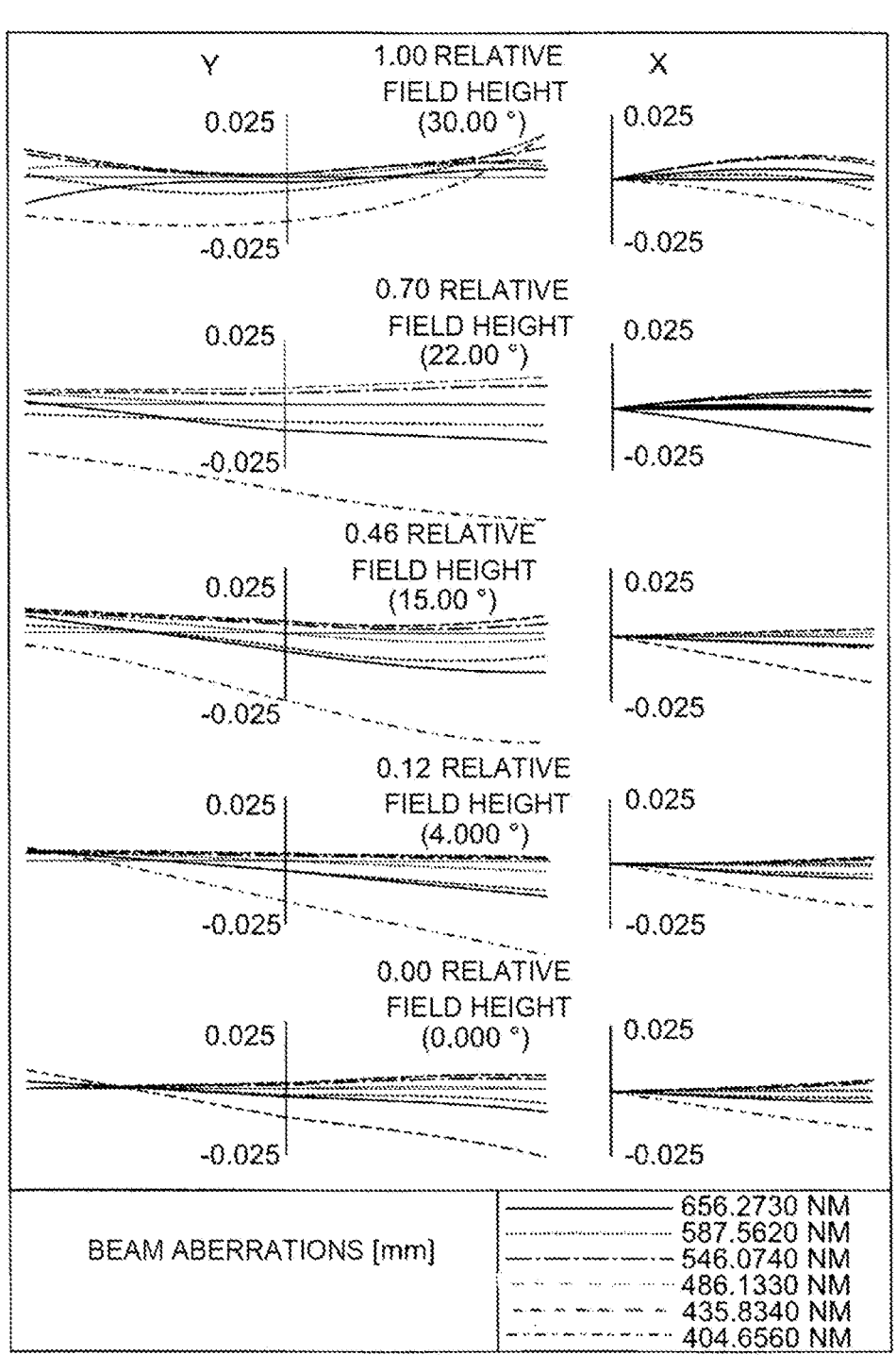
FIG. 33 shows a schematic representation of the transverse aberrations for a pupil of the eye with a diameter of 3 mm, laterally off-centered relative to the optical axis by 1 mm, in the case of an optical system according to FIG. 29.
Figure 34:
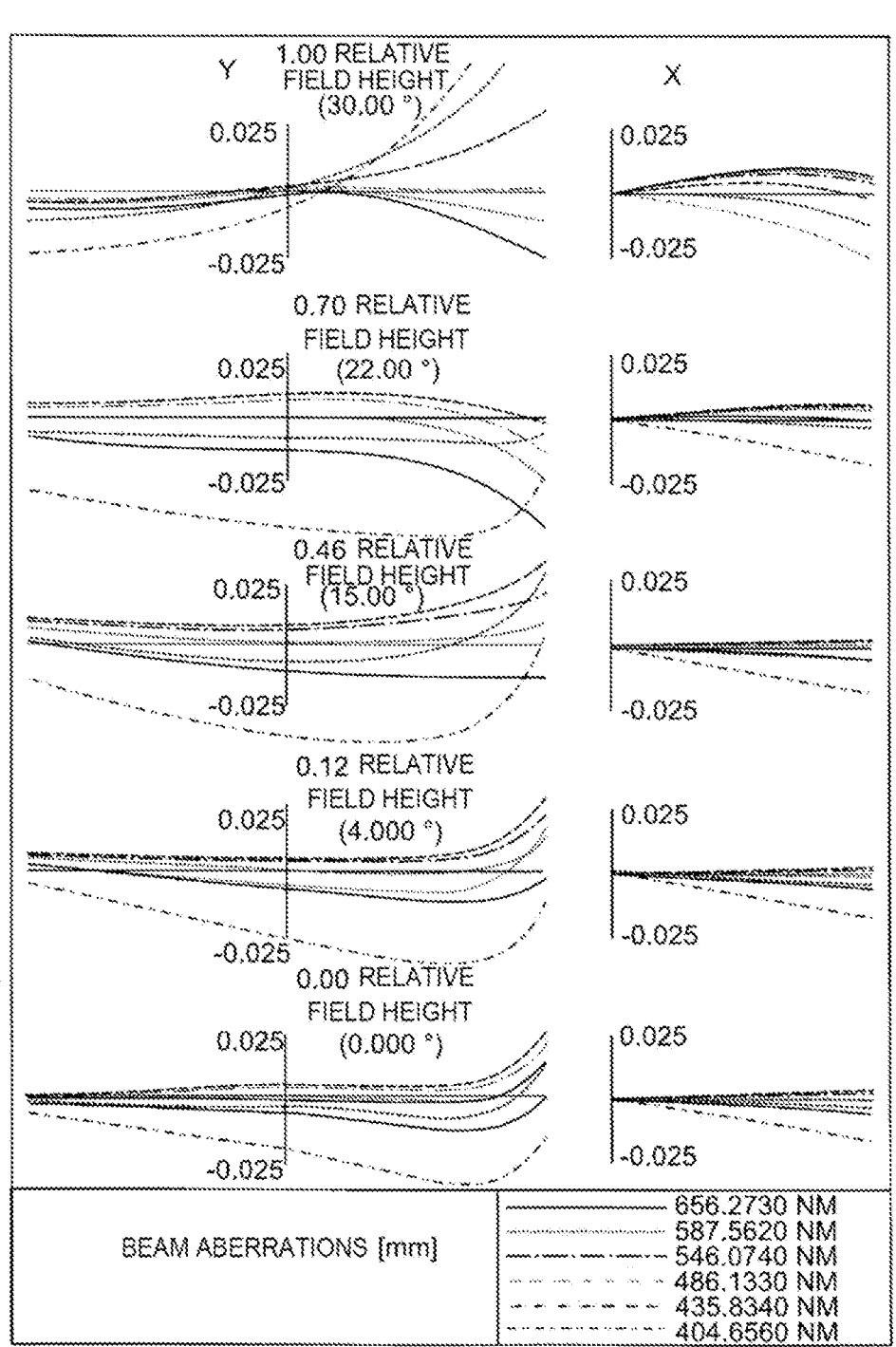
FIG. 34 shows a schematic representation of the transverse aberrations for a pupil of the eye with a diameter of 3 mm, laterally off-centered relative to the optical axis by 2 mm, in the case of an optical system according to FIG. 29.

For the optical system 7 according to the further exemplary embodiment of the disclosure with a centered eye pupil with a diameter of 3 mm, FIG. 32 shows a schematic representation of the transverse aberrations. For the optical system 7 according to the further exemplary embodiment of the disclosure with an eye pupil with a diameter of 3 mm off-centered relative to the optical axis OA by 1 mm, FIG. 33, by contrast, shows a schematic representation of the transverse aberrations. For the optical system 7 according to the further exemplary embodiment of the disclosure with an eye pupil with a diameter of 3 mm off-centered relative to the optical axis OA by 2 mm, FIG. 34 further shows a schematic representation of the transverse aberrations.

Figure 35:
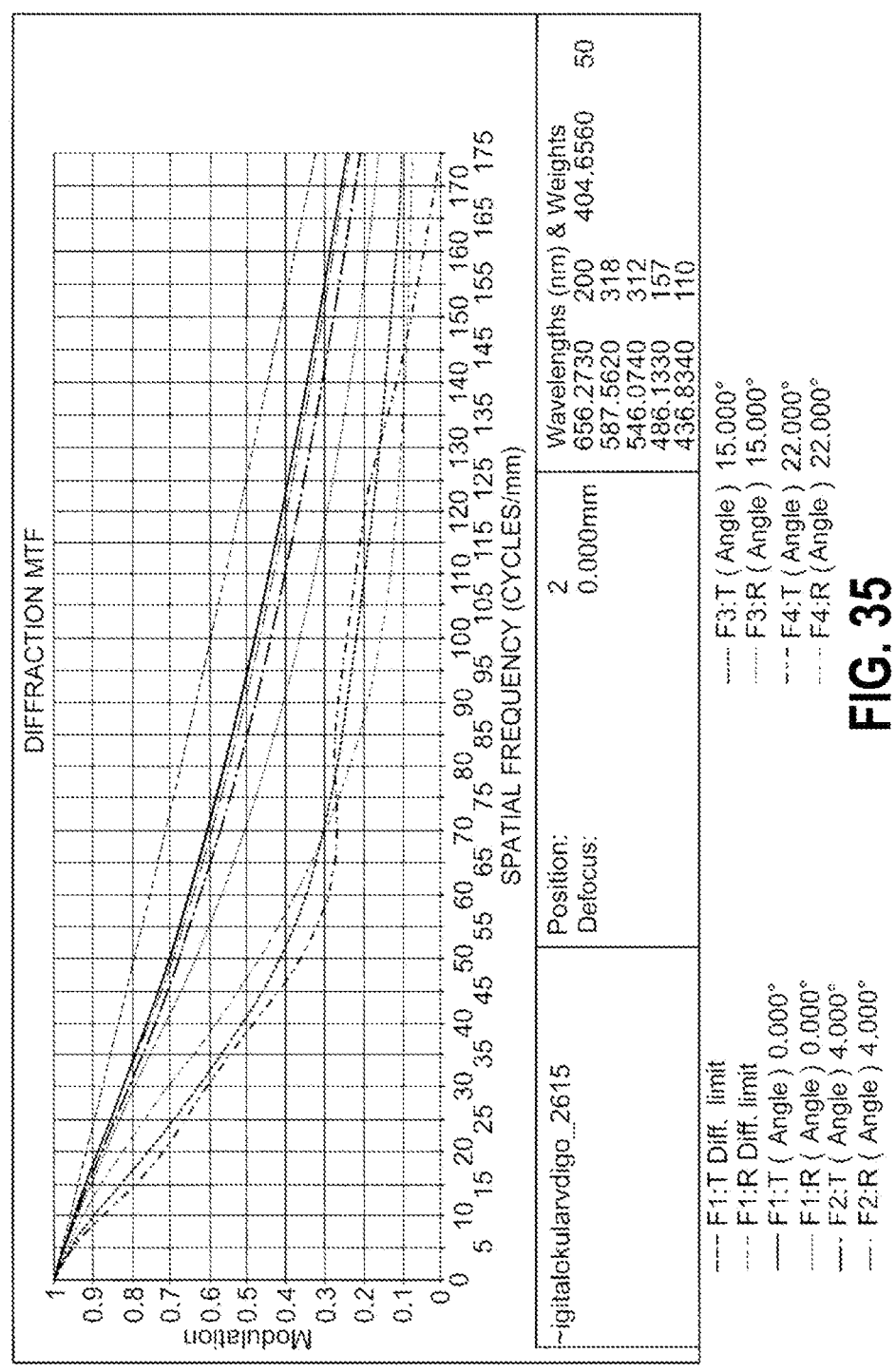
FIG. 35 shows curves of a modulation transfer function in the case of an optical system according to FIG. 29 with a centered pupil of the eye with a diameter of 3 mm.
Figure 36:
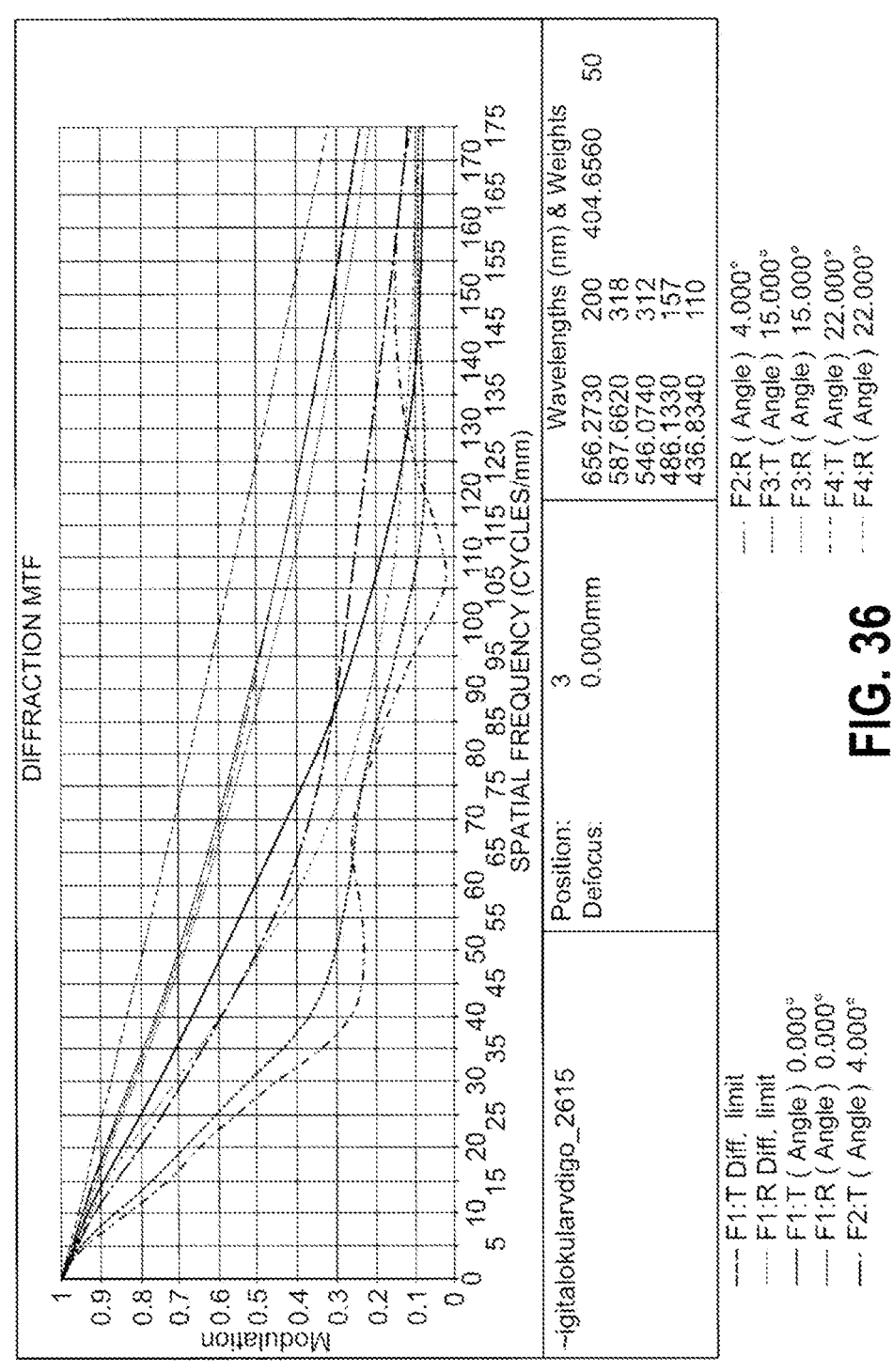
FIG. 36 shows curves of a modulation transfer function in the case of an optical system according to FIG. 29 with a pupil of the eye with a diameter of 3 mm, laterally off-centered relative to the optical axis by 1 mm.
Figure 37:
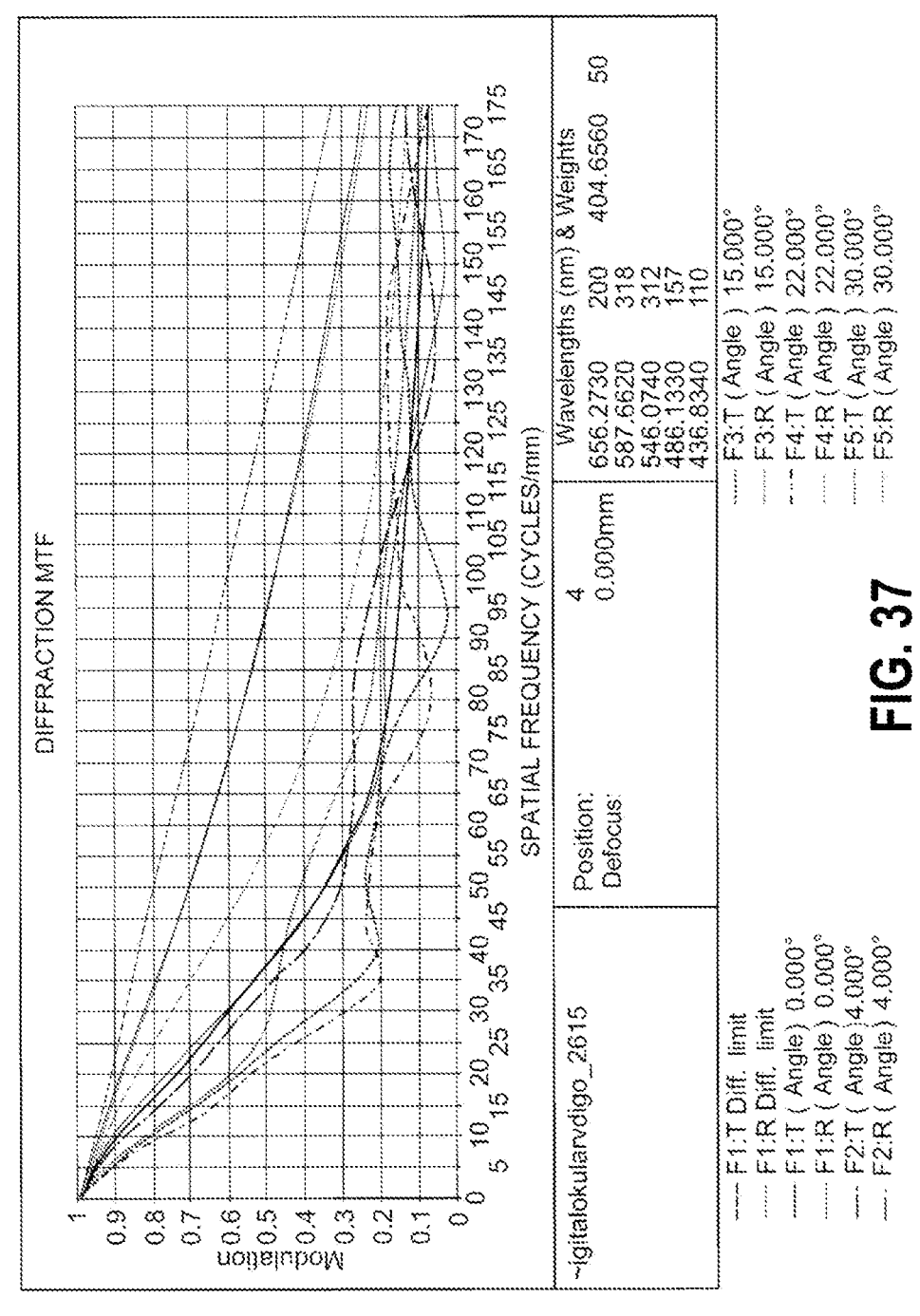
FIG. 37 shows curves of a modulation transfer function in the case of an optical system according to FIG. 29 with a pupil of the eye with a diameter of 3 mm, laterally off-centered relative to the optical axis by 2 mm.

FIG. 35 shows curves of the modulation transfer function (MTF) of the eyepiece 6 up to 80 line pairs/mm at the display unit 5 for different visual field angles for a centered pupil of the eye with a diameter of 3 mm. By contrast, FIG. 36 shows curves of the modulation transfer function (MTF) of the eyepiece 6 up to 80 line pairs/mm at the display unit 5 for different visual field angles for a pupil of the eye with a diameter of 3 mm laterally off-centered relative to the optical axis OA by 1 mm. Further, FIG. 37 shows curves of the modulation transfer function (MTF) of the eyepiece 6 up to 80 line pairs/mm at the display unit 5 for different visual field angles for a pupil of the eye with a diameter of 3 mm laterally off-centered to the optical axis OA by 2 mm.

In view of the use in field glasses, the eyepiece 6 may have a pincushion distortion of 5.3% at the edge of the visual field. This value of the distortion and the curve over the image field have been chosen such that the "globe effect" (cf. publication by H. Merlitz, "Distortion of binoculars revisited: Does the sweet spot exist?", J. Opt. Soc. Am. A/Volume 27, No. 1/January 2010) is minimized in the case of lateral panning. The "globe effect" is a known and empirically well-validated effect, which is however still discussed in relation to its precise physiological and perception-psychological causes, in the case of which the visual impression of the observer would carry out a type of rolling movement on a spherical surface when a pair of field glasses are panned laterally, for example when inspecting the night sky. Observing what is known as the Merlitz condition, which is under discussion in the publication above, with an empirically determined Merlitz parameter of k=0.7, likewise discussed in the aforementioned publication, leads to a pincushion distortion of 5.3% to be used at the edge of the visual field for the specified visual field of +/−30°. This is observed by the further exemplary embodiment of the optical system 7 according to the disclosure under discussion here. Hence, the globe effect is avoided to the best possible extent.

In an even further exemplary embodiment of the further optical system 7 according to the disclosure, provision is made for a first beam to propagate from a first location on the display unit 5 in the light incidence direction L, for a second beam to propagate from a second location on the display unit 5 in the light incidence direction L, and for at least 70% or at least 80% or at least 90% of the first beam and the second beam to overlap at the intermediate pupil ZP. In other words, this exemplary embodiment of the further optical system 7 according to the disclosure provides for the first beam to propagate from the first location on the display unit 5 in the light incidence direction L, for the second beam to propagate from the second location on the display unit 5 in the light incidence direction L, and for the second lens group LG2 to be designed such that at least 70% or at least 80% or at least 90% of the first beam and the second beam overlap at the intermediate pupil ZP. The aforementioned exemplary embodiment ensures that the intermediate pupil ZP is imaged by the first lens group LG1 into the spatial region B (the eye box) without significant imaging aberrations, with the result that a one-to-one correspondence between the positions in the eye box B and the corresponding positions in the conjugate intermediate pupil ZP is maintained. All beams emanating from the various regions of the display unit 5 are uniformly vignetted by the aperture unit BE arranged in the plane of the intermediate pupil ZP. This ensures that the observer, when the pupil of their eye is laterally offset, perceives a reduction in the image brightness that occurs uniformly over the entire region of the display unit before, ultimately, there is complete trimming of the image.

The optical system 7 according to the further exemplary embodiment of the disclosure is advantageous in that it basically provides a conjugate equipment pupil. This allows the observer to directly and intuitively perceive their eye position departing from the admissible region of the eye box B. Further, the observer is provided with feedback regarding the direction and distance that they should move their eye laterally relative to the optical axis OA of the further optical system 7 according to an exemplary embodiment of the disclosure, in order to be sufficiently centered again with respect to the optical axis OA of the optical system 7 according to the further exemplary embodiment of the disclosure.

Individual or multiple features of the further optical system 7 can be implemented on at least one of the optical systems 7 described above.

The features of the disclosure disclosed in the present description, in the drawings and in the claims may be essential for the realization of the disclosure in the various exemplary embodiments thereof both individually and in arbitrary combinations. The disclosure is not restricted to the described exemplary embodiments. It can be varied within the scope of the claims and taking into account the knowledge of the relevant person skilled in the art.

LIST OF REFERENCE NUMERALS

1 Piece of night vision equipment
2 Eye
3 Objective
4 Detector
5 Display unit
6 Eyepiece
7 Optical system
8 Edge of the display unit
9 Marginal ray light beam
B Spatial region (eye box)
BE Aperture unit
H1 First chief ray height
H2 Second chief ray height
HS Chief ray
L Light incidence direction
L1 First lens L2 Second lens
L3 Third lens
LA Fourth lens
L5 Fifth lens
L6 Sixth lens
L7 Seventh lens
L8 Eighth lens
L9 Ninth lens
L10 Tenth lens
L11 Eleventh lens
L12 Twelfth lens
L13 Thirteenth lens
L14 Fourteenth lens
LG1 First lens group
LG2 Second lens group
LG2' Second lens group
LG3' Third lens group
O Object
OA Optical axis
P Pupil
P1 First point
P2 Second point
P3 Third point
P4 Fourth point
S Sagittal contrast curves
T Tangential contrast curves
ZB Intermediate image
ZP Intermediate pupil

What is claimed is:

1. An optical system, comprising:
an optical axis;
a display configured to display an image, the display being arranged on the optical axis and having an edge, the edge delimiting the display;
an eyepiece configured to view the image, the eyepiece including a lens; and
at least one intermediate image,
wherein:
the edge of the display is configured such that a marginal ray light beam emanates from the edge of the display and propagates to the lens in a light incidence direction, the marginal ray light beam having a chief ray,
the display is arranged first along the optical axis in the light incidence direction, followed by the lens unit arranged on the optical axis,
no further optical unit of the optical system is arranged between the lens and a pupil of the eye,
the optical system is configured such that the chief ray propagates at a first chief ray height at the lens, the first chief ray height being a first distance between the optical axis and the chief ray at the lens,
the display is configured such that the chief ray propagates at a second chief ray height at the display, the second chief ray height being a second distance between the optical axis and the chief ray at the display,
the eyepiece includes a first lens group and a second lens group,
as seen counter to the light incidence direction, the first lens group is arranged first along the optical axis, followed by the second lens group,
the at least one intermediate image is arranged between the first lens group and the second lens group,
the first lens group includes a first lens and a second lens, wherein, as seen counter to the light incidence direction, the first lens is arranged first along the optical axis, followed by the second lens, the first lens having a bi-aspheric form and the second lens being in the form of a meniscus lens, the second lens group includes a third lens, a fourth lens, a fifth lens, a sixth lens, a seventh lens, and an eighth lens, wherein, as seen counter to the light incidence direction, the third lens is arranged first along the optical axis, followed by the fourth lens, then the fifth lens, then the sixth lens, then the seventh lens, and then the eighth lens, the third lens being in the form of a meniscus lens, the fourth lens having a bi-aspheric form, and the seventh lens and the eighth lens forming a cemented member, and the optical system has one of the following features:

(i) the first chief ray height is at least level with the second chief ray height, and (ii) the first chief ray height has a larger value than the second chief ray height.

2. The optical system as claimed in claim 1, wherein at least one of the following features is present:

(i) the first distance is the length of a first straight line which is aligned perpendicular to the optical axis and connects a first point on the optical axis to a second point on the chief ray at the lens unit, and (ii) the second distance is the length of a second straight line which is aligned perpendicular to the optical axis and connects a third point on the optical axis to a fourth point on the chief ray at the display.

3. The optical system as claimed in claim 2, wherein at least one of the following features is present:

(i) the lens has a first surface and a second surface, the first surface of the lens being arranged on a first side of the lens facing away from the display, the second surface of the lens being arranged on a second side of the lens facing the display, a first plane being arranged on the first surface of the lens, and the first straight line being located in the first plane, and (ii) the display has a surface, the surface of the display being arranged on a side of the display facing the lens, a second plane being arranged on the surface of the display, and the second straight line being located in the second plane.

4. The optical system as claimed in claim 1, further comprising at least two identical lenses which have an aspheric form.

5. The optical system as claimed in claim 1, wherein:

the optical system includes a first lens, a second lens, a third lens, a fourth lens, a fifth lens, and a sixth lens, the first lens is arranged first along the optical axis as seen counter to the light incidence direction, followed by the second lens, then the third lens, then the fourth lens, then the fifth lens, and then the sixth lens, the first lens has positive refractive power, the second lens has negative refractive power, the third lens has positive refractive power, the fourth lens has positive refractive power, the fifth lens has positive refractive power, and the sixth lens has negative refractive power.

6. The optical system as claimed in claim 5, having at least one of the following features:

(i) the optical system includes at least one cemented member, (ii) the first lens has a surface directed at the pupil of the eye, and the surface has an aspheric form, and (iii) the sixth lens has a surface directed at the display, and the surface has an aspheric form.

7. The optical system as claimed in claim 1, further comprising:

(i) a first concave lens surface and a second concave lens surface, the at least one intermediate image being arranged between the first concave lens surface and the second concave lens surface;

(ii) a first meniscus-shaped lens with a first concave lens surface and a second meniscus-shaped lens with a second concave lens surface, the at least one intermediate image being arranged between the first concave lens surface and the second concave lens surface; and (iii) a first meniscus-shaped cemented member with a first concave lens surface and a second meniscus-shaped cemented member with a second concave lens surface, and a pupil being arranged between the first concave lens surface and the second concave lens surface.

8. The optical system as claimed in claim 1, wherein exactly one lens is arranged between the pupil of the eye of the user and the at least one intermediate image.

9. The optical system as claimed in claim 8, wherein the exactly one lens has a bi-aspheric form.

10. The optical system as claimed in claim 1, further comprising a third lens group, and wherein as seen counter to the light incidence direction, the first lens group is arranged first along the optical axis, followed by the second lens group and then the third lens group.

11. The optical system as claimed in claim 1, wherein the first lens group includes the lens.

12. The optical system as claimed in claim 1, wherein:

(i) the first lens group includes a first lens, a second lens, a third lens, and a fourth lens, wherein, as seen counter to the light incidence direction, the first lens is arranged first along the optical axis, followed by the second lens, then the third lens, and then the fourth lens, the first lens having positive refractive power, the second lens having positive refractive power, the third lens having positive refractive power, and the fourth lens having negative refractive power, (ii) the second lens group includes a fifth lens, a sixth lens, a seventh lens, an eighth lens, a ninth lens, a tenth lens, an eleventh lens, and a twelfth lens, wherein, as seen counter to the light incidence direction, the fifth lens is arranged first along the optical axis, followed by the sixth lens, then the seventh lens, then the eighth lens, then the ninth lens, then the tenth lens, then the eleventh lens, and then the twelfth lens, the fifth lens having positive refractive power, the sixth lens having positive refractive power, the seventh lens having negative refractive power, the eighth lens having negative refractive power, the ninth lens having positive refractive power, the tenth lens having positive refractive power, the eleventh lens having positive refractive power, and the twelfth lens having negative refractive power.

13. The optical system as claimed in claim 12, having at least one of the following features:

(i) the second lens group includes at least one meniscus-shaped cemented member, (ii) the second lens group includes at least one meniscus-shaped cemented member including a crown lens and a flint lens, (iii) the second lens group includes at least one meniscus-shaped cemented member having a concave side, the concave side being directed at a pupil arranged in the optical system, (iv) the eighth lens of the second lens group and the ninth lens of the second lens group form a first meniscus-shaped cemented member, (v) the eleventh lens of the second lens group and the twelfth lens of the second lens group form a second meniscus-shaped cemented member, and (vi) the seventh lens of the second lens group is in the form of a meniscus lens.

14. The optical system as claimed in claim 1, wherein:

(i) the first lens group includes a first lens and a second lens, wherein, as seen counter to the light incidence direction, the first lens is arranged first along the optical axis, followed by the second lens, the first lens having positive refractive power and the second lens having negative refractive power, and (ii) the second lens group includes a third lens, a fourth lens, a fifth lens, a sixth lens, and a seventh lens, wherein, as seen counter to the light incidence direction, the third lens is arranged first along the optical axis, followed by the fourth lens, then the fifth lens, then the sixth lens, and then the seventh lens, the third lens having negative refractive power, the fourth lens having positive refractive power, the fifth lens having negative refractive power, the sixth lens having positive refractive power, and the seventh lens having positive refractive power.

15. The optical system as claimed in claim 14, having at least one of the following features:

(i) the first lens has a bi-aspheric form, (ii) the second lens is in a form of a meniscus lens, (iii) the third lens is in the form of the meniscus lens, (iv) the fourth lens has the bi-aspheric form, and (v) the fifth lens and the sixth lens form a cemented member.

16. The optical system as claimed in claim 1, having at least one of the following features:

(i) the first lens has positive refractive power and the second lens has negative refractive power, (ii) the first lens has positive refractive power and the second lens has positive refractive power, (iii) the third lens has positive refractive power, the fourth lens has positive refractive power, the fifth lens has negative refractive power, the sixth lens has positive refractive power, the seventh lens has negative refractive power, and the eighth lens has positive refractive power, and (iv) the third lens has positive refractive power, the fourth lens has positive refractive power, the fifth lens has negative refractive power, the sixth lens has positive refractive power, the seventh lens has positive refractive power, and the eighth lens has negative refractive power.

17. An optical system, comprising:

an optical axis;

a display configured to display an image, the display being arranged on the optical axis and having an edge, the edge delimiting the display;

an eyepiece configured to view the image, the eyepiece including a lens with a first lens group and a second lens group; and at least one intermediate image arranged between the first lens group and the second lens group, wherein:

as seen counter to the light incidence direction, the first lens group is arranged first along the optical axis, followed by the second lens group, the edge of the display is configured such that a marginal ray light beam emanates from the edge of the display and propagates to the lens in a light incidence direction, the marginal ray light beam having a chief ray, the display is arranged first along the optical axis in the light incidence direction, followed by the lens unit arranged on the optical axis, the display is configured such that the chief ray propagates at a second chief ray height at the display, the second chief ray height being a second distance between the optical axis and the chief ray at the display, no further optical unit of the optical system is arranged between the lens and a pupil of the eye, the first lens group includes a single lens in the form of a first lens, the first lens having positive refractive power, the second lens group includes a second lens, a third lens, a fourth lens, a fifth lens, and a sixth lens, wherein, as seen counter to the light incidence direction, the second lens is arranged first along the optical axis, followed by the third lens, then the fourth lens, then the fifth lens, and then the sixth lens, the second lens having positive refractive power, the third lens having negative refractive power, the fourth lens having positive refractive power, the fifth lens having positive refractive power, and the sixth lens having negative refractive power, the optical system is configured such that the chief ray propagates at a first chief ray height at the lens, the first chief ray height being a first distance between the optical axis and the chief ray at the lens, and the optical system has one of the following features:

(i) the first chief ray height is at least level with the second chief ray height, and (ii) the first chief ray height has a larger value than the second chief ray height.

18. The optical system as claimed in claim 17, having at least one of the following features:

(i) the first lens has a bi-aspheric form, (ii) the second lens has the bi-aspheric form, (iii) the third lens is in a form of a meniscus lens, and (iv) the fifth lens and the sixth lens form a cemented member.

19. An optical system, comprising:

an optical axis;

a display configured to display an image, the display being arranged on the optical axis and having an edge, the edge delimiting the display;

an eyepiece configured to view the image, the eyepiece including a lens with a first lens group and a second lens group; and at least one intermediate image arranged between the first lens group and the second lens group, wherein:

as seen counter to the light incidence direction, the first lens group is arranged first along the optical axis, followed by the second lens group, the edge of the display is configured such that a marginal ray light beam emanates from the edge of the display and propagates to the lens in a light incidence direction, the marginal ray light beam having a chief ray, the display is arranged first along the optical axis in the light incidence direction, followed by the lens unit arranged on the optical axis, the display is configured such that the chief ray propagates at a second chief ray height at the display, the second chief ray height being a second distance between the optical axis and the chief ray at the display, no further optical unit of the optical system is arranged between the lens and a pupil of the eye, the first lens group includes a single lens in the form of a first lens, the first lens having positive refractive power, the second lens group includes a second lens, a third lens, and a fourth lens, wherein, as seen counter to the light incidence direction, the second lens is arranged first along the optical axis, followed by the third lens, and then the fourth lens, the second lens having positive refractive power, the third lens having positive refractive power, and the fourth lens having negative refractive power, the optical system is configured such that the chief ray propagates at a first chief ray height at the lens, the first chief ray height being a first distance between the optical axis and the chief ray at the lens, and the optical system has one of the following features:

(i) the first chief ray height is at least level with the second chief ray height, and (ii) the first chief ray height has a larger value than the second chief ray height.

20. The optical system as claimed in claim 19, having at least one of the following features:

(i) the first lens has a bi-aspheric form, (ii) the second lens has the bi-aspheric form, and (iii) the third lens has the bi-aspheric form.

21. An optical system, comprising:

an optical axis;

a display configured to display an image, the display being arranged on the optical axis and having an edge, the edge delimiting the display;

an eyepiece configured to view the image, the eyepiece including a lens with a first lens group and a second lens group; and at least one intermediate image arranged between the first lens group and the second lens group, wherein:

as seen counter to the light incidence direction, the first lens group is arranged first along the optical axis, followed by the second lens group, the edge of the display is configured such that a marginal ray light beam emanates from the edge of the display and propagates to the lens in a light incidence direction, the marginal ray light beam having a chief ray, the display is arranged first along the optical axis in the light incidence direction, followed by the lens unit arranged on the optical axis, the display is configured such that the chief ray propagates at a second chief ray height at the display, the second chief ray height being a second distance between the optical axis and the chief ray at the display, no further optical unit of the optical system is arranged between the lens and a pupil of the eye, the first lens group includes a single lens in the form of a first lens, the first lens having positive refractive power, the second lens group includes a second lens, a third lens, a fourth lens, a fifth lens, and a sixth lens, wherein, as seen counter to the light incidence direction, the second lens is arranged first along the optical axis, followed by the third lens, then the fourth lens, then the fifth lens, and then the sixth lens, the second lens having positive refractive power, the third lens having negative refractive power, the fourth lens having negative refractive power, the fifth lens having positive refractive power, and the sixth lens having positive refractive power, the optical system is configured such that the chief ray propagates at a first chief ray height at the lens, the first chief ray height being a first distance between the optical axis and the chief ray at the lens, and the optical system has one of the following features:

(i) the first chief ray height is at least level with the second chief ray height, and (ii) the first chief ray height has a larger value than the second chief ray height.

22. The optical system as claimed in claim 21, having at least one of the following features:

(i) the first lens has a bi-aspheric form, (ii) the second lens has the bi-aspheric form, (iii) the sixth lens has an aspheric form, and (iv) the fourth lens and the fifth lens form a cemented member.

23. The optical system as claimed in claim 1, wherein:

(i) the first lens group includes a single lens in the form of a first lens, the first lens having positive refractive power, (ii) the second lens group includes a second lens, a third lens, a fourth lens, a fifth lens, a sixth lens, and a seventh lens, wherein, as seen counter to the light incidence direction, the second lens is arranged first along the optical axis, followed by the third lens, then the fourth lens, then the fifth lens, then the sixth lens, and then the seventh lens, the second lens having positive refractive power, the third lens having negative refractive power, the fourth lens having negative refractive power, the fifth lens having positive refractive power, the sixth lens having positive refractive power, and the seventh lens having positive refractive power.

24. The optical system as claimed in claim 23, having at least one of the following features:

(i) the first lens has a bi-aspheric form, (ii) the second lens has the bi-aspheric form, and (iii) the fourth lens and the fifth lens form a cemented member.

25. The optical system as claimed in claim 1, wherein the optical system is a dioptric system.

26. The optical system as claimed in claim 1, having at least one of the following features:

(i) a distance from the pupil of the eye to the lens unit is larger than one focal length of the optical system, (ii) a distance from the pupil of the eye to the lens unit is at least 1.25 times larger than one focal length of the optical system, (iii) a distance from the pupil of the eye to the lens unit is at least 1.5 times larger than one focal length of the optical system, and (iv) a distance from the pupil of the eye to the lens unit is 1.7 times larger than one focal length of the optical system.

* * * * *